US012775073B2

(12) United States Patent
Bao et al.

(10) Patent No.: US 12,775,073 B2
(45) Date of Patent: Oct. 27, 2026

(54) COMPACT LiDAR SYSTEM WITH METALENSES

(71) Applicant: Innovusion, Inc., Sunnyvale, CA (US)

(72) Inventors: Junwei Bao, Los Altos, CA (US); Yufeng Li, Milpitas, CA (US); Yimin Li, Cupertino, CA (US)

(73) Assignee: SEYOND, INC., Sunnyvale, CA (US)

(*) Notice: Subject to any disclaimer, the term of this patent is extended or adjusted under 35 U.S.C. 154(b) by 467 days.

(21) Appl. No.: 18/373,252

(22) Filed: Sep. 26, 2023

(65) Prior Publication Data

US 2024/0103140 A1 Mar. 28, 2024

Related U.S. Application Data

(60) Provisional application No. 63/410,608, filed on Sep. 27, 2022.

(51) Int. Cl.
*G01S 7/481* (2006.01)
*G01S 17/931* (2020.01)
(Continued)

(52) U.S. Cl.
CPC .......... *G01S 7/4817* (2013.01); *G01S 7/4814* (2013.01); *G01S 7/4818* (2013.01); *G01S 17/931* (2020.01); *G02B 1/002* (2013.01); *G02B 26/101* (2013.01)

(58) Field of Classification Search
CPC .... G01S 7/4817; G01S 17/931; G01S 7/4814; G01S 7/4818; G02B 1/002; G02B 26/101
See application file for complete search history.

(56) References Cited

U.S. PATENT DOCUMENTS

| | | | |
|---|---|---|---|
| 3,897,150 | A | 7/1975 | Bridges et al. |
| 4,464,048 | A | 8/1984 | Farlow |

(Continued)

FOREIGN PATENT DOCUMENTS

| | | | |
|---|---|---|---|
| CN | 1677050 | A | 10/2005 |
| CN | 204758260 | U | 11/2015 |

(Continued)

OTHER PUBLICATIONS

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

(Continued)

*Primary Examiner* — Uzma Alam
*Assistant Examiner* — Fani Polyzos Boosalis
(74) *Attorney, Agent, or Firm* — MASCHOFF BRENNAN; Ran Pang; Liang Huang

(57) ABSTRACT

A light ranging and detection (LiDAR) system is provided. The LiDAR system comprises metasurface-based optics. The system comprises a transmitter comprising one or more transmitter optics. The transmitter is configured to provide one or more transmission light beams. The system further comprises a beam steering apparatus optically coupled to the transmitter. The beam steering apparatus comprises one or more steering optics configured to: scan the one or more transmission light beams in at least one of a horizontal and a vertical directions to a field-of-view, and direct return light formed based on the scanned one or more transmission light beams. The system further comprises a receiver comprising one or more receiver optics. At least one of the one or more transmitter optics, the one or more steering optics, and the one or more receiver optics comprise the one or more metasurface-based optics.

24 Claims, 21 Drawing Sheets

(51) Int. Cl.
*G02B 1/00* (2006.01)
*G02B 26/10* (2006.01)

(56) References Cited

U.S. PATENT DOCUMENTS 5,006,721 A 4/1991 Cameron et al.
5,157,451 A 10/1992 Taboada et al.
5,319,434 A 6/1994 Croteau et al.
5,369,661 A 11/1994 Yamaguchi et al.
5,442,358 A 8/1995 Keeler et al.
5,546,188 A 8/1996 Wangler et al.
5,579,153 A 11/1996 Laming et al.
5,657,077 A 8/1997 DeAngelis et al.
5,793,491 A 8/1998 Wangler et al.
5,838,239 A 11/1998 Stern et al.
5,864,391 A 1/1999 Hosokawa et al.
5,926,259 A 7/1999 Bamberger et al.
5,936,756 A 8/1999 Nakajima
6,163,378 A 12/2000 Khoury
6,317,202 B1 11/2001 Hosokawa et al.
6,594,000 B2 7/2003 Green et al.
6,650,404 B1 11/2003 Crawford
6,950,733 B2 9/2005 Stopczynski
7,128,267 B2 10/2006 Reichenbach et al.
7,202,941 B2 4/2007 Munro
7,345,271 B2 3/2008 Boehlau et al.
7,440,084 B2 10/2008 Kane
7,440,175 B2 10/2008 Di Teodoro et al.
7,489,865 B2 2/2009 Varshneya et al.
7,576,837 B2 8/2009 Liu et al.
7,830,527 B2 11/2010 Chen
7,835,068 B1 11/2010 Brooks et al.
7,847,235 B2 12/2010 Krupkin et al.
7,880,865 B2 2/2011 Tanaka et al.
7,936,448 B2 5/2011 Albuquerque et al.
7,969,558 B2 6/2011 Hall
7,982,861 B2 7/2011 Abshire et al.
8,072,582 B2 12/2011 Meneely
8,471,895 B2 6/2013 Banks
8,736,818 B2 5/2014 Weimer et al.
8,749,764 B2 6/2014 Hsu et al.
8,812,149 B2 8/2014 Doak
8,984,928 B2 3/2015 Shiraishi
9,048,616 B1 6/2015 Robinson
9,065,243 B2 6/2015 Asobe et al.
9,086,273 B1 7/2015 Gruver et al.
9,194,701 B2 11/2015 Bosch
9,255,790 B2 2/2016 Zhu
9,300,321 B2 3/2016 Zalik et al.
9,304,316 B2 4/2016 Weiss et al.
9,316,724 B2 4/2016 Gehring et al.
9,354,485 B2 5/2016 Fermann et al.
9,510,505 B2 12/2016 Halloran et al.
9,575,184 B2 2/2017 Gilliland et al.
9,605,998 B2 3/2017 Nozawa
9,621,876 B2 4/2017 Federspiel
9,638,799 B2 5/2017 Goodwin et al.
9,696,426 B2 7/2017 Zuk et al.
9,702,966 B2 7/2017 Batcheller et al.
9,804,264 B2 10/2017 Villeneuve et al.
9,810,786 B1 11/2017 Welford et al.
9,812,838 B2 11/2017 Villeneuve et al.
9,823,353 B2 11/2017 Eichenholz et al.
9,857,468 B1 1/2018 Eichenholz et al.
9,869,754 B1 1/2018 Campbell et al.
9,880,263 B2 1/2018 Droz et al.
9,880,278 B2 1/2018 van Uffelen et al.
9,885,778 B2 2/2018 Dussan
9,897,689 B2 2/2018 Dussan
9,915,726 B2 3/2018 Bailey et al.
9,927,915 B2 3/2018 Frame et al.
9,958,545 B2 5/2018 Eichenholz et al.
9,989,629 B1 * 6/2018 LaChapelle ............. G01S 17/42
10,007,001 B1 6/2018 LaChapelle et al.
10,012,732 B2 7/2018 Eichenholz et al.
10,042,159 B2 8/2018 Dussan et al.
10,061,019 B1 8/2018 Campbell et al.
10,073,166 B2 9/2018 Dussan
10,078,133 B2 9/2018 Dussan
10,094,925 B1 10/2018 LaChapelle
10,157,630 B2 12/2018 Vaughn et al.
10,191,155 B2 1/2019 Curatu
10,215,847 B2 2/2019 Scheim et al.
10,267,898 B2 4/2019 Campbell et al.
10,295,656 B1 5/2019 Li et al.
10,310,058 B1 6/2019 Campbell et al.
10,324,170 B1 6/2019 Engberg, Jr. et al.
10,324,185 B2 6/2019 McWhirter et al.
10,393,877 B2 8/2019 Hall et al.
10,429,495 B1 10/2019 Wang et al.
10,444,356 B2 10/2019 Wu et al.
10,451,716 B2 10/2019 Hughes et al.
10,466,342 B1 11/2019 Zhu et al.
10,481,328 B1 11/2019 Krueger et al.
10,502,831 B2 12/2019 Eichenholz
10,509,112 B1 12/2019 Pan
10,520,602 B2 12/2019 Villeneuve et al.
10,557,923 B2 2/2020 Watnik et al.
10,571,567 B2 2/2020 Campbell et al.
10,578,720 B2 3/2020 Hughes et al.
10,591,600 B2 3/2020 Villeneuve et al.
10,627,491 B2 4/2020 Hall et al.
10,641,872 B2 5/2020 Dussan et al.
10,663,564 B2 5/2020 LaChapelle
10,663,585 B2 5/2020 McWhirter
10,663,596 B2 5/2020 Dussan et al.
10,684,360 B2 6/2020 Campbell
10,908,262 B2 2/2021 Dussan
10,908,265 B2 2/2021 Dussan
10,908,268 B2 2/2021 Zhou et al.
10,969,475 B2 4/2021 Li et al.
10,983,218 B2 4/2021 Hall et al.
11,002,835 B2 5/2021 Pan et al.
11,005,186 B2 * 5/2021 Akselrod ................ G01S 7/484
11,009,605 B2 5/2021 Li et al.
11,175,405 B2 11/2021 Pacala et al.
11,178,381 B2 11/2021 Pacala et al.
11,190,750 B2 11/2021 Pacala et al.
11,194,048 B1 12/2021 Burbank et al.
11,287,515 B2 3/2022 Pacala et al.
11,422,236 B2 8/2022 Pacala et al.
11,579,300 B1 * 2/2023 Li ......................... G01S 7/4816
12,055,659 B2 * 8/2024 Gassend ................ G01S 17/10
2002/0136251 A1 9/2002 Green et al.
2004/0135992 A1 7/2004 Munro
2005/0033497 A1 2/2005 Stopczynski
2005/0190424 A1 9/2005 Reichenbach et al.
2005/0195383 A1 9/2005 Breed et al.
2006/0071846 A1 4/2006 Yanagisawa et al.
2006/0132752 A1 6/2006 Kane
2007/0091948 A1 4/2007 Di Teodoro et al.
2007/0216995 A1 9/2007 Bollond et al.
2008/0174762 A1 7/2008 Liu et al.
2008/0193135 A1 8/2008 Du et al.
2009/0010644 A1 1/2009 Varshneya et al.
2009/0051926 A1 2/2009 Chen
2009/0059201 A1 3/2009 Willner et al.
2009/0067453 A1 3/2009 Mizuuchi et al.
2009/0147239 A1 6/2009 Zhu et al.
2009/0262760 A1 10/2009 Krupkin et al.
2009/0316134 A1 12/2009 Michael et al.
2010/0006760 A1 1/2010 Lee et al.
2010/0020306 A1 1/2010 Hall
2010/0020377 A1 1/2010 Borchers et al.
2010/0027602 A1 2/2010 Abshire et al.
2010/0045965 A1 2/2010 Meneely
2010/0053715 A1 3/2010 O'Neill et al.
2010/0128109 A1 5/2010 Banks
2010/0271614 A1 10/2010 Albuquerque et al.
2011/0181864 A1 7/2011 Schmitt et al.
2012/0038903 A1 2/2012 Weimer et al.
2012/0124113 A1 5/2012 Zalik et al.
2012/0221142 A1 8/2012 Doak
2013/0107016 A1 5/2013 Federspiel

(56) References Cited

U.S. PATENT DOCUMENTS

| | | | |
|---|---|---|---|
| 2013/0116971 | A1 | 5/2013 | Retkowski et al. |
| 2013/0241761 | A1 | 9/2013 | Cooper et al. |
| 2013/0293867 | A1 | 11/2013 | Hsu et al. |
| 2013/0293946 | A1 | 11/2013 | Fermann et al. |
| 2013/0329279 | A1 | 12/2013 | Nati et al. |
| 2013/0342822 | A1 | 12/2013 | Shiraishi |
| 2014/0078514 | A1 | 3/2014 | Zhu |
| 2014/0104594 | A1 | 4/2014 | Gammenthaler |
| 2014/0347650 | A1 | 11/2014 | Bösch |
| 2014/0350836 | A1 | 11/2014 | Stettner et al. |
| 2015/0078123 | A1 | 3/2015 | Batcheller et al. |
| 2015/0084806 | A1 | 3/2015 | Dawber |
| 2015/0109603 | A1 | 4/2015 | Kim et al. |
| 2015/0116692 | A1 | 4/2015 | Zuk et al. |
| 2015/0139259 | A1 | 5/2015 | Robinson |
| 2015/0158489 | A1 | 6/2015 | Oh et al. |
| 2015/0338270 | A1 | 11/2015 | Williams et al. |
| 2015/0355327 | A1 | 12/2015 | Goodwin et al. |
| 2016/0003946 | A1 | 1/2016 | Gilliland et al. |
| 2016/0047896 | A1 | 2/2016 | Dussan |
| 2016/0047900 | A1 | 2/2016 | Dussan |
| 2016/0061655 | A1 | 3/2016 | Nozawa |
| 2016/0061935 | A1 | 3/2016 | McCloskey et al. |
| 2016/0100521 | A1 | 4/2016 | Halloran et al. |
| 2016/0117048 | A1 | 4/2016 | Frame et al. |
| 2016/0172819 | A1 | 6/2016 | Ogaki |
| 2016/0178736 | A1 | 6/2016 | Chung |
| 2016/0226210 | A1 | 8/2016 | Zayhowski et al. |
| 2016/0245902 | A1 | 8/2016 | Watnik |
| 2016/0291134 | A1 | 10/2016 | Droz et al. |
| 2016/0313445 | A1 | 10/2016 | Bailey et al. |
| 2016/0327646 | A1 | 11/2016 | Scheim et al. |
| 2017/0003116 | A1 | 1/2017 | Yee et al. |
| 2017/0153319 | A1 | 6/2017 | Villeneuve et al. |
| 2017/0242104 | A1 | 8/2017 | Dussan |
| 2017/0299721 | A1 | 10/2017 | Eichenholz et al. |
| 2017/0307738 | A1 | 10/2017 | Schwarz et al. |
| 2017/0365105 | A1 | 12/2017 | Rao et al. |
| 2018/0040171 | A1 | 2/2018 | Kundu et al. |
| 2018/0050704 | A1 | 2/2018 | Tascione et al. |
| 2018/0069367 | A1 | 3/2018 | Villeneuve et al. |
| 2018/0152691 | A1 | 5/2018 | Pacala et al. |
| 2018/0156896 | A1 | 6/2018 | O'Keeffe |
| 2018/0158471 | A1 | 6/2018 | Vaughn et al. |
| 2018/0164439 | A1 | 6/2018 | Droz et al. |
| 2018/0188355 | A1 | 7/2018 | Bao et al. |
| 2018/0188357 | A1 | 7/2018 | Li et al. |
| 2018/0188358 | A1 | 7/2018 | Li et al. |
| 2018/0188371 | A1 | 7/2018 | Bao et al. |
| 2018/0210084 | A1 | 7/2018 | Zwölfer et al. |
| 2018/0275274 | A1 | 9/2018 | Bao et al. |
| 2018/0284241 | A1 | 10/2018 | Campbell et al. |
| 2018/0284242 | A1 | 10/2018 | Campbell |
| 2018/0284286 | A1 | 10/2018 | Eichenholz et al. |
| 2018/0329060 | A1 | 11/2018 | Pacala et al. |
| 2018/0359460 | A1 | 12/2018 | Pacala et al. |
| 2019/0025428 | A1 | 1/2019 | Li et al. |
| 2019/0107607 | A1 | 4/2019 | Danziger |
| 2019/0107623 | A1 | 4/2019 | Campbell et al. |
| 2019/0120942 | A1 | 4/2019 | Zhang et al. |
| 2019/0120962 | A1 | 4/2019 | Gimpel et al. |
| 2019/0154804 | A1 | 5/2019 | Eichenholz |
| 2019/0154807 | A1 | 5/2019 | Steinkogler et al. |
| 2019/0212416 | A1 | 7/2019 | Li et al. |
| 2019/0250254 | A1 | 8/2019 | Campbell et al. |
| 2019/0257924 | A1 | 8/2019 | Li et al. |
| 2019/0265334 | A1 | 8/2019 | Zhang et al. |
| 2019/0265336 | A1 | 8/2019 | Zhang et al. |
| 2019/0265337 | A1 | 8/2019 | Zhang et al. |
| 2019/0265339 | A1 | 8/2019 | Zhang et al. |
| 2019/0277952 | A1 | 9/2019 | Beuschel et al. |
| 2019/0310368 | A1 | 10/2019 | LaChapelle |
| 2019/0369215 | A1 | 12/2019 | Wang et al. |
| 2019/0369258 | A1 | 12/2019 | Hall et al. |
| 2019/0383915 | A1 | 12/2019 | Li et al. |
| 2020/0025893 | A1* | 1/2020 | Jang .................... H01S 5/04256 |
| 2020/0142070 | A1 | 5/2020 | Hall et al. |
| 2020/0256964 | A1 | 8/2020 | Campbell et al. |
| 2020/0284906 | A1 | 9/2020 | Eichenholz et al. |
| 2020/0319310 | A1 | 10/2020 | Hall et al. |
| 2020/0400798 | A1 | 12/2020 | Rezk et al. |
| 2021/0088630 | A9 | 3/2021 | Zhang |
| 2021/0132196 | A1* | 5/2021 | Tsai ........................ G01S 17/42 |
| 2021/0141060 | A1 | 5/2021 | Akselrod et al. |
| 2021/0364603 | A1* | 11/2021 | Kim ...................... G01S 7/4815 |

FOREIGN PATENT DOCUMENTS

| | | | |
|---|---|---|---|
| CN | 204885804 | U | 12/2015 |
| CN | 108132472 | A | 6/2018 |
| CN | 207457508 | U | 6/2018 |
| CN | 207557465 | U | 6/2018 |
| CN | 208314210 | U | 1/2019 |
| CN | 208421228 | U | 1/2019 |
| CN | 208705508 | U | 4/2019 |
| CN | 106597471 | B | 5/2019 |
| CN | 209280923 | U | 8/2019 |
| CN | 108445468 | B | 11/2019 |
| CN | 110031823 | B | 3/2020 |
| CN | 108089201 | B | 4/2020 |
| CN | 108594206 | B | 4/2020 |
| CN | 109116331 | B | 4/2020 |
| CN | 109917408 | B | 4/2020 |
| CN | 109116366 | B | 5/2020 |
| CN | 109116367 | B | 5/2020 |
| CN | 110031822 | B | 5/2020 |
| CN | 211655309 | U | 10/2020 |
| CN | 109188397 | B | 11/2020 |
| CN | 109814086 | B | 11/2020 |
| CN | 109917348 | B | 11/2020 |
| CN | 110492856 | B | 11/2020 |
| CN | 110736975 | B | 11/2020 |
| CN | 109725320 | B | 12/2020 |
| CN | 110780284 | B | 12/2020 |
| CN | 110780283 | B | 1/2021 |
| CN | 110784220 | B | 2/2021 |
| CN | 212623082 | U | 2/2021 |
| CN | 110492349 | B | 3/2021 |
| CN | 109950784 | B | 5/2021 |
| CN | 213182011 | U | 5/2021 |
| CN | 213750313 | U | 7/2021 |
| CN | 214151038 | U | 9/2021 |
| CN | 109814082 | B | 10/2021 |
| CN | 113491043 | A | 10/2021 |
| CN | 214795200 | U | 11/2021 |
| CN | 214795208 | U | 11/2021 |
| CN | 214895784 | U | 11/2021 |
| CN | 214895810 | U | 11/2021 |
| CN | 215641806 | U | 1/2022 |
| CN | 112639527 | B | 2/2022 |
| CN | 215932142 | U | 3/2022 |
| CN | 112578396 | B | 4/2022 |
| CN | 115267727 | A | 11/2022 |
| CN | 223296134 | U | 9/2025 |
| EP | 0 757 257 | A2 | 2/1997 |
| EP | 1 237 305 | A2 | 9/2002 |
| EP | 1 923 721 | A1 | 5/2008 |
| EP | 2 157 445 | A2 | 2/2010 |
| EP | 2 395 368 | A1 | 12/2011 |
| EP | 2 889 642 | A1 | 7/2015 |
| GB | 1 427 164 | A | 3/1976 |
| GB | 2 000 411 | A | 1/1979 |
| JP | 2007144667 | A | 6/2007 |
| JP | 2010035385 | A | 2/2010 |
| JP | 2017003347 | A | 1/2017 |
| JP | 2017138301 | Å | 8/2017 |
| KR | 10-2012-0013515 | A | 2/2012 |
| KR | 10-2013-0068224 | A | 6/2013 |
| KR | 10-2018-0107673 | A | 10/2018 |
| WO | 2017/110417 | A1 | 6/2017 |
| WO | 2018/125725 | A1 | 7/2018 |
| WO | 2018/129408 | A1 | 7/2018 |
| WO | 2018/129409 | A1 | 7/2018 |
| WO | 2018/129410 | A1 | 7/2018 |

(56) References Cited

FOREIGN PATENT DOCUMENTS

| | | | |
|---|---|---|---|
| WO | 2018/175990 | A1 | 9/2018 |
| WO | 2018/182812 | A2 | 10/2018 |
| WO | 2019/079642 | A1 | 4/2019 |
| WO | 2019/165095 | A1 | 8/2019 |
| WO | 2019/165289 | A1 | 8/2019 |
| WO | 2019/165294 | A1 | 8/2019 |
| WO | 2020/013890 | A2 | 1/2020 |

OTHER PUBLICATIONS

European Search Report, dated Jul. 17, 2020, for EP Application No. 18776977.3, 12 pages.

European Search Report, dated Jun. 17, 2021, for EP Application No. 18868896.4, 7 pages.

Extended European Search Report, dated Jul. 10, 2020, for EP Application No. 18736738.8, 9 pages.

Extended European Search Report, dated Jul. 22, 2020, for EP Application No. 18736685.1, 10 pages.

Fiber laser, Wikipedia, https://en.wikipedia.org/wiki/Fiber_laser, 6 pages.

Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.

Goldstein, R. (Apr. 1986) "Electro-Optic Devices in Review, the Linear Electro-Optic (Pockels) Effect Forms the Basis for a Family of Active Devices," Laser & Applications, FastPulse Technology, Inc., 6 pages.

Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.

International Preliminary Report on Patentability, dated Apr. 30, 2020, for International Application No. PCT/US2018/056577, 8 pages.

International Preliminary Report on Patentability, dated Jul. 9, 2019, for International Application No. PCT/US2018/012703, 10 pages.

International Preliminary Report on Patentability, dated Jul. 9, 2019, for International Application No. PCT/US2018/012704, 7 pages.

International Preliminary Report on Patentability, dated Jul. 9, 2019, for International Application No. PCT/US2018/012705, 7 pages.

International Search Report and Written Opinion, dated Jan. 17, 2020, for International Application No. PCT/US2019/019276, 14 pages.

International Search Report and Written Opinion, dated Jan. 3, 2019, for International Application No. PCT/US2018/056577, 15 pages.

International Search Report and Written Opinion, dated Jul. 9, 2019, for International Application No. PCT/US2019/018987, 17 pages.

International Search Report and Written Opinion, dated Jun. 7, 2018, for International Application No. PCT/US2018/024185, 9 pages.

International Search Report and Written Opinion, dated Mar. 19, 2018, for International Application No. PCT/US2018/012705, 12 pages.

International Search Report and Written Opinion, dated Mar. 20, 2018, for International Application No. PCT/US2018/012703, 13 pages.

International Search Report and Written Opinion, dated Mar. 23, 2018, for International Application No. PCT/US2018/012704, 12 pages.

International Search Report and Written Opinion, dated May 3, 2019, for International Application No. PCT/US2019/019272, 16 pages.

International Search Report and Written Opinion, dated May 6, 2019, for International Application No. PCT/US2019/019264, 15 pages.

International Search Report and Written Opinion, dated Sep. 18, 2018, for International Application No. PCT/US2018/012116, 12 pages.

Mirrors, Physics LibreTexts, https://phys.libretexts.org/Bookshelves/Optics/Supplemental_Modules_(Components)/Mirrors, (2021), 2 pages.

Office Action Issued in Japanese Patent Application No. 2019-536019 dated Nov. 30, 2021, 6 pages.

"Why Wavelengths Matter in Fiber Optics", FirstLight, https://www.firstlight.net/why-wavelengths-matter-in-fiber-optics/, (2021), 5 pages.

International Search Report and Written Opinion, dated Dec. 19, 2023, for International Application No. PCT/US2023/033902, 13 pages.

* cited by examiner

COMPACT LiDAR SYSTEM WITH METALENSES

CROSS-REFERENCE TO RELATED APPLICATIONS

This application claims priority to U.S. Provisional Patent Application Ser. No. 63/410,608, filed Sep. 27, 2022, entitled "COMPACT LIDAR SYSTEM WITH METALENSES," the content of which is hereby incorporated by reference in its entirety for all purposes.

FIELD OF THE TECHNOLOGY

This disclosure relates generally to a light ranging and detection (LiDAR) system, and more particularly, to a compact LiDAR system using metasurface-based lenses, also referred to as Metalenses.

BACKGROUND

Light detection and ranging (LiDAR) systems use light pulses to create an image or point cloud of the external environment. A LiDAR system may be a scanning or non-scanning system. Some typical scanning LiDAR systems include a light source, a light transmitter, a light steering system, and a light detector. The light source generates a light beam that is directed by the light steering system in particular directions when being transmitted from the LiDAR system. When a transmitted light beam is scattered or reflected by an object, a portion of the scattered or reflected light returns to the LiDAR system to form a return light pulse. The light detector detects the return light pulse. Using the difference between the time that the return light pulse is detected and the time that a corresponding light pulse in the light beam is transmitted, the LiDAR system can determine the distance to the object based on the speed of light. This technique of determining the distance is referred to as the time-of-flight (ToF) technique. The light steering system can direct light beams along different paths to allow the LiDAR system to scan the surrounding environment and produce images or point clouds. A typical non-scanning LiDAR system illuminates an entire field-of-view (FOV) rather than scanning through the FOV. An example of the non-scanning LiDAR system is a flash LiDAR, which can also use the ToF technique to measure the distance to an object. LiDAR systems can also use techniques other than time-of-flight and scanning to measure the surrounding environment.

SUMMARY

Transceivers in current LiDAR systems are often designed with optical lenses or lens groups, such as glass-based lenses. To provide a large receiving aperture for a large FOV coverage (e.g., a horizontal FOV of 120° or more, and/or a vertical FOV of 70° or more), the sizes of these optical lenses are often significant. Metalenses are optical components that use metasurfaces to direct light (e.g., focus light). A Metalens is sometimes also referred to as metamaterial lens, which is an advanced type of lens that uses metamaterials to manipulate and control light in specific ways. For instance, Metalenses can achieve the same focusing and collimation functions with a flat geometry, thereby significantly reducing the thickness or overall dimensions of a LiDAR system compared to a system using glass-based lenses or lens groups. Moreover, Metalenses are capable of being mass produced using well-developed Silicon wafer manufacturing processes. Metalenses can also potentially compete with conventional aspheric lenses on production costs, enabling more compact and cost-effective LiDAR systems.

In one embodiment, a light ranging and detection (LiDAR) system comprising one or more metasurface-based optics is provided. The system comprises a transmitter comprising one or more transmitter optics. The transmitter is configured to provide one or more transmission light beams. The system further comprises a beam steering apparatus optically coupled to the transmitter. The beam steering apparatus comprises one or more steering optics configured to: scan the one or more transmission light beams in at least one of a horizontal and a vertical directions to a field-of-view, and direct return light generated based on the scanned one or more transmission light beams. The system further comprises a receiver comprising one or more receiver optics. The receiver is configured to receive the return light directed by the beam steering apparatus. At least one of the one or more transmitter optics, the one or more steering optics, and the one or more receiver optics comprise the one or more metasurface-based optics. At least one of the metasurface-based optics has subwavelength structures disposed on a semiconductor wafer substrate. Features of the subwavelength structures have sizes smaller than an operational wavelength of the LiDAR system.

BRIEF DESCRIPTION OF THE DRAWINGS

The present application can be best understood by reference to the embodiments described below taken in conjunction with the accompanying drawing figures, in which like parts may be referred to by like numerals.

DETAILED DESCRIPTION

Figure 1:
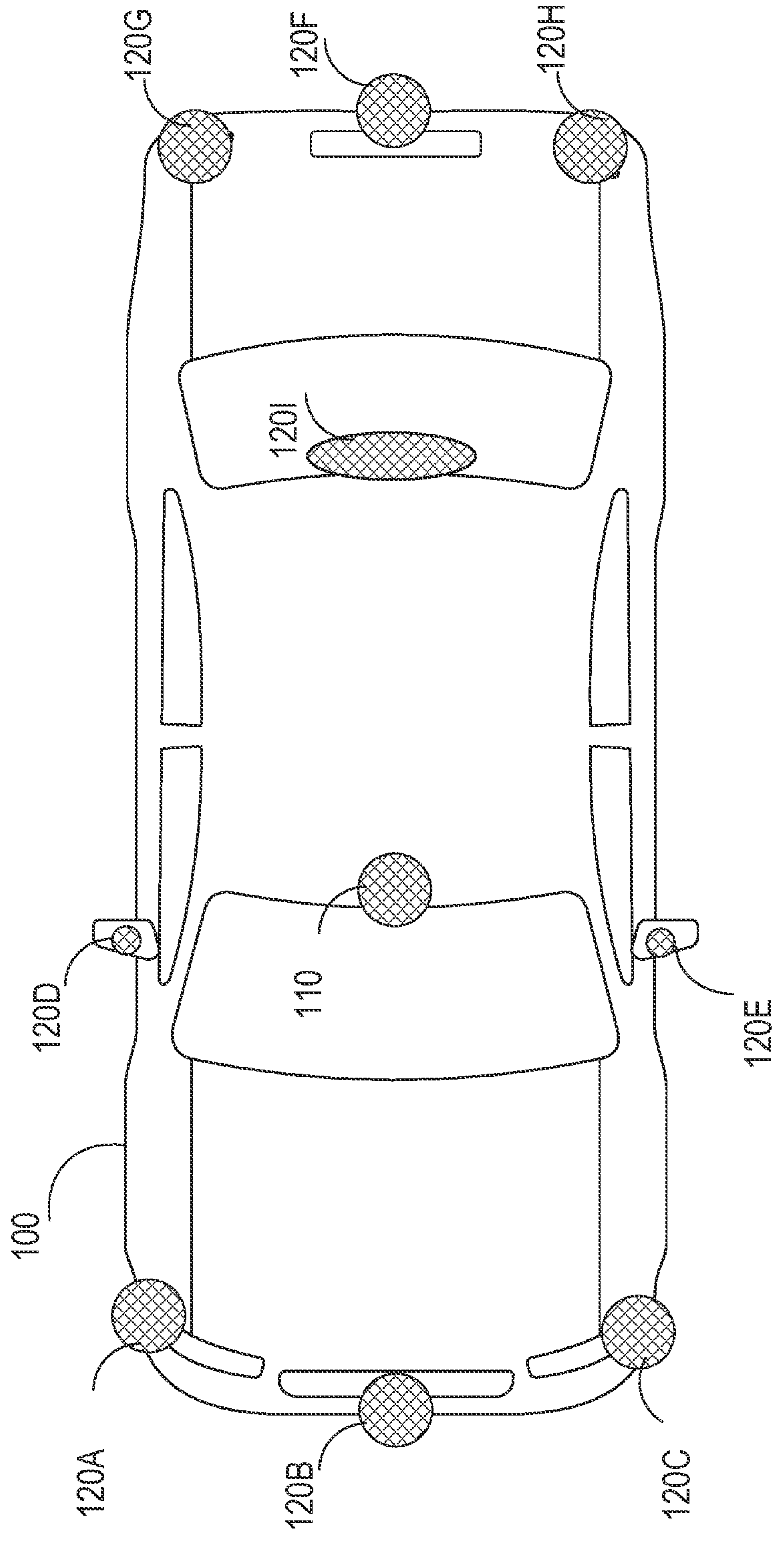
FIG. 1 illustrates one or more example LiDAR systems disposed or included in a motor vehicle.

To provide a more thorough understanding of various embodiments of the present invention, the following description sets forth numerous specific details, such as specific configurations, parameters, examples, and the like. It should be recognized, however, that such description is not intended as a limitation on the scope of the present invention but is intended to provide a better description of the exemplary embodiments.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the disclosure may be readily combined, without departing from the scope or spirit of the invention.

As used herein, the term "or" is an inclusive "or" operator and is equivalent to the term "and/or," unless the context clearly dictates otherwise.

The term "based on" is not exclusive and allows for being based on additional factors not described unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices. The components or devices can be optical, mechanical, and/or electrical devices.

Although the following description uses terms "first," "second," etc. to describe various elements, these elements should not be limited by the terms. These terms are only used to distinguish one element from another. For example, a first Metalens could be termed a second Metalens and, similarly, a second Metalens could be termed a first Metalens, without departing from the scope of the various described examples. The first Metalens and the second Metalens can both be sensors and, in some cases, can be separate and different sensors.

In addition, throughout the specification, the meaning of "a", "an", and "the" includes plural references, and the meaning of "in" includes "in" and "on".

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

As used in the description herein and throughout the claims that follow, when a system, engine, server, device, module, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices or network platforms, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, or any other volatile or non-volatile storage devices). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

Transceivers in current LiDAR systems are designed with typical optical lenses and lens groups. To provide a large receiving aperture for achieving a large FOV coverage (e.g., a horizontal FOV of 120° or more, and/or a vertical FOV of 70° or more), the sizes of these optical lenses or lens groups are often significant. Metalenses are optical components that use metasurfaces to direct light (e.g., focus light). A Metalens is sometimes also referred to as a metamaterial lens, which is an advanced type of lens that uses metamaterials to manipulate and control light in specific ways. Metamaterials have subwavelength structures, which have specific electromagnetic properties. The subwavelength structures of Metalenses can be designed to have specific patterns that can manipulate the behavior of light and other electromagnetic waves.

Typical optical lenses, such as the glass-based lenses, rely on the curvature of their surfaces to focus light. Metalenses, on the other hand, are flat and composed of an array of subwavelength structures, which can interact with light in ways that typical optical lenses can or cannot. This allows Metalenses to overcome certain deficiencies and limitations of conventional optical lenses, such as chromatic aberration (color distortion) and bulkiness.

For instance, Metalenses can be designed to focus light based on its wavelength, polarization, and other properties. They offer the potential for compact and lightweight optics in various applications, such as LiDAR systems and other imaging systems. Because Metalenses are made using nanoscale fabrication techniques, they can be more easily integrated into various devices, systems, and platforms compared to conventional optical lenses.

In some examples, Metalenses can achieve the same focusing and collimation function with a flat geometry, thereby significantly reducing the thickness or overall dimensions of a LiDAR system compared to a system using glass-based lenses or lens groups. Moreover, Metalenses are capable of being mass produced using well-developed Silicon wafer manufacturing processes. Metalenses can also potentially compete with conventional aspheric lenses on production costs, enabling more compact and cost-effective LiDAR systems.

In this disclosure, a lens can be a glass-based optical lens or a metasurface-based lens (Metalens). Similarly, a mirror can be a conventional optical mirror or a metasurface-based mirror (Metamirror). Other optical components can also be conventional glass-based optics or metasurface-based optics, unless otherwise specified.

Embodiments of present invention are described below. In various embodiments of the present invention, a light ranging and detection (LiDAR) system comprising one or more metasurface-based lenses (Metalenses) is provided. The system comprises a transmitter comprising one or more transmitter optics. The transmitter is configured to provide one or more transmission light beams. The system further comprises a beam steering apparatus optically coupled to the transmitter. The beam steering apparatus comprises one or more steering optics configured to: scan the one or more transmission light beams in at least one of a horizontal and a vertical directions to a field-of-view, and direct return light generated based on the scanned one or more transmission light beams. The system further comprises a receiver comprising one or more receiver optics. The receiver is configured to receive the return light directed by the beam steering apparatus. At least one of the one or more transmitter optics, the one or more steering optics, and the one or more receiver optics comprise the one or more metasurface-based lenses (Metalens). A Metalens of the one or more Metalenses comprises subwavelength structures disposed on a semiconductor wafer substrate, wherein the subwavelength structures are preconfigured to modulate light according to optical requirements of the LiDAR system.

FIG. 1 illustrates one or more example LiDAR systems 110 and 120A-120I disposed or included in a motor vehicle 100. Vehicle 100 can be a car, a sport utility vehicle (SUV), a truck, a train, a wagon, a bicycle, a motorcycle, a tricycle, a bus, a mobility scooter, a tram, a ship, a boat, an underwater vehicle, an airplane, a helicopter, an unmanned aviation vehicle (UAV), a spacecraft, etc. Motor vehicle 100 can be a vehicle having any automated level. For example, motor vehicle 100 can be a partially automated vehicle, a highly automated vehicle, a fully automated vehicle, or a driverless vehicle. A partially automated vehicle can perform some driving functions without a human driver's intervention. For example, a partially automated vehicle can perform blind-spot monitoring, lane keeping and/or lane changing operations, automated emergency braking, smart cruising and/or traffic following, or the like. Certain operations of a partially automated vehicle may be limited to specific applications or driving scenarios (e.g., limited to only freeway driving). A highly automated vehicle can generally perform all operations of a partially automated vehicle but with less limitations. A highly automated vehicle can also detect its own limits in operating the vehicle and ask the driver to take over the control of the vehicle when necessary. A fully automated vehicle can perform all vehicle operations without a driver's intervention but can also detect its own limits and ask the driver to take over when necessary. A driverless vehicle can operate on its own without any driver intervention.

In typical configurations, motor vehicle 100 comprises one or more LiDAR systems 110 and 120A-120I. Each of LiDAR systems 110 and 120A-120I can be a scanning-based LiDAR system and/or a non-scanning LiDAR system (e.g., a flash LiDAR). A scanning-based LiDAR system scans one or more light beams in one or more directions (e.g., horizontal and vertical directions) to detect objects in a field-of-view (FOV). A non-scanning based LiDAR system transmits laser light to illuminate an FOV without scanning. For example, a flash LiDAR is a type of non-scanning based LiDAR system. A flash LiDAR can transmit laser light to simultaneously illuminate an FOV using a single light pulse or light shot.

A LiDAR system is a frequently-used sensor of a vehicle that is at least partially automated. In one embodiment, as shown in FIG. 1, motor vehicle 100 may include a single LiDAR system 110 (e.g., without LiDAR systems 120A-120I) disposed at the highest position of the vehicle (e.g., at the vehicle roof). Disposing LiDAR system 110 at the vehicle roof facilitates a 360-degree scanning around vehicle 100. In some other embodiments, motor vehicle 100 can include multiple LiDAR systems, including two or more of systems 110 and/or 120A-120I. As shown in FIG. 1, in one embodiment, multiple LiDAR systems 110 and/or 120A-120I are attached to vehicle 100 at different locations of the vehicle. For example, LiDAR system 120A is attached to vehicle 100 at the front right corner; LiDAR system 120B is attached to vehicle 100 at the front center position; LiDAR system 120C is attached to vehicle 100 at the front left corner; LiDAR system 120D is attached to vehicle 100 at the right-side rear view mirror; LiDAR system 120E is attached to vehicle 100 at the left-side rear view mirror; LiDAR system 120F is attached to vehicle 100 at the back center position; LiDAR system 120G is attached to vehicle 100 at the back right corner; LiDAR system 120H is attached to vehicle 100 at the back left corner; and/or LiDAR system 120I is attached to vehicle 100 at the center towards the backend (e.g., back end of the vehicle roof). It is understood that one or more LiDAR systems can be distributed and attached to a vehicle in any desired manner and FIG. 1 only illustrates one embodiment. As another example, LiDAR systems 120D and 120E may be attached to the B-pillars of vehicle 100 instead of the rear-view mirrors. As another example, LiDAR system 120B may be attached to the windshield of vehicle 100 instead of the front bumper.

In some embodiments, LiDAR systems 110 and 120A-120I are independent LiDAR systems having their own respective laser sources, control electronics, transmitters, receivers, and/or steering mechanisms. In other embodiments, some of LiDAR systems 110 and 120A-120I can share one or more components, thereby forming a distributed sensor system. In one example, optical fibers are used to deliver laser light from a centralized laser source to all LiDAR systems. For instance, system 110 (or another system that is centrally positioned or positioned anywhere inside the vehicle 100) includes a light source, a transmitter, and a light detector, but has no steering mechanisms. System 110 may distribute transmission light to each of systems 120A-120I. The transmission light may be distributed via optical fibers. Optical connectors can be used to couple the optical fibers to each of system 110 and 120A-120I. In some examples, one or more of systems 120A-120I include steering mechanisms but no light sources, transmitters, or light detectors. A steering mechanism may include one or more moveable mirrors such as one or more polygon mirrors, one or more single plane mirrors, one or more multi-plane mirrors, or the like. Embodiments of the light source, transmitter, steering mechanism, and light detector are described in more detail below. Via the steering mechanisms, one or more of systems 120A-120I scan light into one or more respective FOVs and receive corresponding return light. The return light is formed by scattering or reflecting the transmission light by one or more objects in the FOVs. Systems 120A-120I may also include collection lens and/or other optics to focus and/or direct the return light into optical fibers, which deliver the received return light to system 110. System 110 includes one or more light detectors for detecting the received return light. In some examples, system 110 is disposed inside a vehicle such that it is in a temperature-controlled environment, while one or more systems 120A-120I may be at least partially exposed to the external environment.

Figure 2:
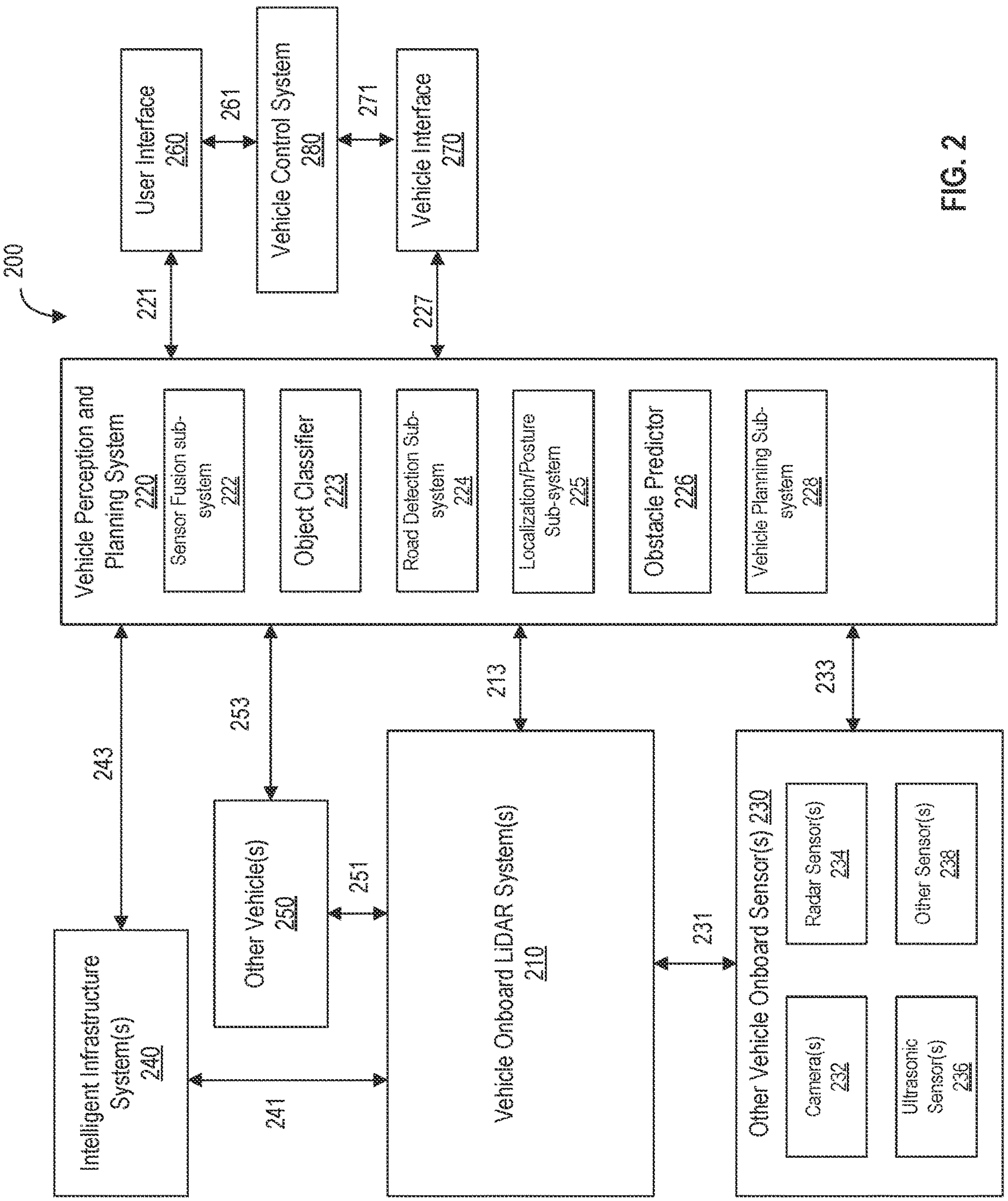
FIG. 2 is a block diagram illustrating interactions between an example LiDAR system and multiple other systems including a vehicle perception and planning system.

FIG. 2 is a block diagram 200 illustrating interactions between vehicle onboard LiDAR system(s) 210 and multiple other systems including a vehicle perception and planning system 220. LiDAR system(s) 210 can be mounted on or integrated to a vehicle. LiDAR system(s) 210 include sensor(s) that scan laser light to the surrounding environment to measure the distance, angle, and/or velocity of objects. Based on the scattered light that returned to LiDAR system(s) 210, it can generate sensor data (e.g., image data or 3D point cloud data) representing the perceived external environment.

LiDAR system(s) 210 can include one or more of short-range LiDAR sensors, medium-range LiDAR sensors, and long-range LiDAR sensors. A short-range LiDAR sensor measures objects located up to about 20-50 meters from the LiDAR sensor. Short-range LiDAR sensors can be used for, e.g., monitoring nearby moving objects (e.g., pedestrians crossing street in a school zone), parking assistance applications, or the like. A medium-range LiDAR sensor measures objects located up to about 70-200 meters from the LiDAR sensor. Medium-range LiDAR sensors can be used for, e.g., monitoring road intersections, assistance for merging onto or leaving a freeway, or the like. A long-range LiDAR sensor measures objects located up to about 200 meters and beyond. Long-range LiDAR sensors are typically used when a vehicle is travelling at a high speed (e.g., on a freeway), such that the vehicle's control systems may only have a few seconds (e.g., 6-8 seconds) to respond to any situations detected by the LiDAR sensor. As shown in FIG. 2, in one embodiment, the LiDAR sensor data can be provided to vehicle perception and planning system 220 via a communication path 213 for further processing and controlling the vehicle operations. Communication path 213 can be any wired or wireless communication links that can transfer data.

With reference still to FIG. 2, in some embodiments, other vehicle onboard sensor(s) 230 are configured to provide additional sensor data separately or together with LiDAR system(s) 210. Other vehicle onboard sensors 230 may include, for example, one or more camera(s) 232, one or more radar(s) 234, one or more ultrasonic sensor(s) 236, and/or other sensor(s) 238. Camera(s) 232 can take images and/or videos of the external environment of a vehicle. Camera(s) 232 can take, for example, high-definition (HD) videos having millions of pixels in each frame. A camera includes image sensors that facilitate producing monochrome or color images and videos. Color information may be important in interpreting data for some situations (e.g., interpreting images of traffic lights). Color information may not be available from other sensors such as LiDAR or radar sensors. Camera(s) 232 can include one or more of narrow-focus cameras, wider-focus cameras, side-facing cameras, infrared cameras, fisheye cameras, or the like. The image and/or video data generated by camera(s) 232 can also be provided to vehicle perception and planning system 220 via communication path 233 for further processing and controlling the vehicle operations. Communication path 233 can be any wired or wireless communication links that can transfer data. Camera(s) 232 can be mounted on, or integrated to, a vehicle at any location (e.g., rear-view mirrors, pillars, front grille, and/or back bumpers, etc.).

Other vehicle onboard sensos(s) 230 can also include radar sensor(s) 234. Radar sensor(s) 234 use radio waves to determine the range, angle, and velocity of objects. Radar sensor(s) 234 produce electromagnetic waves in the radio or microwave spectrum. The electromagnetic waves reflect off an object and some of the reflected waves return to the radar sensor, thereby providing information about the object's position and velocity. Radar sensor(s) 234 can include one or more of short-range radar(s), medium-range radar(s), and long-range radar(s). A short-range radar measures objects located at about 0.1-30 meters from the radar. A short-range radar is useful in detecting objects located near the vehicle, such as other vehicles, buildings, walls, pedestrians, bicyclists, etc. A short-range radar can be used to detect a blind spot, assist in lane changing, provide rear-end collision warning, assist in parking, provide emergency braking, or the like. A medium-range radar measures objects located at about 30-80 meters from the radar. A long-range radar measures objects located at about 80-200 meters. Medium- and/or long-range radars can be useful in, for example, traffic following, adaptive cruise control, and/or highway automatic braking. Sensor data generated by radar sensor(s) 234 can also be provided to vehicle perception and planning system 220 via communication path 233 for further processing and controlling the vehicle operations. Radar sensor(s) 234 can be mounted on, or integrated to, a vehicle at any location (e.g., rear-view mirrors, pillars, front grille, and/or back bumpers, etc.).

Other vehicle onboard sensor(s) 230 can also include ultrasonic sensor(s) 236. Ultrasonic sensor(s) 236 use acoustic waves or pulses to measure objects located external to a vehicle. The acoustic waves generated by ultrasonic sensor(s) 236 are transmitted to the surrounding environment. At least some of the transmitted waves are reflected off an object and return to the ultrasonic sensor(s) 236. Based on the return signals, a distance of the object can be calculated. Ultrasonic sensor(s) 236 can be useful in, for example, checking blind spots, identifying parking spaces, providing lane changing assistance into traffic, or the like. Sensor data generated by ultrasonic sensor(s) 236 can also be provided to vehicle perception and planning system 220 via communication path 233 for further processing and controlling the vehicle operations. Ultrasonic sensor(s) 236 can be mount on, or integrated to, a vehicle at any location (e.g., rear-view mirrors, pillars, front grille, and/or back bumpers, etc.).

In some embodiments, one or more other sensor(s) 238 may be attached in a vehicle and may also generate sensor data. Other sensor(s) 238 may include, for example, global positioning systems (GPS), inertial measurement units (IMU), or the like. Sensor data generated by other sensor(s) 238 can also be provided to vehicle perception and planning system 220 via communication path 233 for further processing and controlling the vehicle operations. It is understood that communication path 233 may include one or more communication links to transfer data between the various sensor(s) 230 and vehicle perception and planning system 220.

In some embodiments, as shown in FIG. 2, sensor data from other vehicle onboard sensor(s) 230 can be provided to vehicle onboard LiDAR system(s) 210 via communication path 231. LiDAR system(s) 210 may process the sensor data from other vehicle onboard sensor(s) 230. For example, sensor data from camera(s) 232, radar sensor(s) 234, ultrasonic sensor(s) 236, and/or other sensor(s) 238 may be correlated or fused with sensor data LiDAR system(s) 210, thereby at least partially offloading the sensor fusion process performed by vehicle perception and planning system 220. It is understood that other configurations may also be implemented for transmitting and processing sensor data from the various sensors (e.g., data can be transmitted to a cloud or edge computing service provider for processing and then the processing results can be transmitted back to the vehicle perception and planning system 220 and/or LiDAR system 210).

With reference still to FIG. 2, in some embodiments, sensors onboard other vehicle(s) 250 are used to provide additional sensor data separately or together with LiDAR system(s) 210. For example, two or more nearby vehicles may have their own respective LiDAR sensor(s), camera(s), radar sensor(s), ultrasonic sensor(s), etc. Nearby vehicles can communicate and share sensor data with one another. Communications between vehicles are also referred to as V2V (vehicle to vehicle) communications. For example, as shown in FIG. 2, sensor data generated by other vehicle(s) 250 can be communicated to vehicle perception and planning system 220 and/or vehicle onboard LiDAR system(s) 210, via communication path 253 and/or communication path 251, respectively. Communication paths 253 and 251 can be any wired or wireless communication links that can transfer data.

Sharing sensor data facilitates a better perception of the environment external to the vehicles. For instance, a first vehicle may not sense a pedestrian that is behind a second vehicle but is approaching the first vehicle. The second vehicle may share the sensor data related to this pedestrian with the first vehicle such that the first vehicle can have additional reaction time to avoid collision with the pedestrian. In some embodiments, similar to data generated by sensor(s) 230, data generated by sensors onboard other vehicle(s) 250 may be correlated or fused with sensor data generated by LiDAR system(s) 210 (or with other LiDAR systems located in other vehicles), thereby at least partially offloading the sensor fusion process performed by vehicle perception and planning system 220.

In some embodiments, intelligent infrastructure system(s) 240 are used to provide sensor data separately or together with LiDAR system(s) 210. Certain infrastructures may be configured to communicate with a vehicle to convey information and vice versa. Communications between a vehicle and infrastructures are generally referred to as V2I (vehicle to infrastructure) communications. For example, intelligent infrastructure system(s) 240 may include an intelligent traffic light that can convey its status to an approaching vehicle in a message such as "changing to yellow in 5 seconds." Intelligent infrastructure system(s) 240 may also include its own LiDAR system mounted near an intersection such that it can convey traffic monitoring information to a vehicle. For example, a left-turning vehicle at an intersection may not have sufficient sensing capabilities because some of its own sensors may be blocked by traffic in the opposite direction. In such a situation, sensors of intelligent infrastructure system(s) 240 can provide useful data to the left-turning vehicle. Such data may include, for example, traffic conditions, information of objects in the direction the vehicle is turning to, traffic light status and predictions, or the like. These sensor data generated by intelligent infrastructure system(s) 240 can be provided to vehicle perception and planning system 220 and/or vehicle onboard LiDAR system(s) 210, via communication paths 243 and/or 241, respectively. Communication paths 243 and/or 241 can include any wired or wireless communication links that can transfer data. For example, sensor data from intelligent infrastructure system(s) 240 may be transmitted to LiDAR system(s) 210 and correlated or fused with sensor data generated by LiDAR system(s) 210, thereby at least partially offloading the sensor fusion process performed by vehicle perception and planning system 220. V2V and V2I communications described above are examples of vehicle-to-X (V2X) communications, where the "X" represents any other devices, systems, sensors, infrastructure, or the like that can share data with a vehicle.

With reference still to FIG. 2, via various communication paths, vehicle perception and planning system 220 receives sensor data from one or more of LiDAR system(s) 210, other vehicle onboard sensor(s) 230, other vehicle(s) 250, and/or intelligent infrastructure system(s) 240. In some embodiments, different types of sensor data are correlated and/or integrated by a sensor fusion sub-system 222. For example, sensor fusion sub-system 222 can generate a 360-degree model using multiple images or videos captured by multiple cameras disposed at different positions of the vehicle. Sensor fusion sub-system 222 obtains sensor data from different types of sensors and uses the combined data to perceive the environment more accurately. For example, a vehicle onboard camera 232 may not capture a clear image because it is facing the sun or a light source (e.g., another vehicle's headlight during nighttime) directly. A LiDAR system 210 may not be affected as much and therefore sensor fusion sub-system 222 can combine sensor data provided by both camera 232 and LiDAR system 210, and use the sensor data provided by LiDAR system 210 to compensate the unclear image captured by camera 232. As another example, in a rainy or foggy weather, a radar sensor 234 may work better than a camera 232 or a LiDAR system 210. Accordingly, sensor fusion sub-system 222 may use sensor data provided by the radar sensor 234 to compensate the sensor data provided by camera 232 or LiDAR system 210.

In other examples, sensor data generated by other vehicle onboard sensor(s) 230 may have a lower resolution (e.g., radar sensor data) and thus may need to be correlated and confirmed by LiDAR system(s) 210, which usually has a higher resolution. For example, a sewage cover (also referred to as a manhole cover) may be detected by radar sensor 234 as an object towards which a vehicle is approaching. Due to the low-resolution nature of radar sensor 234, vehicle perception and planning system 220 may not be able to determine whether the object is an obstacle that the vehicle needs to avoid. High-resolution sensor data generated by LiDAR system(s) 210 thus can be used to correlated and confirm that the object is a sewage cover and causes no harm to the vehicle.

Vehicle perception and planning system 220 further comprises an object classifier 223. Using raw sensor data and/or correlated/fused data provided by sensor fusion sub-system 222, object classifier 223 can use any computer vision techniques to detect and classify the objects and estimate the positions of the objects. In some embodiments, object classifier 223 can use machine-learning based techniques to detect and classify objects. Examples of the machine-learning based techniques include utilizing algorithms such as region-based convolutional neural networks (R-CNN), Fast R-CNN, Faster R-CNN, histogram of oriented gradients (HOG), region-based fully convolutional network (R-FCN), single shot detector (SSD), spatial pyramid pooling (SPP-net), and/or You Only Look Once (Yolo).

Vehicle perception and planning system 220 further comprises a road detection sub-system 224. Road detection sub-system 224 localizes the road and identifies objects and/or markings on the road. For example, based on raw or fused sensor data provided by radar sensor(s) 234, camera(s) 232, and/or LiDAR system(s) 210, road detection sub-system 224 can build a 3D model of the road based on machine-learning techniques (e.g., pattern recognition algorithms for identifying lanes). Using the 3D model of the road, road detection sub-system 224 can identify objects (e.g., obstacles or debris on the road) and/or markings on the road (e.g., lane lines, turning marks, crosswalk marks, or the like).

Vehicle perception and planning system 220 further comprises a localization and vehicle posture sub-system 225. Based on raw or fused sensor data, localization and vehicle posture sub-system 225 can determine position of the vehicle and the vehicle's posture. For example, using sensor data from LiDAR system(s) 210, camera(s) 232, and/or GPS data, localization and vehicle posture sub-system 225 can determine an accurate position of the vehicle on the road and the vehicle's six degrees of freedom (e.g., whether the vehicle is moving forward or backward, up or down, and left or right). In some embodiments, high-definition (HD) maps are used for vehicle localization. HD maps can provide highly detailed, three-dimensional, computerized maps that pinpoint a vehicle's location. For instance, using the HD maps, localization and vehicle posture sub-system 225 can determine precisely the vehicle's current position (e.g., which lane of the road the vehicle is currently in, how close it is to a curb or a sidewalk) and predict vehicle's future positions.

Vehicle perception and planning system 220 further comprises obstacle predictor 226. Objects identified by object classifier 223 can be stationary (e.g., a light pole, a road sign) or dynamic (e.g., a moving pedestrian, bicycle, another car). For moving objects, predicting their moving path or future positions can be important to avoid collision. Obstacle predictor 226 can predict an obstacle trajectory and/or warn the driver or the vehicle planning sub-system 228 about a potential collision. For example, if there is a high likelihood that the obstacle's trajectory intersects with the vehicle's current moving path, obstacle predictor 226 can generate such a warning. Obstacle predictor 226 can use a variety of techniques for making such a prediction. Such techniques include, for example, constant velocity or acceleration models, constant turn rate and velocity/acceleration models, Kalman Filter and Extended Kalman Filter based models, recurrent neural network (RNN) based models, long short-term memory (LSTM) neural network based models, encoder-decoder RNN models, or the like.

With reference still to FIG. 2, in some embodiments, vehicle perception and planning system 220 further comprises vehicle planning sub-system 228. Vehicle planning sub-system 228 can include one or more planners such as a route planner, a driving behaviors planner, and a motion planner. The route planner can plan the route of a vehicle based on the vehicle's current location data, target location data, traffic information, etc. The driving behavior planner adjusts the timing and planned movement based on how other objects might move, using the obstacle prediction results provided by obstacle predictor 226. The motion planner determines the specific operations the vehicle needs to follow. The planning results are then communicated to vehicle control system 280 via vehicle interface 270. The communication can be performed through communication paths 227 and 271, which include any wired or wireless communication links that can transfer data.

Vehicle control system 280 controls the vehicle's steering mechanism, throttle, brake, etc., to operate the vehicle according to the planned route and movement. In some examples, vehicle perception and planning system 220 may further comprise a user interface 260, which provides a user (e.g., a driver) access to vehicle control system 280 to, for example, override or take over control of the vehicle when necessary. User interface 260 may also be separate from vehicle perception and planning system 220. User interface 260 can communicate with vehicle perception and planning system 220, for example, to obtain and display raw or fused sensor data, identified objects, vehicle's location/posture, etc. These displayed data can help a user to better operate the vehicle. User interface 260 can communicate with vehicle perception and planning system 220 and/or vehicle control system 280 via communication paths 221 and 261 respectively, which include any wired or wireless communication links that can transfer data. It is understood that the various systems, sensors, communication links, and interfaces in FIG. 2 can be configured in any desired manner and not limited to the configuration shown in FIG. 2.

Figure 3:
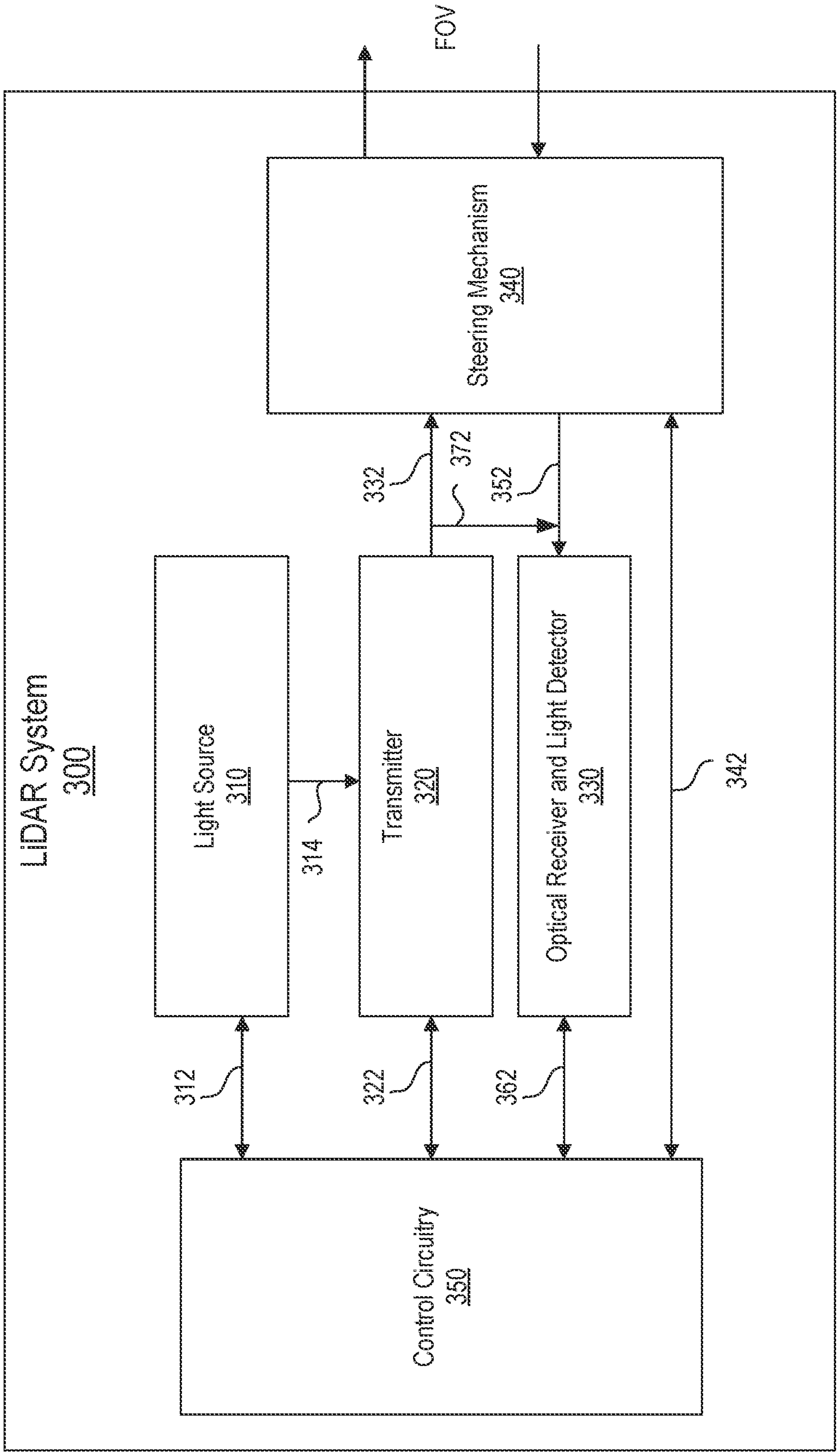
FIG. 3 is a block diagram illustrating an example LiDAR system.

FIG. 3 is a block diagram illustrating an example LiDAR system 300. LiDAR system 300 can be used to implement LiDAR systems 110, 120A-120I, and/or 210 shown in FIGS. 1 and 2. In one embodiment, LiDAR system 300 comprises a light source 310, a transmitter 320, an optical receiver and light detector 330, a steering system 340, and a control circuitry 350. One or more components of transmitter 320, optical receiver and light detector 330, and steering system 340 can be implemented using metasurfaces-based lens or mirrors, as described below. These components are coupled together using communications paths 312, 314, 322, 332, 342, 352, and 362. These communications paths include communication links (wired or wireless, bidirectional or unidirectional) among the various LiDAR system components, but need not be physical components themselves. While the communications paths can be implemented by one or more electrical wires, buses, or optical fibers, the communication paths can also be wireless channels or free-space optical paths so that no physical communication medium is present. For example, in one embodiment of LiDAR system 300, communication path 314 between light source 310 and transmitter 320 may be implemented using one or more optical fibers. Communication paths 332 and 352 may represent optical paths implemented using free space optical components and/or optical fibers. And communication paths 312, 322, 342, and 362 may be implemented using one or more electrical wires that carry electrical signals. The communications paths can also include one or more of the above types of communication mediums (e.g., they can include an optical fiber and a free-space optical component, or include one or more optical fibers and one or more electrical wires).

In some embodiments, LiDAR system 300 can be a coherent LiDAR system. One example is a frequency-modulated continuous-wave (FMCW) LiDAR. Coherent LiDARs detect objects by mixing return light from the objects with light from the coherent laser transmitter. Thus, as shown in FIG. 3, if LiDAR system 300 is a coherent LiDAR, it may include a route 372 providing a portion of transmission light from transmitter 320 to optical receiver and light detector 330. Route 372 may include one or more optics (e.g., optical fibers, lens, mirrors, etc.) for providing the light from transmitter 320 to optical receiver and light detector 330. The transmission light provided by transmitter 320 may be modulated light and can be split into two portions. One portion is transmitted to the FOV, while the second portion is sent to the optical receiver and light detector of the LiDAR system. The second portion is also referred to as the light that is kept local (LO) to the LiDAR system. The transmission light is scattered or reflected by various objects in the FOV and at least a portion of it forms return light. The return light is subsequently detected and interferometrically recombined with the second portion of the transmission light that was kept local. Coherent LiDAR provides a means of optically sensing an object's range as well as its relative velocity along the line-of-sight (LOS).

LiDAR system 300 can also include other components not depicted in FIG. 3, such as power buses, power supplies, LED indicators, switches, etc. Additionally, other communication connections among components may be present, such as a direct connection between light source 310 and optical receiver and light detector 330 to provide a reference signal so that the time from when a light pulse is transmitted until a return light pulse is detected can be accurately measured.

Light source 310 outputs laser light for illuminating objects in a field of view (FOV). The laser light can be infrared light having a wavelength in the range of 700 nm to 1 mm. Light source 310 can be, for example, a semiconductor-based laser (e.g., a diode laser) and/or a fiber-based laser. A semiconductor-based laser can be, for example, an edge emitting laser (EEL), a vertical cavity surface emitting laser (VCSEL), an external-cavity diode laser, a vertical-external-cavity surface-emitting laser, a distributed feedback (DFB) laser, a distributed Bragg reflector (DBR) laser, an interband cascade laser, a quantum cascade laser, a quantum well laser, a double heterostructure laser, or the like. A fiber-based laser is a laser in which the active gain medium is an optical fiber doped with rare-earth elements such as erbium, ytterbium, neodymium, dysprosium, praseodymium, thulium and/or holmium. In some embodiments, a fiber laser is based on double-clad fibers, in which the gain medium forms the core of the fiber surrounded by two layers of cladding. The double-clad fiber allows the core to be pumped with a high-power beam, thereby enabling the laser source to be a high power fiber laser source.

In some embodiments, light source 310 comprises a master oscillator (also referred to as a seed laser) and power amplifier (MOPA). The power amplifier amplifies the output power of the seed laser. The power amplifier can be a fiber amplifier, a bulk amplifier, or a semiconductor optical amplifier. The seed laser can be a diode laser (e.g., a Fabry-Perot cavity laser, a distributed feedback laser), a solid-state bulk laser, or a tunable external-cavity diode laser. In some embodiments, light source 310 can be an optically pumped microchip laser. Microchip lasers are alignment-free monolithic solid-state lasers where the laser crystal is directly contacted with the end mirrors of the laser resonator. A microchip laser is typically pumped with a laser diode (directly or using a fiber) to obtain the desired output power. A microchip laser can be based on neodymium-doped yttrium aluminum garnet ($Y_3Al_5O_{12}$) laser crystals (i.e., Nd:YAG), or neodymium-doped vanadate (i.e., ND:$YVO_4$) laser crystals. In some examples, light source 310 may have multiple amplification stages to achieve a high power gain such that the laser output can have high power, thereby enabling the LiDAR system to have a long scanning range. In some examples, the power amplifier of light source 310 can be controlled such that the power gain can be varied to achieve any desired laser output power.

Figure 4:
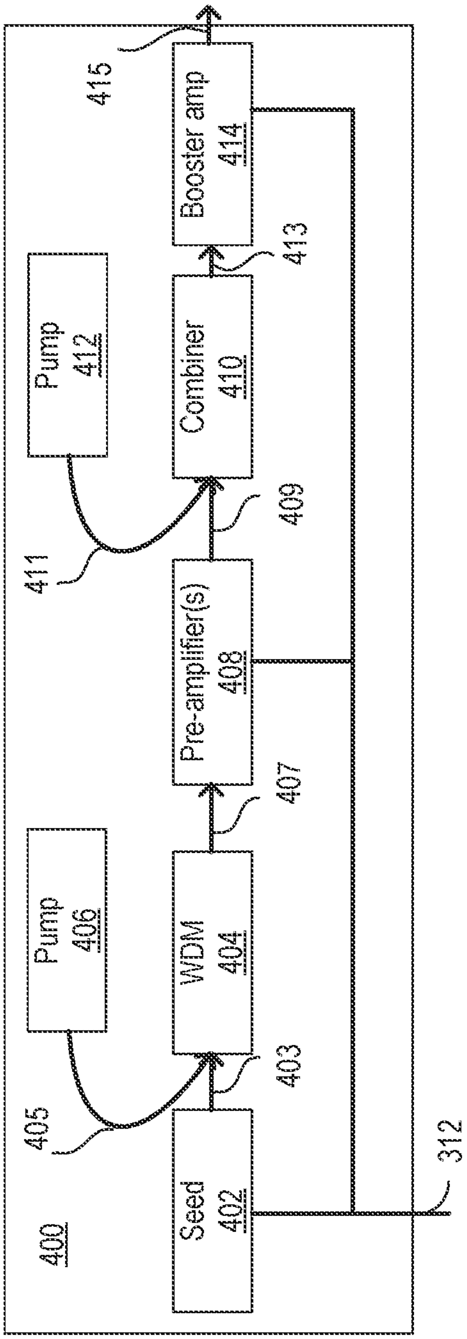
FIG. 4 is a block diagram illustrating an example fiber-based laser source.

FIG. 4 is a block diagram illustrating an example fiber-based laser source 400 having a seed laser and one or more pumps (e.g., laser diodes) for pumping desired output power. Fiber-based laser source 400 is an example of light source 310 depicted in FIG. 3. In some embodiments, fiber-based laser source 400 comprises a seed laser 402 to generate initial light pulses of one or more wavelengths (e.g., infrared wavelengths such as 1550 nm), which are provided to a wavelength-division multiplexor (WDM) 404 via an optical fiber 403. Fiber-based laser source 400 further comprises a pump 406 for providing laser power (e.g., of a different wavelength, such as 980 nm) to WDM 404 via an optical fiber 405. WDM 404 multiplexes the light pulses provided by seed laser 402 and the laser power provided by pump 406 onto a single optical fiber 407. The output of WDM 404 can then be provided to one or more pre-amplifier(s) 408 via optical fiber 407. Pre-amplifier(s) 408 can be optical amplifier(s) that amplify optical signals (e.g., with about 10-30 dB gain). In some embodiments, pre-amplifier(s) 408 are low noise amplifiers. Pre-amplifier(s) 408 output to an optical combiner 410 via an optical fiber 409. Combiner 410 combines the output laser light of pre-amplifier(s) 408 with the laser power provided by pump 412 via an optical fiber 411. Combiner 410 can combine optical signals having the same wavelength or different wavelengths. One example of a combiner is a WDM. Combiner 410 provides combined optical signals to a booster amplifier 414, which produces output light pulses via optical fiber 415. The booster amplifier 414 provides further amplification of the optical signals (e.g., another 20-40 dB). The output light pulses can then be transmitted to transmitter 320 and/or steering mechanism 340 (shown in FIG. 3). It is understood that FIG. 4 illustrates one example configuration of fiber-based laser source 400. Laser source 400 can have many other configurations using different combinations of one or more components shown in FIG. 4 and/or other components not shown in FIG. 4 (e.g., other components such as power supplies, lens(es), filters, splitters, combiners, etc.).

In some variations, fiber-based laser source 400 can be controlled (e.g., by control circuitry 350) to produce pulses of different amplitudes based on the fiber gain profile of the fiber used in fiber-based laser source 400. Communication path 312 couples fiber-based laser source 400 to control circuitry 350 (shown in FIG. 3) so that components of fiber-based laser source 400 can be controlled by or otherwise communicate with control circuitry 350. Alternatively, fiber-based laser source 400 may include its own dedicated controller. Instead of control circuitry 350 communicating directly with components of fiber-based laser source 400, a dedicated controller of fiber-based laser source 400 communicates with control circuitry 350 and controls and/or communicates with the components of fiber-based laser source 400. Fiber-based laser source 400 can also include other components not shown, such as one or more power connectors, power supplies, and/or power lines.

Referencing FIG. 3, typical operating wavelengths of light source 310 comprise, for example, about 850 nm, about 905 nm, about 940 nm, about 1064 nm, and about 1550 nm. For laser safety, the upper limit of maximum usable laser power is set by the U.S. FDA (U.S. Food and Drug Administration) regulations. The optical power limit at 1550 nm wavelength is much higher than those of the other aforementioned wavelengths. Further, at 1550 nm, the optical power loss in a fiber is low. There characteristics of the 1550 nm wavelength make it more beneficial for long-range LiDAR applications. The amount of optical power output from light source 310 can be characterized by its peak power, average power, pulse energy, and/or the pulse energy density. The peak power is the ratio of pulse energy to the width of the pulse (e.g., full width at half maximum or FWHM). Thus, a smaller pulse width can provide a larger peak power for a fixed amount of pulse energy. A pulse width can be in the range of nanosecond or picosecond. The average power is the product of the energy of the pulse and the pulse repetition rate (PRR). As described in more detail below, the PRR represents the frequency of the pulsed laser light. In general, the smaller the time interval between the pulses, the higher the PRR. The PRR typically corresponds to the maximum range that a LiDAR system can measure. Light source 310 can be configured to produce pulses at high PRR to meet the desired number of data points in a point cloud generated by the LiDAR system. Light source 310 can also be configured to produce pulses at medium or low PRR to meet the desired maximum detection distance. Wall plug efficiency (WPE) is another factor to evaluate the total power consumption, which may be a useful indicator in evaluating the laser efficiency. For example, as shown in FIG. 1, multiple LiDAR systems may be attached to a vehicle, which may be an electrical-powered vehicle or a vehicle otherwise having limited fuel or battery power supply. Therefore, high WPE and intelligent ways to use laser power are often among the important considerations when selecting and configuring light source 310 and/or designing laser delivery systems for vehicle-mounted LiDAR applications.

It is understood that the above descriptions provide non-limiting examples of a light source 310. Light source 310 can be configured to include many other types of light sources (e.g., laser diodes, short-cavity fiber lasers, solid-state lasers, and/or tunable external cavity diode lasers) that are configured to generate one or more light signals at various wavelengths. In some examples, light source 310 comprises amplifiers (e.g., pre-amplifiers and/or booster amplifiers), which can be a doped optical fiber amplifier, a solid-state bulk amplifier, and/or a semiconductor optical amplifier. The amplifiers are configured to receive and amplify light signals with desired gains.

With reference back to FIG. 3, LiDAR system 300 further comprises a transmitter 320. Light source 310 provides laser light (e.g., in the form of a laser beam) to transmitter 320. The laser light provided by light source 310 can be amplified laser light with a predetermined or controlled wavelength, pulse repetition rate, and/or power level. Transmitter 320 receives the laser light from light source 310 and transmits the laser light to steering mechanism 340 with low divergence. In some embodiments, transmitter 320 can include, for example, optical components (e.g., lens, fibers, mirrors, etc.) for transmitting one or more laser beams to a field-of-view (FOV) directly or via steering mechanism 340. While FIG. 3 illustrates transmitter 320 and steering mechanism 340 as separate components, they may be combined or integrated as one system in some embodiments. Steering mechanism 340 is described in more detail below.

Laser beams provided by light source 310 may diverge as they travel to transmitter 320. Therefore, transmitter 320 often comprises a collimating lens configured to collect the diverging laser beams and produce more parallel optical beams with reduced or minimum divergence. The collimated optical beams can then be further directed through various optics such as mirrors and lens. A collimating lens may be, for example, a single plano-convex lens or a lens group. The collimating lens can be configured to achieve any desired properties such as the beam diameter, divergence, numerical aperture, focal length, or the like. A beam propagation ratio or beam quality factor (also referred to as the $M^2$ factor) is used for measurement of laser beam quality. In many LiDAR applications, it is important to have good laser beam quality in the generated transmitting laser beam. The $M^2$ factor represents a degree of variation of a beam from an ideal Gaussian beam. Thus, the $M^2$ factor reflects how well a collimated laser beam can be focused on a small spot, or how well a divergent laser beam can be collimated. Therefore, light source 310 and/or transmitter 320 can be configured to meet, for example, a scan resolution requirement while maintaining the desired $M^2$ factor.

One or more of the light beams provided by transmitter 320 are scanned by steering mechanism 340 to a FOV.

Steering mechanism 340 scans light beams in multiple dimensions (e.g., in both the horizontal and vertical dimension) to facilitate LiDAR system 300 to map the environment by generating a 3D point cloud. A horizontal dimension can be a dimension that is parallel to the horizon or a surface associated with the LiDAR system or a vehicle (e.g., a road surface). A vertical dimension is perpendicular to the horizontal dimension (i.e., the vertical dimension forms a 90-degree angle with the horizontal dimension). Steering mechanism 340 will be described in more detail below. The laser light scanned to an FOV may be scattered or reflected by an object in the FOV. At least a portion of the scattered or reflected light forms return light that returns to LiDAR system 300. FIG. 3 further illustrates an optical receiver and light detector 330 configured to receive the return light. Optical receiver and light detector 330 comprises an optical receiver that is configured to collect the return light from the FOV. The optical receiver can include optics (e.g., lens, fibers, mirrors, etc.) for receiving, redirecting, focusing, amplifying, and/or filtering return light from the FOV. For example, the optical receiver often includes a collection lens (e.g., a single plano-convex lens or a lens group) to collect and/or focus the collected return light onto a light detector.

A light detector detects the return light focused by the optical receiver and generates current and/or voltage signals proportional to the incident intensity of the return light. Based on such current and/or voltage signals, the depth information of the object in the FOV can be derived. One example method for deriving such depth information is based on the direct TOF (time of flight), which is described in more detail below. A light detector may be characterized by its detection sensitivity, quantum efficiency, detector bandwidth, linearity, signal to noise ratio (SNR), overload resistance, interference immunity, etc. Based on the applications, the light detector can be configured or customized to have any desired characteristics. For example, optical receiver and light detector 330 can be configured such that the light detector has a large dynamic range while having a good linearity. The light detector linearity indicates the detector's capability of maintaining linear relationship between input optical signal power and the detector's output. A detector having good linearity can maintain a linear relationship over a large dynamic input optical signal range.

To achieve desired detector characteristics, configurations or customizations can be made to the light detector's structure and/or the detector's material system. Various detector structures can be used for a light detector. For example, a light detector structure can be a PIN based structure, which has an undoped intrinsic semiconductor region (i.e., an "i" region) between a p-type semiconductor and an n-type semiconductor region. Other light detector structures comprise, for example, an APD (avalanche photodiode) based structure, a PMT (photomultiplier tube) based structure, a SiPM (Silicon photomultiplier) based structure, a SPAD (single-photon avalanche diode) based structure, and/or quantum wires. For material systems used in a light detector, Si, InGaAs, and/or Si/Ge based materials can be used. It is understood that many other detector structures and/or material systems can be used in optical receiver and light detector 330.

A light detector (e.g., an APD based detector) may have an internal gain such that the input signal is amplified when generating an output signal. However, noise may also be amplified due to the light detector's internal gain. Common types of noise include signal shot noise, dark current shot noise, thermal noise, and amplifier noise. In some embodiments, optical receiver and light detector 330 may include a pre-amplifier that is a low noise amplifier (LNA). In some embodiments, the pre-amplifier may also include a transimpedance amplifier (TIA), which converts a current signal to a voltage signal. For a linear detector system, input equivalent noise or noise equivalent power (NEP) measures how sensitive the light detector is to weak signals. Therefore, they can be used as indicators of the overall system performance. For example, the NEP of a light detector specifies the power of the weakest signal that can be detected and therefore it in turn specifies the maximum range of a LiDAR system. It is understood that various light detector optimization techniques can be used to meet the requirement of LiDAR system 300. Such optimization techniques may include selecting different detector structures, materials, and/or implementing signal processing techniques (e.g., filtering, noise reduction, amplification, or the like). For example, in addition to, or instead of, using direct detection of return signals (e.g., by using ToF), coherent detection can also be used for a light detector. Coherent detection allows for detecting amplitude and phase information of the received light by interfering with the received light with a local oscillator. Coherent detection can improve detection sensitivity and noise immunity.

FIG. 3 further illustrates that LiDAR system 300 comprises steering mechanism 340. As described above, steering mechanism 340 directs light beams from transmitter 320 to scan an FOV in multiple dimensions. A steering mechanism is referred to as a raster mechanism, a scanning mechanism, or simply a light scanner. Scanning light beams in multiple directions (e.g., in both the horizontal and vertical directions) facilitates a LiDAR system to map the environment by generating an image or a 3D point cloud. A steering mechanism can be based on mechanical scanning and/or solid-state scanning. Mechanical scanning uses rotating mirrors to steer the laser beam or physically rotate the LiDAR transmitter and receiver (collectively referred to as transceiver) to scan the laser beam. Solid-state scanning directs the laser beam to various positions through the FOV without mechanically moving any macroscopic components such as the transceiver. Solid-state scanning mechanisms include, for example, optical phased arrays based steering and flash LiDAR based steering. In some embodiments, because solid-state scanning mechanisms do not physically move macroscopic components, the steering performed by a solid-state scanning mechanism may be referred to as effective steering. A LiDAR system using solid-state scanning may also be referred to as a non-mechanical scanning or simply non-scanning LiDAR system (a flash LiDAR system is an example non-scanning LiDAR system).

Steering mechanism 340 can be used with a transceiver (e.g., transmitter 320 and optical receiver and light detector 330) to scan the FOV for generating an image or a 3D point cloud. As an example, to implement steering mechanism 340, a two-dimensional mechanical scanner can be used with a single-point or several single-point transceivers. A single-point transceiver transmits a single light beam or a small number of light beams (e.g., 2-8 beams) to the steering mechanism. A two-dimensional mechanical steering mechanism comprises, for example, polygon mirror(s), oscillating mirror(s), rotating prism(s), rotating tilt mirror surface(s), single-plane or multi-plane mirror(s), or a combination thereof. In some embodiments, steering mechanism 340 may include non-mechanical steering mechanism(s) such as solid-state steering mechanism(s). For example, steering mechanism 340 can be based on tuning wavelength of the laser light combined with refraction effect, and/or based on reconfigurable grating/phase array. In some embodiments, steering mechanism 340 can use a single scanning device to achieve two-dimensional scanning or multiple scanning devices combined to realize two-dimensional scanning.

As another example, to implement steering mechanism 340, a one-dimensional mechanical scanner can be used with an array or a large number of single-point transceivers. Specifically, the transceiver array can be mounted on a rotating platform to achieve 360-degree horizontal field of view. Alternatively, a static transceiver array can be combined with the one-dimensional mechanical scanner. A one-dimensional mechanical scanner comprises polygon mirror(s), oscillating mirror(s), rotating prism(s), rotating tilt mirror surface(s), or a combination thereof, for obtaining a forward-looking horizontal field of view. Steering mechanisms using mechanical scanners can provide robustness and reliability in high volume production for automotive applications.

As another example, to implement steering mechanism 340, a two-dimensional transceiver can be used to generate a scan image or a 3D point cloud directly. In some embodiments, a stitching or micro shift method can be used to improve the resolution of the scan image or the field of view being scanned. For example, using a two-dimensional transceiver, signals generated at one direction (e.g., the horizontal direction) and signals generated at the other direction (e.g., the vertical direction) may be integrated, interleaved, and/or matched to generate a higher or full resolution image or 3D point cloud representing the scanned FOV.

Some implementations of steering mechanism 340 comprise one or more optical redirection elements (e.g., mirrors or lenses) that steer return light signals (e.g., by rotating, vibrating, or directing) along a receive path to direct the return light signals to optical receiver and light detector 330. The optical redirection elements that direct light signals along the transmitting and receiving paths may be the same components (e.g., shared), separate components (e.g., dedicated), and/or a combination of shared and separate components. This means that in some cases the transmitting and receiving paths are different although they may partially overlap (or in some cases, substantially overlap or completely overlap).

With reference still to FIG. 3, LiDAR system 300 further comprises control circuitry 350. Control circuitry 350 can be configured and/or programmed to control various parts of the LiDAR system 300 and/or to perform signal processing. In a typical system, control circuitry 350 can be configured and/or programmed to perform one or more control operations including, for example, controlling light source 310 to obtain the desired laser pulse timing, the pulse repetition rate, and power; controlling steering mechanism 340 (e.g., controlling the speed, direction, and/or other parameters) to scan the FOV and maintain pixel registration and/or alignment; controlling optical receiver and light detector 330 (e.g., controlling the sensitivity, noise reduction, filtering, and/or other parameters) such that it is an optimal state; and monitoring overall system health/status for functional safety (e.g., monitoring the laser output power and/or the steering mechanism operating status for safety).

Control circuitry 350 can also be configured and/or programmed to perform signal processing to the raw data generated by optical receiver and light detector 330 to derive distance and reflectance information, and perform data packaging and communication to vehicle perception and planning system 220 (shown in FIG. 2). For example, control circuitry 350 determines the time it takes from transmitting a light pulse until a corresponding return light pulse is received; determines when a return light pulse is not received for a transmitted light pulse; determines the direction (e.g., horizontal and/or vertical information) for a transmitted/return light pulse; determines the estimated range in a particular direction; derives the reflectivity of an object in the FOV, and/or determines any other type of data relevant to LiDAR system 300.

LiDAR system 300 can be disposed in a vehicle, which may operate in many different environments including hot or cold weather, rough road conditions that may cause intense vibration, high or low humidities, dusty areas, etc. Therefore, in some embodiments, optical and/or electronic components of LiDAR system 300 (e.g., optics in transmitter 320, optical receiver and light detector 330, and steering mechanism 340) are disposed and/or configured in such a manner to maintain long term mechanical and optical stability. For example, components in LiDAR system 300 may be secured and sealed such that they can operate under all conditions a vehicle may encounter. As an example, an anti-moisture coating and/or hermetic sealing may be applied to optical components of transmitter 320, optical receiver and light detector 330, and steering mechanism 340 (and other components that are susceptible to moisture). As another example, housing(s), enclosure(s), fairing(s), and/or window can be used in LiDAR system 300 for providing desired characteristics such as hardness, ingress protection (IP) rating, self-cleaning capability, resistance to chemical and resistance to impact, or the like. In addition, efficient and economical methodologies for assembling LiDAR system 300 may be used to meet the LiDAR operating requirements while keeping the cost low.

It is understood by a person of ordinary skill in the art that FIG. 3 and the above descriptions are for illustrative purposes only, and a LiDAR system can include other functional units, blocks, or segments, and can include variations or combinations of these above functional units, blocks, or segments. For example, LiDAR system 300 can also include other components not depicted in FIG. 3, such as power buses, power supplies, LED indicators, switches, etc. Additionally, other connections among components may be present, such as a direct connection between light source 310 and optical receiver and light detector 330 so that light detector 330 can accurately measure the time from when light source 310 transmits a light pulse until light detector 330 detects a return light pulse.

These components shown in FIG. 3 are coupled together using communications paths 312, 314, 322, 332, 342, 352, and 362. These communications paths represent communication (bidirectional or unidirectional) among the various LiDAR system components but need not be physical components themselves. While the communications paths can be implemented by one or more electrical wires, buses, or optical fibers, the communication paths can also be wireless channels or open-air optical paths so that no physical communication medium is present. For example, in one example LiDAR system, communication path 314 includes one or more optical fibers; communication path 352 represents an optical path; and communication paths 312, 322, 342, and 362 are all electrical wires that carry electrical signals. The communication paths can also include more than one of the above types of communication mediums (e.g., they can include an optical fiber and an optical path, or one or more optical fibers and one or more electrical wires).

Figure 5A:
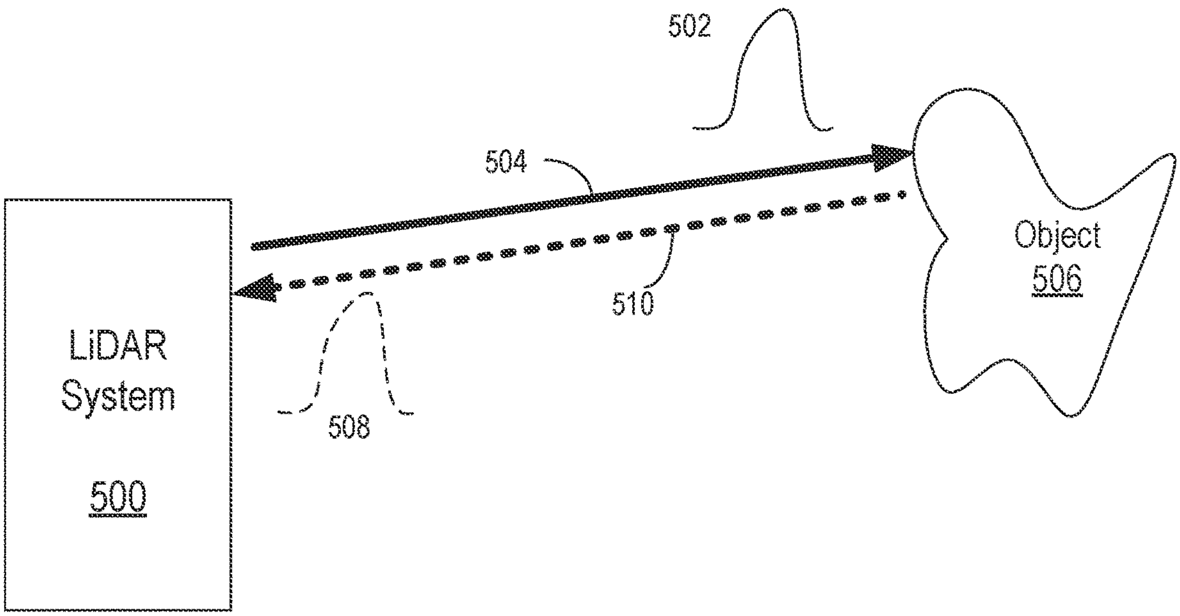
FIGS. 5A-5C illustrate an example LiDAR system using pulse signals to measure distances to objects disposed in a field-of-view (FOV).

As described above, some LiDAR systems use the time-of-flight (ToF) of light signals (e.g., light pulses) to determine the distance to objects in a light path. For example, with reference to FIG. 5A, an example LiDAR system 500 includes a laser light source (e.g., a fiber laser), a steering mechanism (e.g., a system of one or more moving mirrors), and a light detector (e.g., a photodetector with one or more optics). LiDAR system 500 can be implemented using, for example, LiDAR system 300 described above. LiDAR system 500 transmits a light pulse 502 along light path 504 as determined by the steering mechanism of LiDAR system 500. In the depicted example, light pulse 502, which is generated by the laser light source, is a short pulse of laser light. Further, the signal steering mechanism of the LiDAR system 500 is a pulsed-signal steering mechanism. However, it should be appreciated that LiDAR systems can operate by generating, transmitting, and detecting light signals that are not pulsed and derive ranges to an object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulsed signals also may be applicable to LiDAR systems that do not use one or both of these techniques.

Referring back to FIG. 5A (e.g., illustrating a time-of-flight LiDAR system that uses light pulses), when light pulse 502 reaches object 506, light pulse 502 scatters or reflects to form a return light pulse 508. Return light pulse 508 may return to system 500 along light path 510. The time from when transmitted light pulse 502 leaves LiDAR system 500 to when return light pulse 508 arrives back at LiDAR system 500 can be measured (e.g., by a processor or other electronics, such as control circuitry 350, within the LiDAR system). This time-of-flight combined with the knowledge of the speed of light can be used to determine the range/distance from LiDAR system 500 to the portion of object 506 where light pulse 502 scattered or reflected.

Figure 5B:
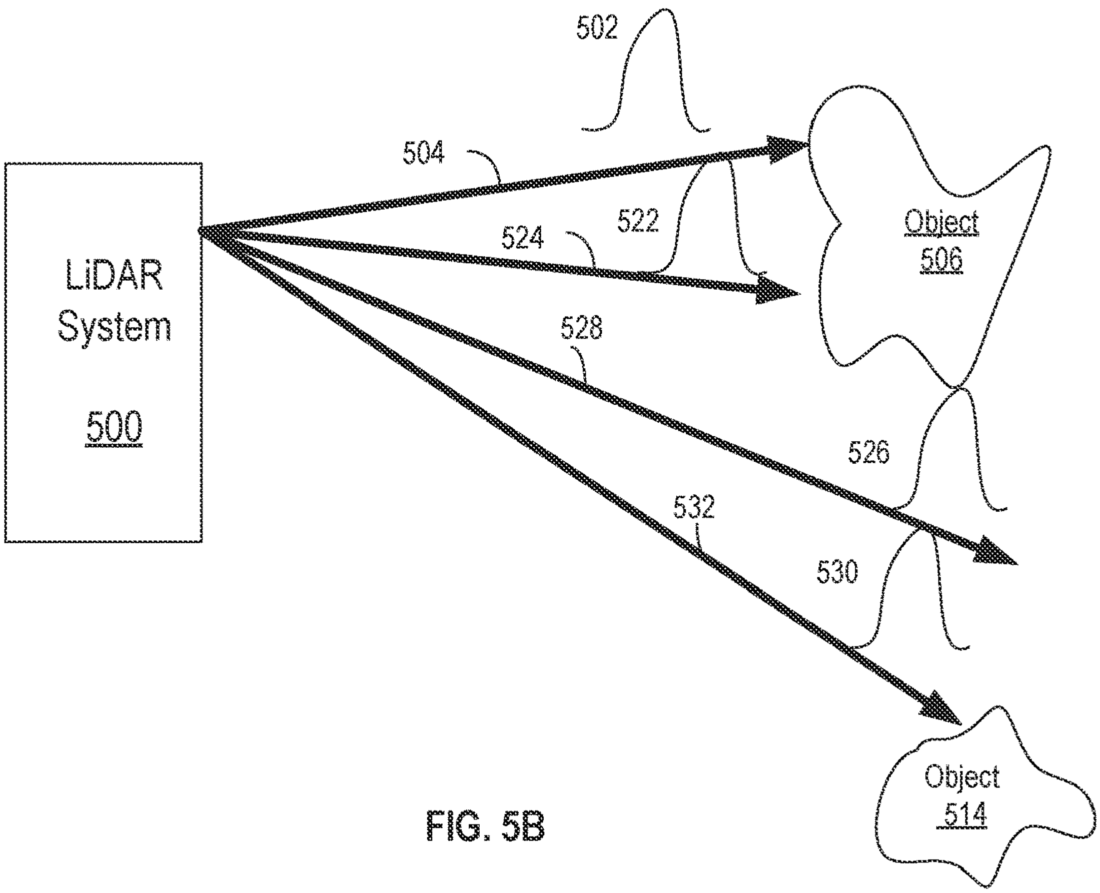
Figure 5C:
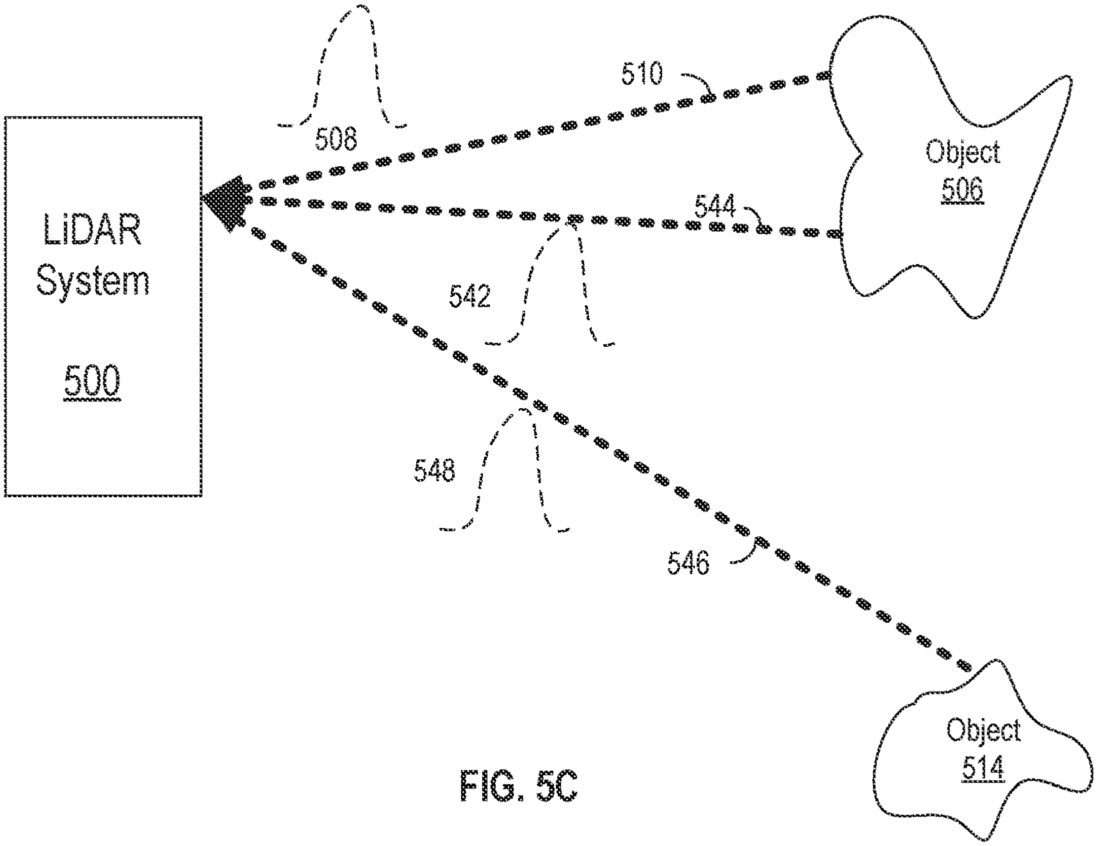

By directing many light pulses, as depicted in FIG. 5B, LiDAR system 500 scans the external environment (e.g., by directing light pulses 502, 522, 526, 530 along light paths 504, 524, 528, 532, respectively). As depicted in FIG. 5C, LiDAR system 500 receives return light pulses 508, 542, 548 (which correspond to transmitted light pulses 502, 522, 530, respectively). Return light pulses 508, 542, and 548 are formed by scattering or reflecting the transmitted light pulses by one of objects 506 and 514. Return light pulses 508, 542, and 548 may return to LiDAR system 500 along light paths 510, 544, and 546, respectively. Based on the direction of the transmitted light pulses (as determined by LiDAR system 500) as well as the calculated range from LiDAR system 500 to the portion of objects that scatter or reflect the light pulses (e.g., the portions of objects 506 and 514), the external environment within the detectable range (e.g., the field of view between path 504 and 532, inclusively) can be precisely mapped or plotted (e.g., by generating a 3D point cloud or images).

If a corresponding light pulse is not received for a particular transmitted light pulse, then LiDAR system 500 may determine that there are no objects within a detectable range of LiDAR system 500 (e.g., an object is beyond the maximum scanning distance of LiDAR system 500). For example, in FIG. 5B, light pulse 526 may not have a corresponding return light pulse (as illustrated in FIG. 5C) because light pulse 526 may not produce a scattering event along its transmission path 528 within the predetermined detection range. LiDAR system 500, or an external system in communication with LiDAR system 500 (e.g., a cloud system or service), can interpret the lack of return light pulse as no object being disposed along light path 528 within the detectable range of LiDAR system 500.

In FIG. 5B, light pulses 502, 522, 526, and 530 can be transmitted in any order, serially, in parallel, or based on other timings with respect to each other. Additionally, while FIG. 5B depicts transmitted light pulses as being directed in one dimension or one plane (e.g., the plane of the paper), LiDAR system 500 can also direct transmitted light pulses along other dimension(s) or plane(s). For example, LiDAR system 500 can also direct transmitted light pulses in a dimension or plane that is perpendicular to the dimension or plane shown in FIG. 5B, thereby forming a 2-dimensional transmission of the light pulses. This 2-dimensional transmission of the light pulses can be point-by-point, line-by-line, all at once, or in some other manner. That is, LiDAR system 500 can be configured to perform a point scan, a line scan, a one-shot without scanning, or a combination thereof. A point cloud or image from a 1-dimensional transmission of light pulses (e.g., a single horizontal line) can generate 2-dimensional data (e.g., (1) data from the horizontal transmission direction and (2) the range or distance to objects). Similarly, a point cloud or image from a 2-dimensional transmission of light pulses can generate 3-dimensional data (e.g., (1) data from the horizontal transmission direction, (2) data from the vertical transmission direction, and (3) the range or distance to objects). In general, a LiDAR system performing an n-dimensional transmission of light pulses generates (n+1) dimensional data. This is because the LiDAR system can measure the depth of an object or the range/distance to the object, which provides the extra dimension of data. Therefore, a 2D scanning by a LiDAR system can generate a 3D point cloud for mapping the external environment of the LiDAR system.

The density of a point cloud refers to the number of measurements (data points) per area performed by the LiDAR system. A point cloud density relates to the LiDAR scanning resolution. Typically, a larger point cloud density, and therefore a higher resolution, is desired at least for the region of interest (ROI). The density of points in a point cloud or image generated by a LiDAR system is equal to the number of pulses divided by the field of view. In some embodiments, the field of view can be fixed. Therefore, to increase the density of points generated by one set of transmission-receiving optics (or transceiver optics), the LiDAR system may need to generate a pulse more frequently. In other words, a light source in the LiDAR system may have a higher pulse repetition rate (PRR). On the other hand, by generating and transmitting pulses more frequently, the farthest distance that the LiDAR system can detect may be limited. For example, if a return signal from a distant object is received after the system transmits the next pulse, the return signals may be detected in a different order than the order in which the corresponding signals are transmitted, thereby causing ambiguity if the system cannot correctly correlate the return signals with the transmitted signals.

To illustrate, consider an example LiDAR system that can transmit laser pulses with a pulse repetition rate between 500 kHz and 1 MHz. Based on the time it takes for a pulse to return to the LiDAR system and to avoid mix-up of return pulses from consecutive pulses in a typical LiDAR design, the farthest distance the LiDAR system can detect may be 300 meters and 150 meters for 500 kHz and 1 MHz, respectively. The density of points of a LiDAR system with 500 kHz repetition rate is half of that with 1 MHz. Thus, this example demonstrates that, if the system cannot correctly correlate return signals that arrive out of order, increasing the repetition rate from 500 kHz to 1 MHz (and thus improving the density of points of the system) may reduce the detection range of the system. Various techniques are used to mitigate the tradeoff between higher PRR and limited detection range. For example, multiple wavelengths can be used for detecting objects in different ranges. Optical and/or signal processing techniques (e.g., pulse encoding techniques) are also used to correlate between transmitted and return light signals.

Various systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Various systems, apparatus, and methods described herein may be implemented using computers operating in a client-server relationship. Typically, in such a system, the client computers are located remotely from the server computers and interact via a network. The client-server relationship may be defined and controlled by computer programs running on the respective client and server computers. Examples of client computers can include desktop computers, workstations, portable computers, cellular smartphones, tablets, or other types of computing devices.

Various systems, apparatus, and methods described herein may be implemented using a computer program product tangibly embodied in an information carrier, e.g., in a non-transitory machine-readable storage device, for execution by a programmable processor; and the method processes and steps described herein, including one or more of the steps of at least some of the FIGS. 1-15, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
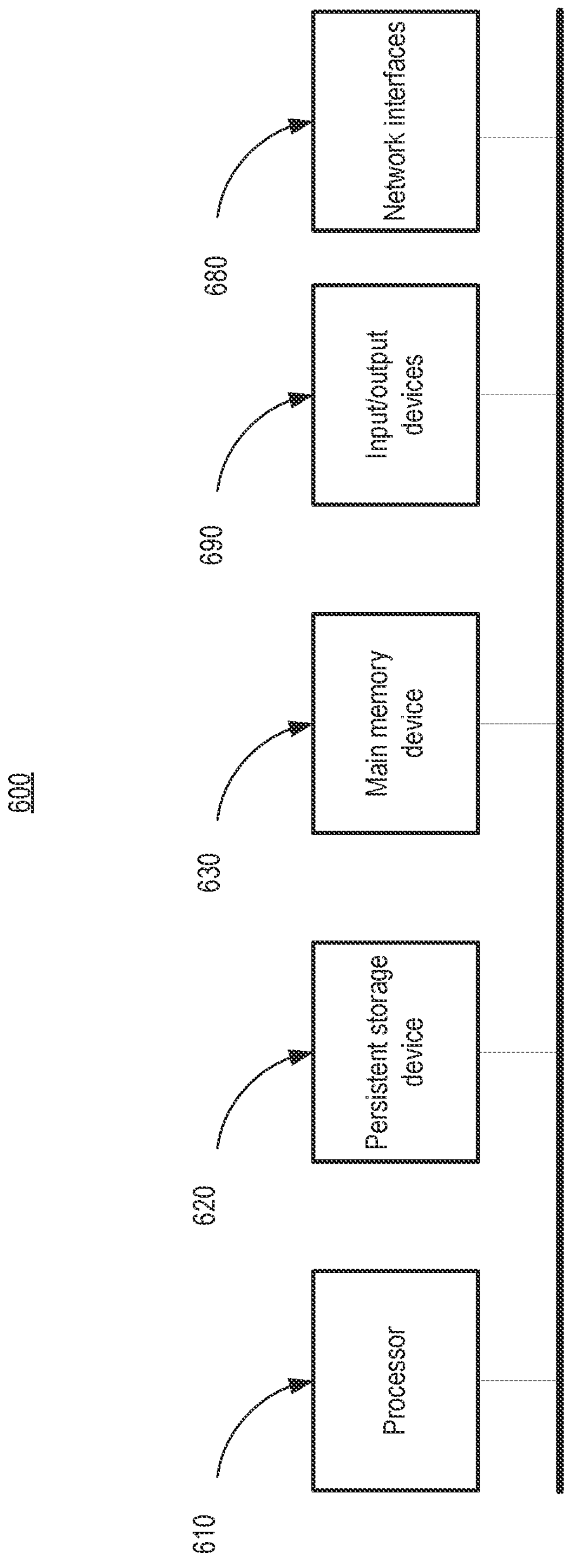
FIG. 6 is a block diagram illustrating an example apparatus used to implement systems, apparatus, and methods in various embodiments.

A high-level block diagram of an example apparatus that may be used to implement systems, apparatus and methods described herein is illustrated in FIG. 6. Apparatus 600 comprises a processor 610 operatively coupled to a persistent storage device 620 and a main memory device 630. Processor 610 controls the overall operation of apparatus 600 by executing computer program instructions that define such operations. The computer program instructions may be stored in persistent storage device 620, or other computer-readable medium, and loaded into main memory device 630 when execution of the computer program instructions is desired. For example, processor 610 may be used to implement one or more components and systems described herein, such as control circuitry 350 (shown in FIG. 3), vehicle perception and planning system 220 (shown in FIG. 2), and vehicle control system 280 (shown in FIG. 2). Thus, the method steps of at least some of FIGS. 1-15 can be defined by the computer program instructions stored in main memory device 630 and/or persistent storage device 620 and controlled by processor 610 executing the computer program instructions. For example, the computer program instructions can be implemented as computer executable code programmed by one skilled in the art to perform an algorithm defined by the method steps discussed herein in connection with at least some of FIGS. 1-15. Accordingly, by executing the computer program instructions, the processor 610 executes an algorithm defined by the method steps of these aforementioned figures. Apparatus 600 also includes one or more network interfaces 680 for communicating with other devices via a network. Apparatus 600 may also include one or more input/output devices 690 that enable user interaction with apparatus 600 (e.g., display, keyboard, mouse, speakers, buttons, etc.).

Processor 610 may include both general and special purpose microprocessors and may be the sole processor or one of multiple processors of apparatus 600. Processor 610 may comprise one or more central processing units (CPUs), and one or more graphics processing units (GPUs), which, for example, may work separately from and/or multi-task with one or more CPUs to accelerate processing, e.g., for various image processing applications described herein. Processor 610, persistent storage device 620, and/or main memory device 630 may include, be supplemented by, or incorporated in, one or more application-specific integrated circuits (ASICs) and/or one or more field programmable gate arrays (FPGAs).

Persistent storage device 620 and main memory device 630 each comprise a tangible non-transitory computer readable storage medium. Persistent storage device 620, and main memory device 630, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 690 may include peripherals, such as a printer, scanner, display screen, etc. For example, input/output devices 690 may include a display device such as a cathode ray tube (CRT), plasma or liquid crystal display (LCD) monitor for displaying information to a user, a keyboard, and a pointing device such as a mouse or a trackball by which the user can provide input to apparatus 600.

Any or all of the functions of the systems and apparatuses discussed herein may be performed by processor 610, and/or incorporated in, an apparatus or a system such as LiDAR system 300. Further, LiDAR system 300 and/or apparatus 600 may utilize one or more neural networks or other deep-learning techniques performed by processor 610 or other systems or apparatuses discussed herein.

One skilled in the art will recognize that an implementation of an actual computer or computer system may have other structures and may contain other components as well, and that FIG. 6 is a high-level representation of some of the components of such a computer for illustrative purposes.

Figure 7A:
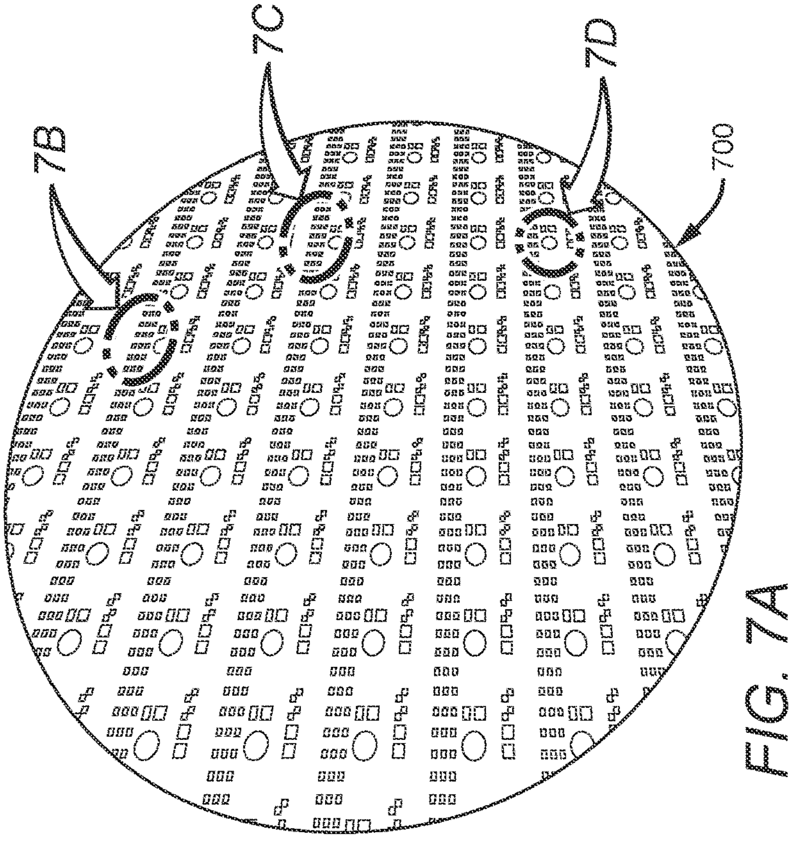
FIG. 7A illustrates an example wafer comprising Metalenses, according to one embodiment.

FIG. 7A illustrates an example wafer 700 comprising Metalenses, according to one embodiment. Wafer 700 can include a thin, flat slice or a disk of a dielectric and/or semiconductor material. Wafer 700 comprises a substrate for fabrication of subwavelength structures forming Metalenses or other metasurface-based optics. Wafer 700 can be a glass wafer, Silicon based wafer, a gallium arsenide (GaAs) based wafer, a silicon carbide (SiC) based wafer, or a wafer based on any other dielectric and/or semiconductor materials. Wafer 700 can be any size (e.g., 300 mm or 12 inches) in diameter. Wafer 700 can be flat and thin (e.g., having a thickness in the order of micrometers or millimeters). Wafer 700 can further include various subwavelength structures formed in or on the substrate. These subwavelength structures can form 2-dimensional (2D) or 3-dimensional (3D) patterns. In some embodiments, the wafer 700 can have repeated patterns of subwavelength structures, with each pattern forming a metasurface-based optic (e.g., a Metalens, a Metamirror, etc.). In some embodiments, wafer 700 can include different patterns of subwavelength structures, such as those shown in FIGS. 7B-7D.

Figure 7B:
FIGS. 7B-7E illustrate examples of subwavelength structures forming different patterns used for metasurface-based optics, according to some embodiments.
Figure 7C:
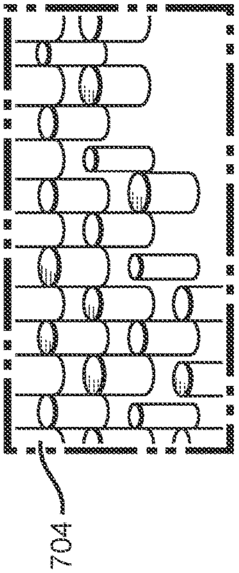
Figure 7D:
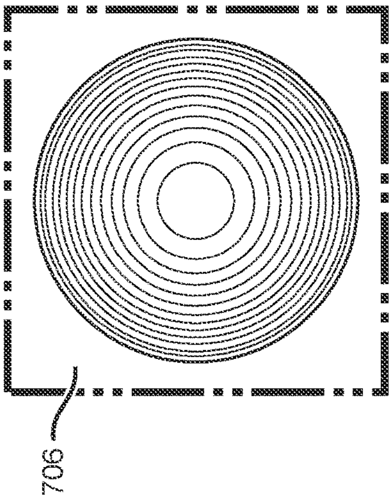

FIGS. 7B-7D illustrate examples of subwavelength structures forming different patterns 702, 704, or 706 used for metasurface-based optics, according to some embodiments. Subwavelength structures refer to patterns or features that are smaller in size than the wavelength of the light or electromagnetic wave they interact with. For example, the dimensions of these subwavelength structures are on a nanoscale level, typically much smaller than the wavelengths of the light (e.g., visible light or infrared light). When light encounters an object or a structure that is much larger than its wavelength, it behaves in a manner predicted by the laws of classical optics. However, when light interacts with structures on the order of its wavelength or smaller, it can exhibit different behaviors due to diffraction, interference, and other wave phenomena. Subwavelength structures can be configured using various materials and fabrication techniques to achieve specific optical effects. These effects can include bending, focusing, collimating, transmitting, filtering, beam homogenizing, and manipulating light in ways that may or may not be possible with conventional optical lenses and macroscopic structures. Metamaterials, which are often used to create metasurface-based optics like Metalenses, are a prime example of subwavelength structures. These metamaterials are designed to have properties derived from the arrangement of their subwavelength components, such as nanoscale metallic or dielectric elements. By manipulating the arrangement of these elements, the behavior of light can be controlled at scales smaller than its wavelength, enabling the creation of metasurface-based optics like Metalenses.

FIGS. 7B-7D illustrate several examples of subwavelength structures (sometimes also referred to as nanostructures) used for metasurface-based optics (e.g., Metalenses). These nanostructures can be nanoslits, nanorods, nanodisks, etc. The nanostructures are specifically configured to resonate with incident light at specific wavelengths and angles. Metasurface-based optics (e.g., Metalenses), as described in more detail below, can enable phase modulation of the incident light. The resonant interaction between the subwavelength structures and incident light leads to the manipulation of the phase of the light waves. By controlling the phase, metasurface-based optics (e.g., Metalenses) can redirect or focus the light, enabling the creation of any desired wavefronts (e.g., wavefronts to converge light or any complex wavefronts). As also described in more detail below, metasurface-based optics (e.g., Metalenses) can be configured to have different resonant modes for different wavelengths. This property can reduce or eliminate chromatic aberration, which is a common issue in conventional optical lenses where different colors of light are focused at slightly different points. Metalenses with appropriate resonant subwavelength structures can focus different wavelengths to a common focal point, reducing or eliminating chromatic aberration. Moreover, metasurface-based optics (e.g., Metalenses) can be configured to have subwavelength apertures or slits. The resonant properties of subwavelength apertures or slits in metasurface-based optics (e.g., Metalenses) allow them to effectively transmit or block certain wavelengths of light, thereby achieving optical effects like filtering, polarization control, and sensing. Particular applications of metasurface-based optics in a LiDAR system are described below in greater detail.

FIG. 7B shows a pattern 702 having subwavelength structures that can be used in metasurface-based optics. These structures can be, for example, nano-scale features having rectangle shapes or any other desirable shapes. Features of the structures can have the same or different dimensions. In one example, the nano-scale features can form one or more lines or arrays as illustrated in FIG. 7B. These lines may or may not be straight lines, depending on the specific optical effect required. The nano-scale features may form periodical or aperiodical patterns along one or two directions. The nano-scale features in a line may or may not have the same or similar dimension. For instance, for beam homogenizing, which is described in detail below, the nano-scale features of the subwavelength structure may form a line and may have dimensions to re-shape the light to fit with the shape of the sensing element like a detector. In one example, the metasurface-based optics shown in FIG. 7B can be a lead telluride (PbTe) based Metalens operating in the mid-infrared wavelength range (e.g., approximately 2.5 μm-25 μm).

FIG. 7C illustrates another pattern 704 having subwavelength structures for implementing metasurface-based optics. These structures in pattern 704 have pillars that are smaller than the wavelength of the incident light. Pillars in pattern 704 include vertical structural elements that are cylinder shaped. As shown in FIG. 7C, the pillars in pattern 704 may have same or different diameters (e.g., 50-70 nm). They can also form an array, a matrix, or any other shape or pattern, depending on the specific optical effect required. In one example, the metasurface-based optics shown in FIG. 7C can be a Silicon based Metalens operating in the near-infrared range (e.g., 700 nm-2.5 μm).

FIG. 7D illustrates another pattern 706 having subwavelength structures for implementing metasurface-based optics. These structures form a concentric ring-shaped pattern that can be used to implement optical effects of conventional spherical-shaped lenses (or any other lenses having curvatures). Some of these lenses are illustrated in the other figures of this disclosure (e.g., collimation lens, focusing lens, beam homogenizer, etc.). The metasurface-based optics shown in FIG. 7D can be, for example, Silicon-based Metalens operating in the near infrared wavelength range (e.g., 700 nm-2.5 μm).

The metasurface-based optics disclosed herein can include subwavelength structures having dielectric-based structures on the order of nanometers or micrometers. The subwavelength structures can include a monolayer or multiple layers of nanostructures. The multiple layers can be stacked on top of one another, overlap with each other, disposed on different wafers, or bonded together via wafer bonding. The thickness of the metasurface-based optics can be, for example, less than 1 μm or on the nanometer scale. It is understood that FIGS. 7C-7D only illustrate several examples of subwavelength structures and patterns that can be used to implement metasurface-based optics such as Metalenses. Other structures and patterns can also be used to implement metasurface-based optics, depending on the requirements of the optical effect. Such metasurface-based optics can be used for visible light or light in other wavelengths. For instance, the metasurface-based optics can be single-crystal Silicon based Metalenses, titanium monoxide (TiO) based Metalenses, or gallium nitride (GaN) based Metalenses. These Metalenses can operate in the visible light wavelength range. As another example, Metalenses can be Hafnium oxide (HfO) based Metalenses operating in the ultraviolet light wavelength range.

Figure 7E:
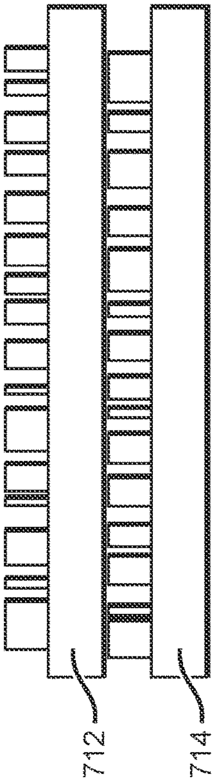

FIG. 7E illustrates a bi-layer metasurface-based optics comprising a first layer 712 and a second layer 714. As described in more detail below, different layers in a multiple layer metasurface-based optics (e.g., Metalens) can include nanostructures configured to perform similar or different functions. For example, one layer can be configured to perform optical collimation while another layer may be configured to perform bandpass filtering. As another example, both layers may be configured to perform beam collimation with one layer performing coarse collimation and another layer performing fine tuning to obtain parallel light rays with good collimation quality. While FIG. 7E only illustrates two layers, it is understood that a metasurface-based optics can be configured to have any number of layers.

Figure 8:
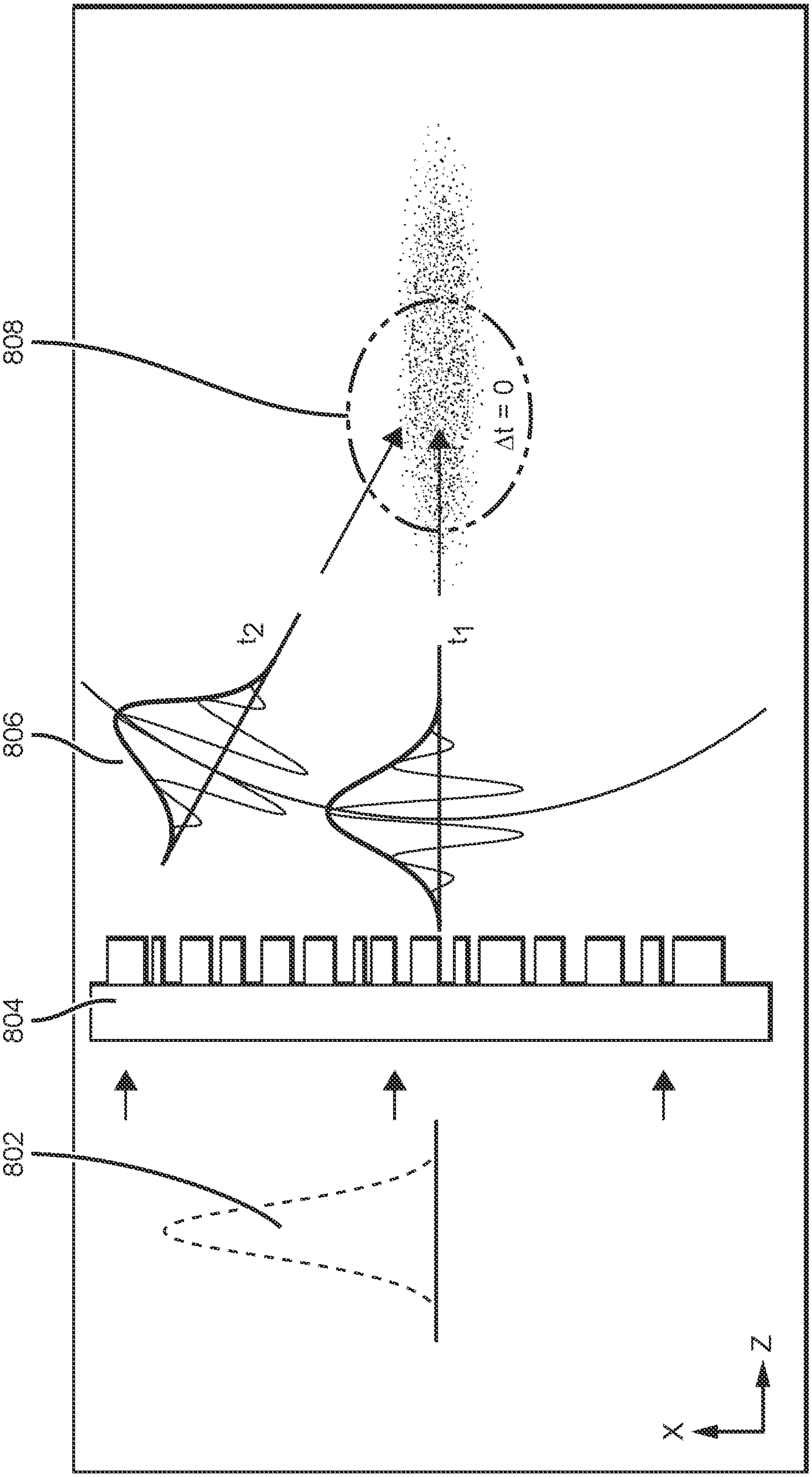
FIG. 8 is a diagram illustrating the use of artificial phase shifts from metasurfaces of a Metalens to simulate a spherical wavefront for beam focusing, according to some embodiments.

FIG. 8 is a diagram illustrating the use of artificial phase shifts from metasurfaces of a Metalens to simulate a spherical wave front for beam focusing, according to some embodiments. In FIG. 8, Metalens 804 has subwavelength structures formed on a surface of a wafer substrate. The subwavelength structures can form nano-scale patterns such as those described above. Light 802 is directed to Metalens 804. Metalens 804 is thin and receives light 802 at one surface (e.g., the left surface that does not have the subwavelength structure). As the light 802 goes through particular locations of Metalens 804, the subwavelength structures can vary in the amount of phase it adds to the light 802. As illustrated in FIG. 8, the phases of the light wave are modulated at the edge locations of Metalens 804 and center locations of Metalens 804. The phases are modulated by the average refractive index change induced by the specific pattern comprising the subwavelength structures at particular locations of Metalens 804. As described above, a Metalens can have a specifically designed nano-scale pattern comprising subwavelength structures. At different locations of the Metalens 804, the structures can be different and the effective refractive index at the particular locations can be different. As a result, the phase modulations at different locations of Metalens 804 can be different.

In other examples, resonant effects can be used to enhance the phase modulation. The resonant effects of Metalens subwavelength structures can enhance the ability to manipulate and control light. The resonant effects may arise from the interaction between the incident light and the particular nanostructures on the surface of the Metalens. The nanostructures can be configured to exhibit specific responses to certain wavelengths or angles of incident light, enabling the Metalens to focus, bend, or otherwise manipulate light as desired. As shown in FIG. 8, when the light 802 reaches different locations of Metalens 804, the phases of light 802 at these locations are modulated, resulting in the variation of the wavefronts. For instance, if the Metalens 804 is specifically configured to be a focus lens for converging light, the nanostructures can modulate the light 802 such that the wavefront at the edge location of Metalens 804 travels slightly faster than the wavefront at the center location of Metalens 804 (e.g., the travel time $t_2$ is smaller than travel time $t_1$). As such, the wavefront of light 802 passing through Metalens 804 has a curved shape. The nanostructure can be further configured such that the curvature of the wavefront is properly designed to converge the light 802 to a desired convergence point 808. In comparison, a conventional glass-based focus lens has a thicker center and thinner edge. As a result, when light passes through a conventional glass-based focus lens, the wavefront of light travels slightly faster at the edge than at the center, thereby converging the light to the lens's focal point. Metalens 804 therefore can perform the same converging function as a conventional glass-based lens, with more precision and better quality.

Figure 9:
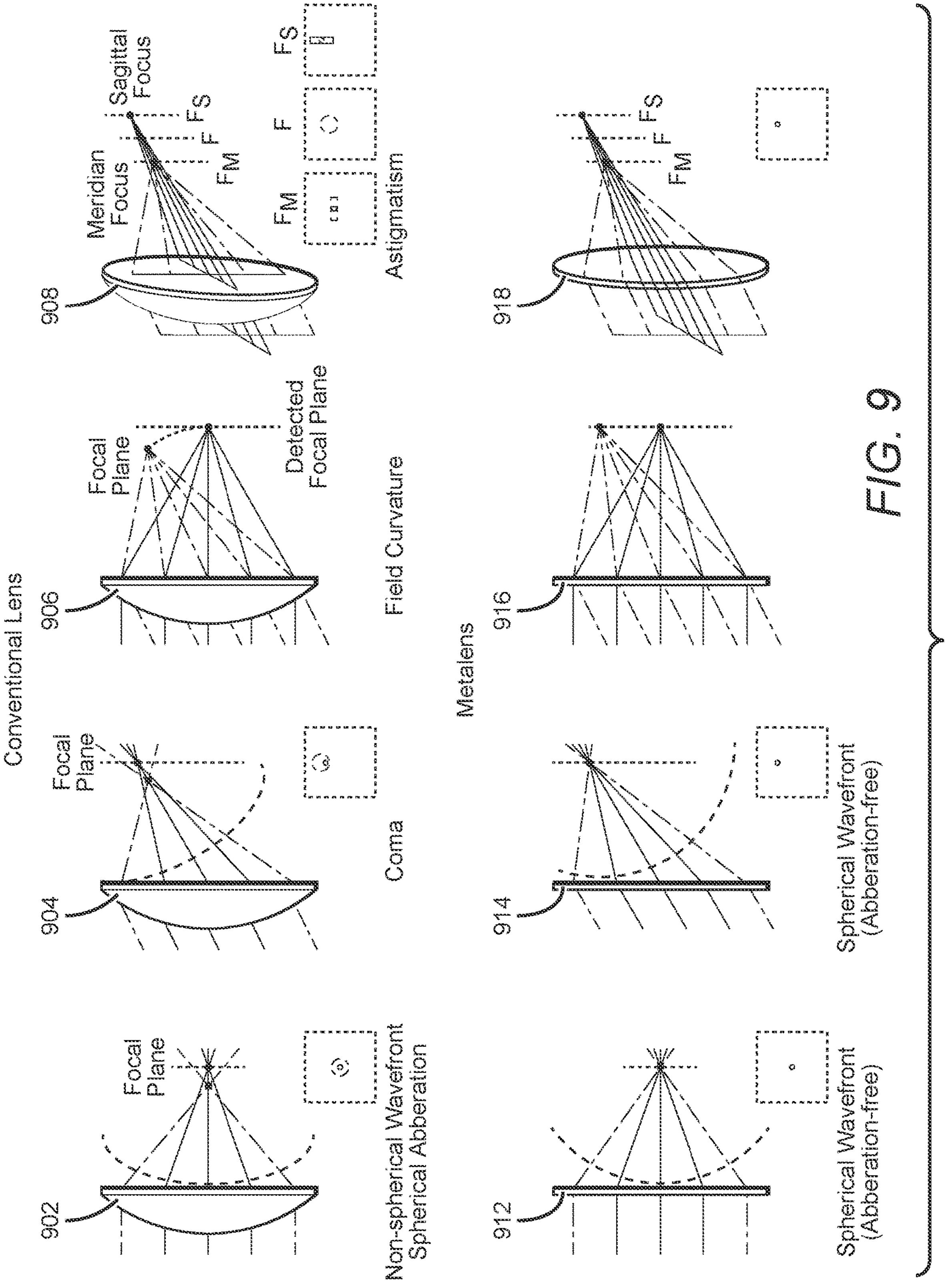
FIG. 9 includes diagrams illustrating Metalenses designed to remove various aberrations of conventional optical lenses and achieve better focusing results, according to some embodiments.

FIG. 9 includes diagrams illustrating Metalens designed to remove various optical aberrations of conventional glass-based optical lenses and achieve better focusing results, according to some embodiments. The top four diagrams illustrate optical aberrations caused by conventional glass-based lenses. In one example, a spherical aberration can be caused by a conventional optical lens 902. As shown in FIG. 9, when light passes through lens 902 (or a curved mirror), the light does not converge to a single point, resulting in a blurred or distorted image. This is primarily because the shape of lens 902 is spherical, and light rays passing through the edges of the lens 902 experience a different focal point than those passing through the center. For instance, the wavefronts of light passing through lens 902 may have non-spherical wavefronts, as shown in FIG. 9.

Optical coma is another type of optical aberration caused by a conventional optical lens 904. In FIG. 9, when light rays pass through conventional glass-based lens 904, the light rays do not converge at a spot along a center axis (or a desired axis) of the lens 904, resulting in distorted and comet-like shapes in the image. Optical coma can occur because lens 904 does not focus off-axis light rays to a single point, causing the image to appear elongated in one direction. Coma aberration becomes more pronounced when the incident light rays come in at an angle as illustrated in FIG. 9 and focus on different points along a line, resulting in asymmetrical blurring of the image.

A field curvature is another type of optical aberration caused by a conventional optical lens 906. In FIG. 9, when light rays pass through conventional glass-based lens 906, the focal plane is not flat, but rather follows a curved surface. Thus, an object appears to be out of focus or curved when viewed through lens 906. When lens 906 has a field curvature, different points in the field of view are focused at different distances from the lens 906. Thus, when lens 906 with a field curvature is used, the center may be in focus while the edges may be blurred, or vice versa. The field curvature aberration may also be worse when the incident light rays come in at an angle, as illustrated in FIG. 9.

An astigmatism is another type of optical aberration caused by a conventional optical lens 908. In FIG. 9, when light rays pass through lens 908, the light rays do not converge at a single point. Instead, the light rays focus along two or more different lines, axes, or focal planes, resulting in a blurred or distorted image. Astigmatism arises due to a mismatch in the curvature of different meridians (lines passing through the center of the lens) of optical lens 908. Essentially, lens 908 has different focal lengths in two perpendicular directions. This causes the image of a point source to appear stretched along one direction and compressed along the perpendicular direction.

It may not be feasible or practical to reduce or eliminate the aberrations described above with respect to conventional lens 902, 904, 906, and 908, due to optical fabrication limitations of the conventional glass-based optical lens. Metasurface-based optics (e.g., Metalenses) comprise subwavelength structures that can be customized or precisely configured to achieve the desired optical effects. The bottom four diagrams in FIG. 9 illustrate using Metalens to reduce or eliminate the various optical aberrations described above. In one example, Metalens 912 can be used to replace conventional optical lens 902 to function as a focus lens without spherical aberrations. The nanostructure of Metalens 912 can be configured such that the phase modulations of the incident light at different locations of Metalens 912 produce an aberration-free spherical wavefront. As a result, the light rays passing through Metalens 912 travel at slightly different speeds to converge on a desired center spot.

Similarly, Metalens 914, 916, and 918 can be used to replace conventional optical lenses 904, 906, and 908, respectively to reduce to eliminate optical coma, field curvature, and astigmatism respectively. As illustrated in FIG. 9, even when the incident light rays come in at an angle to Metalens 914, the light rays can focus on a single spot because the nanostructure of Metalens 914 is precisely configured at various locations of Metalens 914. Metalens 914 can thus produce a precise wavefront to obtain coma-free convergence. Similarly, the nanostructures of Metalens 916 can be precisely configured such that light rays coming in at different incident angles can be focused on a single focal plane, rather than different focal planes, thereby eliminating the field curvature aberration. The astigmatism aberration can be eliminated by using Metalens 918 having precisely configured subwavelength structures, such that different light rays focus on the same focal plane, rather than two or more different lines, axes, or focal planes, thereby eliminating any blurry or distorted images.

It is understood that Metalens disclosed herein can be configured to have any subwavelength structures for reducing optical artifacts associated with non-metasurfaces based optics like conventional glass-based optical lens, mirrors, prisms, etc. The optical artifacts may include spherical aberrations, chromatic aberrations, coma, astigmatism, field curvature, distortion, or a combination thereof.

FIGS. 7, 8, and 9 illustrate several example metasurface-based optics (e.g., Metalenses) that can be used in various imaging systems such as in a LiDAR system. It is also understood that variations can be implemented or configured for different applications to achieve different optical effects. For instance, in a LiDAR system application, because Metasurface-based optics are sensitive to the operating wavelengths, the subwavelength structures can be configured according to the operational wavelengths of the LiDAR systems. Thus, the nanostructures of a Metalens used in a 795 nm wavelength LiDAR may be different (e.g., different pattern, size, shape, etc.) from a Metalens used in a 1550 nm wavelength LiDAR. In some embodiments, LiDAR systems have wavelengths between 750 nm and 2000 nm, and metasurface-based optics with corresponding nanostructures can be configured to obtain desired optical effects (e.g., collimating, diverging, converging, filtering, etc.). As described above, the nanostructures have features that are at subwavelength dimensions. For the metasurface-based optics disclosed in this disclosure, the subwavelength structures can have feature sizes (e.g., width, height, length, diameter, etc.) that are between 1/20-9/10 of the operational wavelength of a particular LiDAR system. Thus, if the LiDAR system operates at 1550 nm wavelength, the feature sizes of a subwavelength structure may be from approximately 70 nm-1,395 nm. The dimensions of the subwavelength structure may change if the operational wavelength of a LiDAR system changes.

As described above, for metasurface-based optics disclosed in this disclosure, the subwavelength structures can form a 2-dimensional or 3-dimensional pattern configured to module light to have different optical phase changes at different locations of the subwavelength structures. As a result, light formed by the subwavelength structures is shaped and/or directed according to at least one of the optical requirements. Such optical requirements relate to light direction, reflection, deflection, refraction, diffraction, focusing, collimation, splitting, merging, converging, steering, scattering, dispersion, or polarization. Some examples of light redirecting, focusing, collimating, filtering, and steering using metasurface-based optics are illustrated and described below in greater details.

Figure 10A:
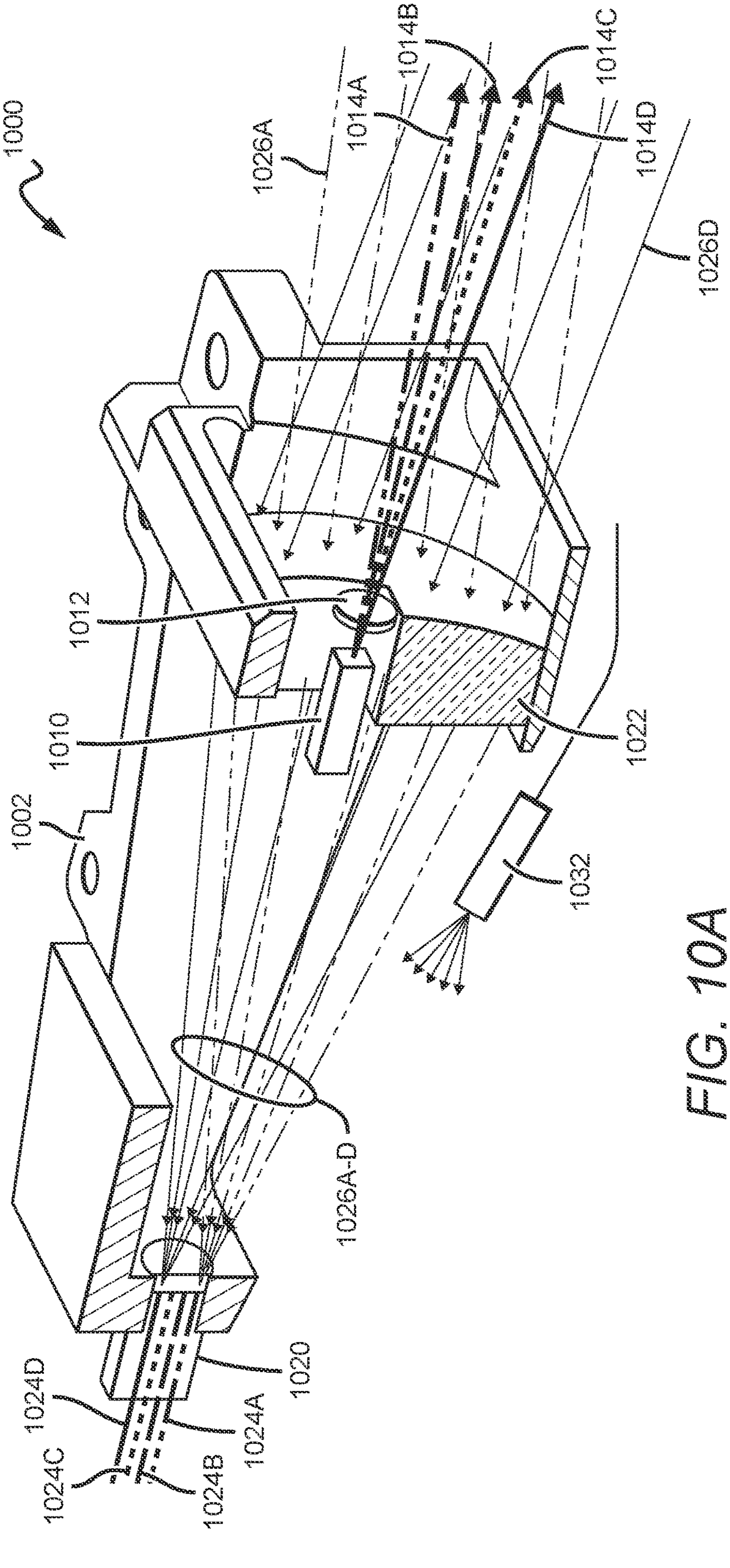
FIG. 10A is a perspective view of an example transceiver assembly of a LiDAR system comprising one or more metasurface-based optics, according to some embodiments.

FIG. 10A is a perspective view of an example transceiver 1000 of a LiDAR system comprising one or more transmitter Metalenses, according to some embodiments. This transceiver 1000 can be used to implement LiDAR system 300, any other LiDAR systems, or hybrid LiDAR imaging systems (e.g., a hybrid LiDAR and camera imaging system). In some embodiments, transceiver 1000 comprises a transceiver housing 1002, a transmitter fiber array 1010, a transmitter Metalens 1012, a collection lens 1022, a receiver fiber array 1020, a plurality of detectors (shown in FIGS. 12B and 12C), and a reference channel 1032. Transceiver housing 1002 can be made of metal, plastic, glass, composite materials, and/or any other desired materials. Transceiver housing 1002 provides at least a partial enclosure to transmitter fiber array 1010, receiver fiber array 1020, collection lens 1022, and transmitter Metalens 1012. Transceiver housing 1002 can be configured such that various components are positioned therein for proper operation. For example, as shown in FIG. 10A, in one embodiment, transmitter fiber array 1010, collection lens 1022, and transmitter Metalens 1012 are disposed towards the front end of transceiver housing 1002 along its longitudinal direction. Receiver fiber array 1020 and at least a part of detectors (shown in FIG. 12B and 12C) are disposed towards the back end of transceiver housing 1002. Furthermore, transceiver housing 1002 is configured to have proper dimensions such that transceiver 1000 can operate properly to achieve its optical functionalities. For example, the distance between collection lens 1022 and receiver fiber array 1020 is configured to have a predetermined value such that each of return light 1026A-1026D (FIG. 10A only shows return light 1026A and 1026D for illustration) from different directions can be directed properly from collection lens 1022 to a respective receiver optical fiber of receiver fiber array 1020. In FIG. 10A, for instance, return light 1026A is focused by collection lens 1022 to a receiver optical fiber 1024A located at the bottom of the receiver fiber array 1020. And return light 1026D is focused by collection lens 1022 to a receiver optical fiber 1024D located at the top of the receiver fiber array 1020. It is understood that other return light 1026B and 1026C can be similarly focused by collection lens 1022 to other respective receiver channels 1024B and 1024C respectively.

With reference still to FIG. 10A, transceiver 1000 comprises multiple transmitter channels configured to transmit a plurality of transmission light beams 1014A-1014D (collectively as 1014) to a FOV. In one embodiment, there are four such transmitter channels using transmitter fiber array 1010 configured to transmit light beams 1014A-1014D. In some embodiments, transmitter channels of fiber array 1010 are optical fiber-based transmitter channels. For instance, transmitter fiber array 1010 comprises four transmitter optical fibers, each of which is used for a transmitter channel. A transmitter channel is configured to communicate light signals from, for example, a light source to other optical components (e.g., a lens) or to an FOV. In one embodiment, a transmitter channel comprises a transmitter optical fiber.

While four transmitter optical fibers are used for illustration herein, it is understood that transmitter fiber array 1010 can comprise any number of optical fibers capable of being used for any number of transmitter channels. In some embodiments, transmitter fiber array 1010 is optically coupled to a light source and an optical beam splitter (not shown). The light source and the optical beam splitter may be integrated with transceiver 1000 or maybe separate components of the LiDAR system. In some embodiments, the light source is configured to generate a single light beam. The optical beam splitter receives the single light beam and forms multiple transmission light beams. The multiple transmission light beams are then directed to transmitter fiber array 1010. In some embodiments, the light source can generate multiple light beams directly, which are used for the multiple transmission light beams.

In some embodiments, one or more of the transmitter optical fibers in fiber array 1010 comprise one or more single-mode optical fiber(s). A single-mode optical fiber includes a core with a very small diameter (e.g., a few micrometers) that only allows one transverse mode of light at the designed wavelength to travel through. As a result, the output beam quality can be close to the diffraction limited (e.g., $M^2$~1).

As shown in FIGS. 10A, in some embodiments, the light beams coming out of transmitter fiber array 1010 are directed to one or more transmitter optics (e.g., a transmitter Metalens 1012). The one or more transmitter optics can further process the light beams before directing the light beams to a steering mechanism (e.g., steering mechanism 340 shown in FIG. 3). In one example, the transmitter optics comprises one or more transmitter metasurface-based optics. Each of such transmitter metasurface-based optics can have subwavelength structures as described above. These metasurface-based optics can thus be configured to perform one or more of a shifting, shaping, splitting, and converging of the one or more transmission light beams. For example, the nanostructures of the metasurface-based optics can be configured to have specific shapes and dimensions at particular locations, such that the incident light beams at different locations are manipulated to change their phases to obtain any desired wavefronts, thereby effectively shifting, shaping, splitting, and converging the transmission light beams.

Figure 10B:
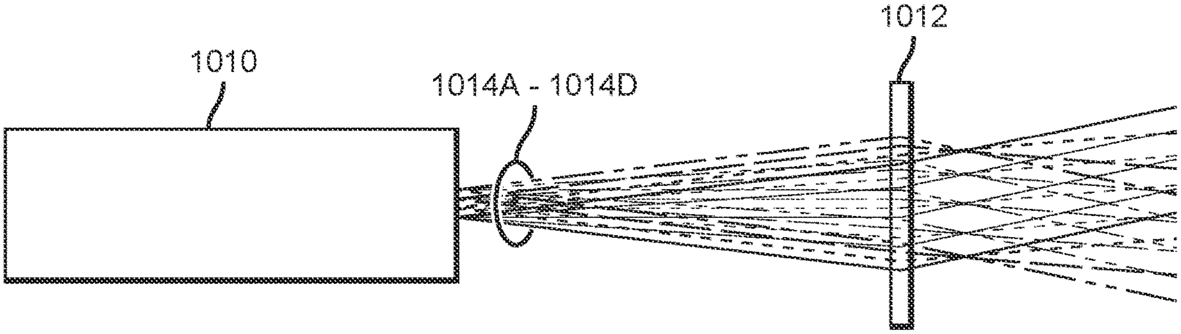
FIG. 10B is a block diagram of an example transmitter comprising a transmitter metasurface-based optics configured for collimating transmission light beams, according to some embodiments.

One example of transmitter metasurface-based optics is shown in FIG. 10A and FIG. 10B. Metalens 1012 is disposed downstream of transmitter fiber array 1010 in the transmission light path, but upstream of any steering mechanisms. In this embodiment, a single Metalens 1012 is used instead of one or more conventional glass-based collimation lenses or a lens group. Transmitter fiber array 1010 has multiple optical fibers that can transmit multiple transmission light beams with a desired angular separation. As described above, if each transmitter channel has its own conventional collimation lens and/or other optical components, the dimensions of the transmitter may significantly increase, making it difficult to provide a compact LiDAR system. Further, the transmitter may include a greater number of optical components, making the transmitter less robust or reliable. FIGS. 10A and 10B illustrate an embodiment where multiple transmitter channels provided by transmitter fiber array 1010 share a single Metalens 1012 configured to perform light beam collimation. Metalens 1012 is positioned to be optically coupled to the fiber array 1010 to receive transmission light beams 1014A-1014D (collectively as 1014).

Continuing with the above example, transmitter fiber array 1010 includes four transmitter optical fibers used for four transmitter channels. Each of the four transmitter optical fibers is disposed separately in a groove, which is positioned at a preconfigured pitch from its adjacent groove. As such, each of the four transmitter optical fibers in array 1010 is also positioned at a preconfigured pitch from its adjacent transmitter optical fiber. The four transmitter optical fibers, or at least the end portions thereof, are parallel or substantially parallel to one another (FIG. 12B shows an optical fiber array 1220 for receiving return light, and the transmitter fiber array 1010 can be configured to be substantially the same or similar). In some embodiments, the end portions of the four transmitter optical fibers are polished to be flat. Each transmitter optical fiber in fiber array 1010 is used as at least a part of a transmitter channel that transmits a transmission light beam 1014A, 1014B, 1014C, or 1014D. In some embodiments, transmission light beams 1014A-1014D are transmitted simultaneously to transmitter Metalens 1012. As transmission light beams 1014A-1014D travel toward Metalens 1012 in free space, they expand in their spatial cross-sectional areas. As a result, the transmission light beams 1014A-1014D begin to diverge and overlap with one another spatially, as shown in FIG. 10B. Thus, when they reach transmitter Metalens 1012, transmission light beams 1014A-1014D spatially overlap.

As shown in FIGS. 10B, transmitter Metalens 1012 receives transmission light beams 1014A-1014D. Transmitter Metalens 1012 is configured to perform light collimation such that the transmission light beams 1014A-1014D from fiber array 1010 are collimated. This can be realized by configuring the nanostructures of transmitter Metalens 1012 such that particular locations of Metalens 1012 have same or different structures for collimating light beams 1014A-1014D, which are incident to Metalens 1012 at different angles. For instance, at a particular location of the Metalens 1012, the subwavelength structures of Metalens 1012 can be designed such that the phase modulation of the light rays from the same transmission light beam equalize the wavefronts of the light rays. As a result, the light rays of the same transmission light beam (e.g., 1014A, 1014B, 1014C, or 1014D) coming out of transmitter Metalens 1012 are substantially parallel (or collimated) for the same transmission light beam, as shown in FIG. 10B. Different collimated beams have different angles, and thus neighboring collimated beams have an angular spacing. It is understood that while FIG. 10B illustrates that the different collimated beams overlap with one another when they just come out of transmitter Metalens 1012, the different collimated beams become spatially separate when they travel to a far distance. The angular spacing between the neighboring beams are determined by the properties of the transmitter fiber array 1010 (e.g., the pitch between the optical fibers in the fiber array) and/or the properties of the Metalens 1012 (e.g., the effective focal lens as if Metalens 1012 were replaced by a conventional glass-based collimation lens to achieve the same angular spacing). In one example, the angular spacing is equal to the pitch of the optical fibers divided by the effective focal length of the transmitter Metalens 1012.

With continued reference to FIG. 10B, the collimated beams coming out of Metalens 1012 can have much smaller divergence compared to the beams before collimation. Transmitter Metalens 1012 thus enables the transmission light beams 1014A-1014D to reach further distance with concentrated energy. Compared to a conventional glass-based collimation lens, transmitter Metalens 1012 can be smaller in dimension, thinner, and thus overall more compact, while providing improved optical performance by reducing or eliminating any optical aberrations described above (e.g., the light rays in the same beam are more precisely collimated).

As described above, transceiver 1000 comprises a transmitter fiber array 1010 and one or more transmitter metasurface-based optics such as transmitter Metalens 1012. In the embodiment shown in FIG. 10A, transmitter Metalens 1012 is positioned at least partially in an opening (e.g., slot, hole) of collection lens 1022. The opening of collection lens 1022 is positioned at the center or middle portion of collection lens 1022 such that the transmission light beams are directed from the center of the optical aperture of collection lens 1022 to the FOV. As a result, the collection lens 1022 is properly positioned to have the optimal optical aperture for collecting return light 1026A-1026D.

Figure 11:
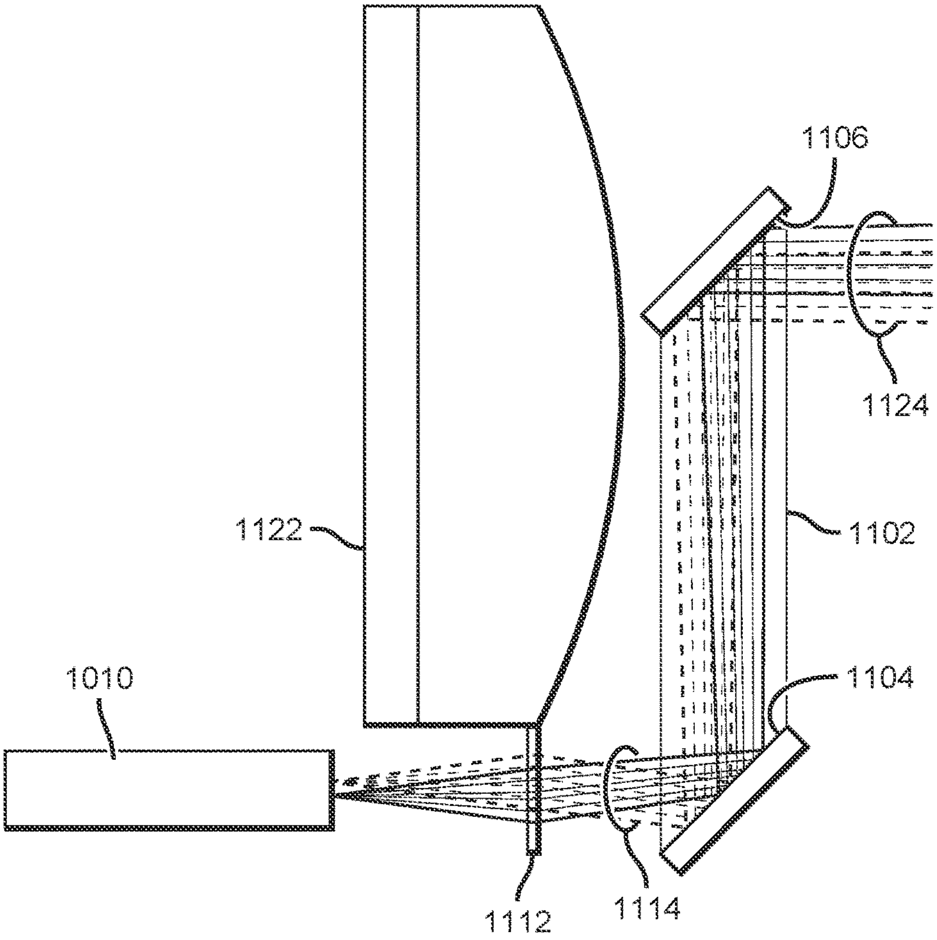
FIG. 11 is a block diagram of another example transmitter comprising one or more transmitter metasurface-based optics for collimating and shifting transmission light beams, according to some embodiments.

FIG. 11 is a block diagram of another example where a transmitter fiber array 1010 and transmitter Metalens 1012 are positioned differently compared to the position shown in FIG. 10A. In FIG. 11, unlike collection lens 1022, no opening is required for collection lens 1122. Collection lens 1122 can be substantially the same or similar to collection lens 1022 shown in FIG. 10A, except it does not have an opening like a slot or hole in the middle of its optical aperture. The transmitter fiber array 1010 and transmitter Metalens 1012 can be positioned at the side of collection lens 1122, while having a beam-shifting system to shift the transmission light beams to the desired position. The transmitter fiber array 1010, transmitter Metalens 102, and the beam shifting system comprising one or more optics can be used for transceiver 1000 of a LiDAR system. As shown in FIG. 11, similar to described above, transmitter fiber array 1010 provides a plurality of transmission light beams 1014, which are collimated by a transmitter Metalens 1112. Transmitter Metalens 1112 can be substantially the same or similar to Metalens 1012 and is thus not repeatedly described.

In some embodiments, the beam-shifting system shown in FIG. 11 uses a periscope device 1102. In FIG. 11, transmitter fiber array 1010 is optically coupled to Metalens 1112, which is optically coupled to periscope device 1102 for directing collimated transmission light beams 1114. In one embodiment, collection lens 1122 may have a flat top and/or bottom surfaces, which makes it easier for assembling collection lens 1122 into the transceiver housing. In the embodiment shown in FIG. 11, unlike that in FIG. 10A, transmitter Metalens 1112 is disposed on the side (e.g., at the bottom) of collection lens 1122. To increase or maximize the optical collection aperture of collection lens 1122, periscope device 1102 can shift the collimated transmission light beams 1114 to be positioned within the optical receiving aperture of the collection lens 1122. Periscope device 1102 can include, for example, a system of glass-based prisms, lenses, and/or mirrors to redirect light beams through a tube. In one example, periscope prism 1102 includes two parallelly-disposed reflecting surfaces 1104 and 1106 that redirect the light beams along the vertical tube. The reflecting surface 1104 (similarly reflecting surface 1106) may be a part of a mirror and/or a prism. Using reflective surface 1104 of periscope prism 1102, collimated transmission light beams 1114 are redirected at an angle of approximately 90 degrees down the periscope tube. The redirected light beams are redirected again by reflective surface 1106 to make another approximately 90-degree turn and then transmitted out to the FOV as redirected transmission light beams 1124. Periscope device 1102 is configured to have proper dimensions such that redirected transmission light beams 1124 are positioned around the center of the optical aperture of collection lens 1122, which allows the return light generated based on redirected transmission light beams 1124 to be properly collected by collection lens 1122.

In another embodiment, one or more glass-based optics of periscope device 1102 can be replaced with metasurface-based optics. For instance, reflective surfaces 1104 and 1106 can be implemented using metamaterials comprising a wafer substate and subwavelength structures. The subwavelength structures are configured such that the phase, amplitude, and polarization of incoming light can be controlled in a desired manner. Such metamaterials implemented reflective surfaces can be also referred to as Metamirrors. Metamirrors, due to the subwavelength structures, can reflect light similar to a conventional mirror. They can also manipulate light in unconventional ways that are not possible by using conventional mirrors. For example, by using Metamirrors and/or Metalens, the outgoing light and incident light may not follow the conventional laws of reflection. Instead, the outgoing light can have any desired direction, phase, amplitude, and polarization. As such, by using Metalens and/or Metamirrors to implement the reflective surfaces 1104 and/or 1106, the periscope device 1102 can be more flexibly configured for shifting collimated transmission light beams 1114 to the center of the optical aperture of collection lens 1122. The orientations and positions of one or more metasurface-based optics in the periscope device 1102 include, but are not limited to, those shown in FIG. 11. Because the metasurface-based optics implementing reflective surfaces 1104 and/or 1106 can manipulate light in unconventional ways, they do not need to be positioned like those shown in FIG. 11, but can be positioned in other ways to make the system more compact or to meet any desired system configuration requirements.

With reference back to FIG. 10A, transceiver 1000 can provide a reference signal 1032, which can be a signal derived or obtained directly from transmitter fiber array 1010. As described above, the LiDAR system can measure the distance of an object based on the time-of-flight method. The reference signal 1032 can be used as a time stamp to set a starting point for the time-of-flight measurement. Using this time stamp and the time that the corresponding return light is received, the time-of-flight can be computed and in turn the distance can be computed.

Figure 12A:
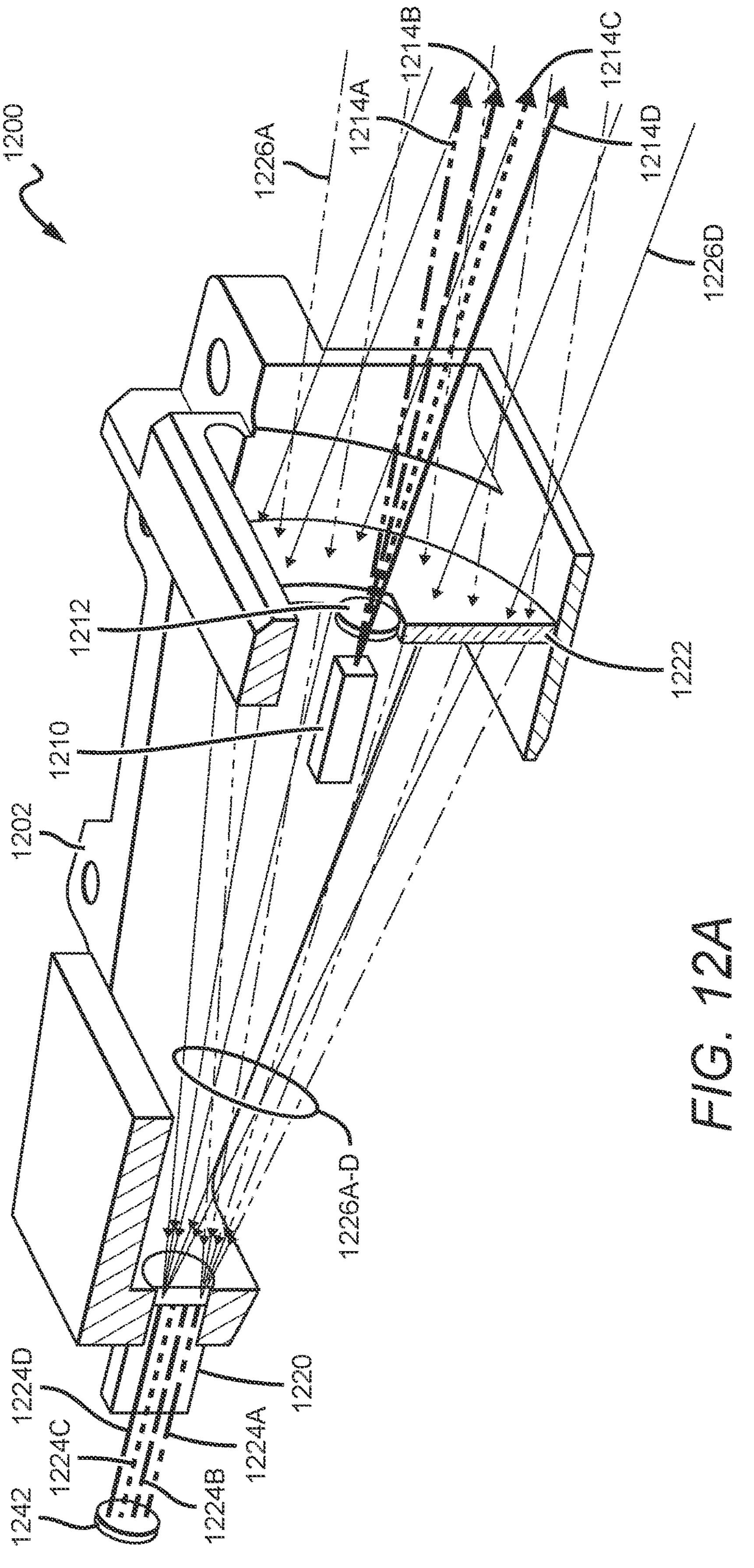
FIG. 12A is a perspective view of an example transceiver assembly of a LiDAR system comprising one or more receiver metasurface-based optics, according to some embodiments.
Figure 12B:
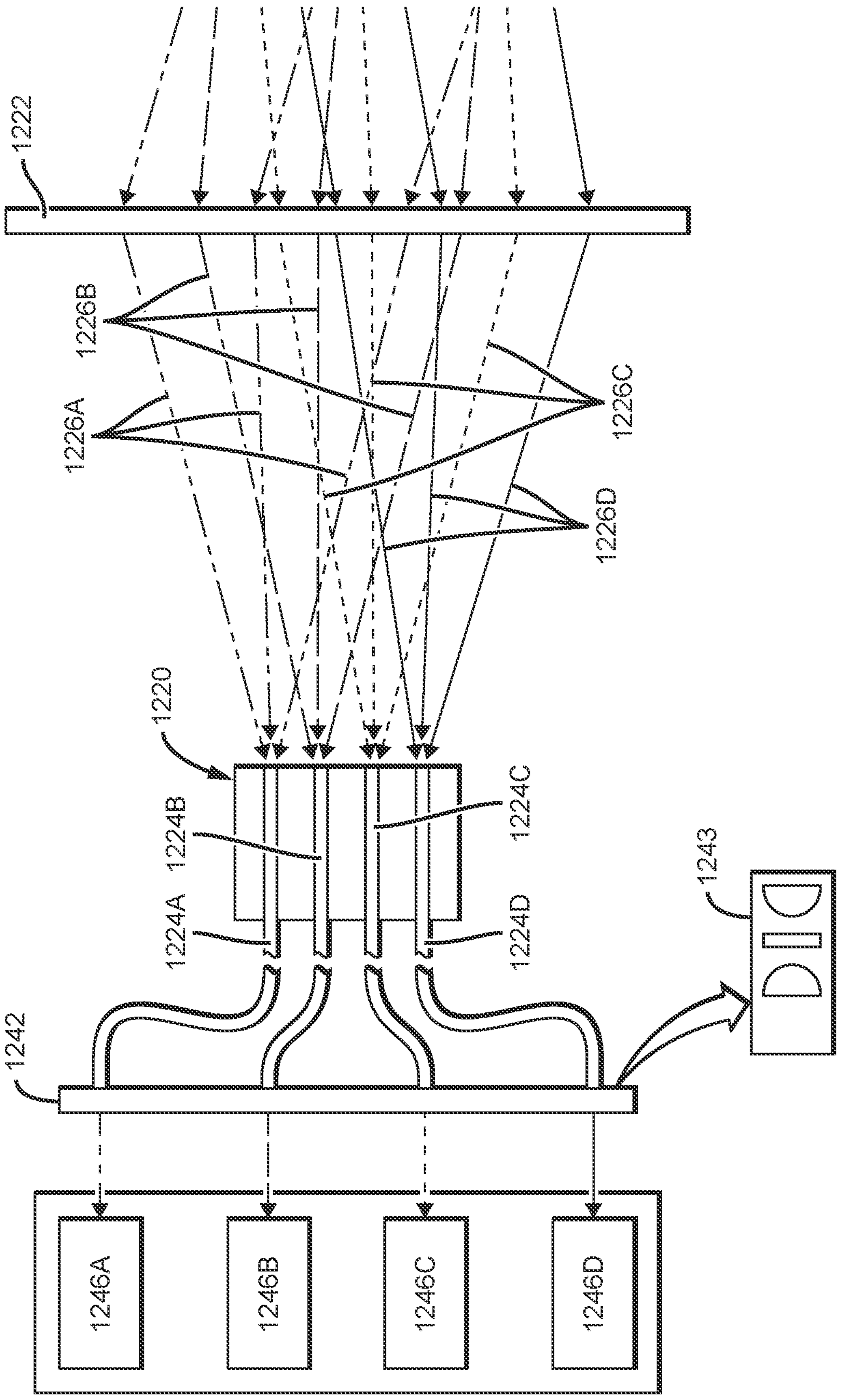
FIG. 12B is a block diagram of an example receiver comprising one or more receiver metasurface-based optics for directing return light to detectors, according to some embodiments.

FIG. 12A is a perspective view of an example transceiver 1200 of a LiDAR system comprising one or more receiver Metalenses, according to some embodiments. Transceiver 1200 can be substantially the same as transceiver 1000 shown in FIG. 10A, except that one or more receiving optics can be implemented by using metasurface-based optics for receiving and detecting return light 1226A-1226D (again for illustration purposes, only 122A and 1226D are illustrated). Using FIG. 10A, the transmission light path is described above. FIG. 12A is used to describe the receiving light path in some embodiments.

When the transmission light beams illuminate one or more objects in a FOV, return light may be formed due to scattering or reflecting of the transmission light beams by the objects. The return light may be received by a steering mechanism first (e.g., steering mechanism 340 shown in FIG. 3, or steering mechanisms 1500, 1530, 1560 shown in FIGS. 15A-15C). The steering mechanism may then direct the return light to one or more receiver optics, which redirect the return light to a receiver fiber array and/or a detector. FIG. 12A illustrates such a receiver fiber array 1220 for detecting return light directed by a receiver Metalens 1222. Receiver fiber array 1220 can be substantially the same as receiver fiber array 1020 shown in FIG. 10A. Receiver Metalens 1222 is disposed between the steering mechanism and receiver fiber array 1220 to receive and redirect return light 1226A-1226D to receiver fiber array 1220. Receiver fiber array 1220 comprises a plurality of receiver optical fibers, each of which corresponds to a receiver channel. A receiver channel is configured to communicate light signals from, for example, a FOV to one or more detectors directly or indirectly via other optical components (e.g., a collection lens, optical fibers, mirrors, Metalens, Metamirrors, or the like). Receiver optical fibers 1224A-1224D in the fiber array 1220 are optically aligned based on the transmission angles of the corresponding transmission light beams. As described above, each transmission light beam is angularly separated from its adjacent transmission light beam corresponding to a desired or predetermined angular channel spacing. Therefore, for a particular transmission light beam, its corresponding return light also has an angular separation from the return light corresponding to other transmission light beams. As such, different return light 1226A-1226D formed from different transmission light beams (e.g., beams 1214A-1214D respectively) can be directed to their respective receiver channels by receiver Metalens 1222.

Receiver Metalens 1222 can collect and converge the return light 1226A-1226D formed from different transmission light beams to their respective receiver optical fibers 1224A-1224D, respectively, in receiver fiber array 1220. Receiver Metalens 1222 can have metasurfaces similar to that described above for focusing light. For instance, similar to Metalens 804 shown in FIG. 8, receiver Metalens 1222 can introduce artificial phase shifts from its metasurfaces to simulate a spherical wave front for beam focusing. For instance, receiver Metalens 1222 can be configured to have subwavelength structures formed on a surface of a wafer substrate. The subwavelength structures can form nanoscale patterns (e.g., a ring pattern shown in FIG. 7D or any other desired patterns). FIG. 12A illustrates that return light 1226A-1226D are directed to receiver Metalens 1222. Receiver Metalens 1222 can be a thin piece of wafer with subwavelength structures. The thickness of receiver Metalens 1222 can be in the order of micrometers or millimeters, and thus much smaller than a glass-based collection lens. The return light 1226A-1226D pass through receiver Metalens 1222 in a manner similar to that shown in FIG. 8. As the light rays of each of return light 1226A-1226D pass through particular locations of Metalens 1222, the subwavelength structures of Metalens 1222 can vary in the amount of phase it adds to the light rays of each of the return light 1226A-1226D. As a result, the phases of the light wave for each of return light 1226A-1226D are modulated at the edge locations and center locations of Metalens 1222. The phases are modulated by the average refractive index change induced by the specific pattern comprising the subwavelength structures. As described above, a Metalens can have specifically designed nanoscale pattern comprising subwavelength structures. At different locations of the Metalens 1222, the structures can be different and the refractive indices at the particular locations can be different.

In other examples, resonant effects can be used to enhance the phase modulation for Metalens 1222. The resonant effects of Metalens 1222's subwavelength structures can enhance the ability to manipulate and control light. The resonant effects may arise from the interaction between each of the return light 1226A-1226D and the particular nanostructures on the metasurface of the Metalens 1222. The nanostructures can be configured to exhibit specific responses to certain wavelengths or angles of return light 1226A-1226D, enabling the Metalens 1222 to focus, bend, or otherwise manipulate light as desired. As shown in FIG. 12A, when the different return light 1226A-1226D reach different locations of Metalens 1222, the phases of the light rays of each return light 1226A-1226D at these locations are modulated, resulting in the variation of the wavefronts. Thus, the nanostructures can modulate the light rays of each return light 1226A-1226D such that the wavefront at the edge location of Metalens 1222 travels slightly faster than the wavefront at the center location of Metalens 1222. Using light 1226A as an example, the wavefront of light rays of return light 1226A passing through Metalens 1222 can be modulated to have a curved shape. The nanostructure can be further configured such that the curvature of the wavefront is properly designed to converge the light rays of return light 1226A to a desired convergence point. In FIG. 12A, the convergence point of return light 1226A is configured to be at an end of a corresponding optical fiber 1224A of receiver fiber array 1220, such that the light rays of return light 1226A are focused precisely to the optical fiber 1224A.

As shown in FIGS. 12A and 12B, because of return light 1226A-1226D are angularly separated (e.g., return light 1226A and its adjacent return light 1226B are not parallel and can form an angle between them), return light 1226A is focused to receiver optical fiber 1224A by Metalens 1222; return light 1226B is focused to receiver optical fiber 1224B by Metalens 1222; and so forth. Thus, Metalens 1222 effectively collects and converges all the return light 1226A-1226D to their respective receiver optical fibers. While FIG. 12A illustrates four receiver optical fibers 1224A-1224D in receiver fiber array 1220, it is understood that receiver fiber array 1220 can include any number of receiver optical fibers corresponding to any number of receiver channels (e.g., 2, 4, 6, 8, or the like). In one embodiment, the multiple receiver optical fibers in receiver fiber array 1220 can share a single receiver Metalens 1222 as illustrated in FIG. 12A, thereby reducing the dimensions of the transceiver of a LiDAR system. In turn, this makes the LiDAR system more compact. In some other embodiment, if more space is available to the LiDAR system, multiple Metalenses may be used for collecting return light if the number of receiving channels is large (e.g., containing a large quantity of return lights).

With reference to FIGS. 12A and 12B, as described above, receiver fiber array 1220 includes receiver optical fibers 1224A-1224D that receive the converged return light 1226A-1226D, respectively, from Metalens 1222. The receiver optical fibers 1224A-1224D can deliver the return light 1226A-1226D, respectively, to one or more detectors. In some embodiments, each of the receiver optical fibers 1224A-1224D comprises a multi-mode optical fiber. Compared to a single-mode optical fiber, a multi-mode optical fiber has a much larger core diameter (e.g., 50-1000 micrometers), which is much larger than the wavelength of the light carried in the multi-mode optical fiber. Because of the large core and thus the possibility of a large numerical aperture, a multi-mode optical fiber has greater light-gathering capacity than single-mode optical fiber. Thus, multi-mode optical fibers are more appropriate for receiving return light directed by the collection lens. Multi-mode optical fibers thus generally perform better than single-mode optical fibers when they are used in receiver channels.

In one embodiment shown in FIGS. 12A and 12B, the return light 1226A-1226D can exit from another end of optical fiber 1224A-1224D, respectively, and be received by another receiver Metalens 1242. FIGS. 12A and 12B illustrates that a single piece of receiver Metalens 1242 is used to receive all return light 1226A-1226D delivered by the optical fiber array 1220. It is understood that multiple receiver Metalenses can be used to receive return lights. The number of receiver Metalens used to receive the return lights delivered by the optical fiber array 1220 can be determined based on the physical locations of the detector(s) and/or crosstalk requirements.

As shown in FIG. 12B, because optical fibers are physically flexible (e.g., an optical fiber may be bended to any shape or may not have a physically linear shape along its entire longitudinal direction), detectors 1246A-1246D can be flexibly distributed (e.g., they do not need to be placed close to each other or form a 1D array as shown in FIG. 12B). Detectors 1246A-1246D can be positioned at any desired locations while still being coupled to their respective receiver optical fibers 1224A-1224D via the one or more receiver Metalenses such as Metalens 1242. FIG. 12B illustrates that all detectors 1246A-1246D form an array and are optically coupled to the same receiver Metalens 1242. However, it is understood that any relation between these components can be configured. For instance, detectors 1246A-1246D may be located at various different locations and do not form an array like those shown in FIG. 12B. Each detector may thus be optically coupled to a different receiver Metalens, which in turn is coupled to a corresponding optical fiber 1224. In another example, one receiver Metalens may be used for receiving return light from two or more optical fibers 1224 and redirecting the return light to one or more detectors 1246.

In FIG. 12B, as described above, adjacent detectors 1246 can be placed at different locations further away from each other. As a result, both the optical crosstalk and electrical crosstalk between adjacent detectors can be significantly reduced. Moreover, an optical fiber 1224 has a core layer surrounded by cladding materials, thereby providing spatial filtering to further reduce the optical crosstalk. As shown in FIG. 12B, adjacent receiver optical fibers 1224 can be positioned at a precise pitch from each other. A pitch is the spacing between the center lines of two adjacent optical fibers 1224 (e.g., 1224A and 1224B). This further reduces alignment error such that return light generated from different transmission light beams are accurately aligned with the corresponding receiver optical fiber. The return light 1226 can thus be received properly at the corresponding receiver optical fiber 1224 with reduced or minimum loss or crosstalk. In some embodiments, if the crosstalk is not significant, adjacent detectors (e.g., 1246A and 1246B) don't need to be placed further away. As a result, a single receiver Metalens can be used for multiple optical fibers and/or multiple detectors. For instance, as shown in FIG. 12B, a single Metalens 1242 may be used for receiving light from both optical fibers 1224A and 1224B, and redirect light to detectors 1246A and 1246B. Other configurations can also be contemplated.

As shown in FIG. 12B, a receiver Metalens 1242 is disposed downstream of another receiver Metalens 1222 (or a glass-based collection lens) for directing return light 1226 to detectors 1246. The following description does not distinguish between any return light 1226A-1226D or any detectors 1246A-1246D. Thus, any one of the return light or detectors will be just referred to as return light 1226 or detector 1246. As shown in FIG. 12B, Metalens 1242 can be configured to perform one or more of: a collimation, filtering, shifting, shaping, splitting, and converging of the return light 1226. In one embodiment, Metalens 1242 can collimate the incident return light 1226, perform a bandpass filtering, and then focusing the filtered return light to a corresponding detector 1246.

In one embodiment, Metalens 1242 can include multiple layers of subwavelength structures for implementing different optical functions. The multiple layer structure may be the same or similar to that shown in FIG. 7E. For instance, Metalens 1242 can include three layers, the first layer of subwavelength structures can be configured similar to those described above with respect to transmitter Metalens 1012 or 1212 (shown in FIGS. 10A and 12A), to collimate the received return light 1226. The collimated return light can pass the second layer in Metalens 1242. The second layer of subwavelength structures can be configured to perform optical filtering to filter out light having undesired wavelengths (e.g., stray light, Sunlight, or any other interference light outside of the LiDAR's operational wavelength). In one example, the subwavelength structures in the second layer can be configured to have different phase responses for different wavelengths of light. This means that they can introduce a specific phase delay to light of one wavelength while allowing light of other wavelengths to pass through with minimal phase alteration. Different materials can be used for this purpose as described above (e.g., glass based Metalens layer for passing visible light, Silicon-based Metalens layer for passing near-infrared light, PbTe-based Metalens layer for passing mid-infrared light, HfO2 based Metalens layer for passing UV light, etc.). Different patterns can also be used to enhance the wavelength-dependent phase modulation provided by the second layer of Metalens 1242. This wavelength-dependent phase manipulation can be used to selectively filter out or transmit certain colors or spectral bands.

In another embodiment, the second layer of Metalens 1242 can have subwavelength structures forming patterns that exhibit dispersion characteristics, which can be used to separate light having different wavelengths, thereby realizing the spectral filtering or dispersion compensation. Thus, the subwavelength structures of the second layer can function as a glass-based prism to physically separate light having different wavelengths and directing them to different locations. The light signals have desired wavelengths can be directed toward detector 1246 while other light can be directed to other locations to be absorbed or filtered out.

Continue with the above example of the three-layered Metalens 1242, when the second layer filters out the undesired light, the remaining portion of the return light 1226 is directed to the third layer, which has subwavelength structures for focusing or converging the light to detector 1246. The subwavelength structures of the third layer of Metalens 1242 can be the same or similar to those of receiver Metalens 1222 described above. It is understood that Metalens 1242 can be configured to converge light similar to Metalens 1222, but one or more optical properties may be configured differently using the same or different type of nanostructures, the same or different feature sizes, and/or the same or different nanostructure patterns. For instance, receiver Metalens 1242 may have a similar pattern (e.g., a ring pattern) as Metalens 1222, but different feature sizes, such that the effective focal length of Metalens 1242 is different from Metalens 1222. The different effective focal length may be a result of the fact that the focal point for Metalens 1242 is much closer than the focal point for Metalens 1222 because detector 1246 may be positioned close to Metalens 1242. In contrast, fiber array 1220 may be positioned further away from Metalens 1222.

The above-described embodiment of Metalens 1242 shown in FIG. 12B uses three layers of nanostructures. In other embodiments, fewer or more layers may be used. For instance, a first layer of subwavelength structures may be configured to perform collimation, and a second layer may be configured to focus the return light 1226 to a detector 1246 while simultaneously filtering out certain undesired wavelengths. Thus, Metalens 1242 can be very useful in a compact optical system while still providing the required functionalities. Compared to using glass-based optics (e.g., assembly 1243 having glass-based lenses for collimation and focusing, and a bandpass filter disposed between the lens), Metalens 1242 can significantly reduce the size of the receiver, and in turn the size of the whole LiDAR system. In addition, because of the precise configuration of the sub-wavelength structures, Metalens 1242 can improve the quality of collimation, focusing, and filtering, thereby providing signals having better qualities (e.g., reduces noise or interferences, free of optical aberrations, etc.) to detectors 1246. As a result, the overall detection performance of the LiDAR system is improved.

Figure 12C:
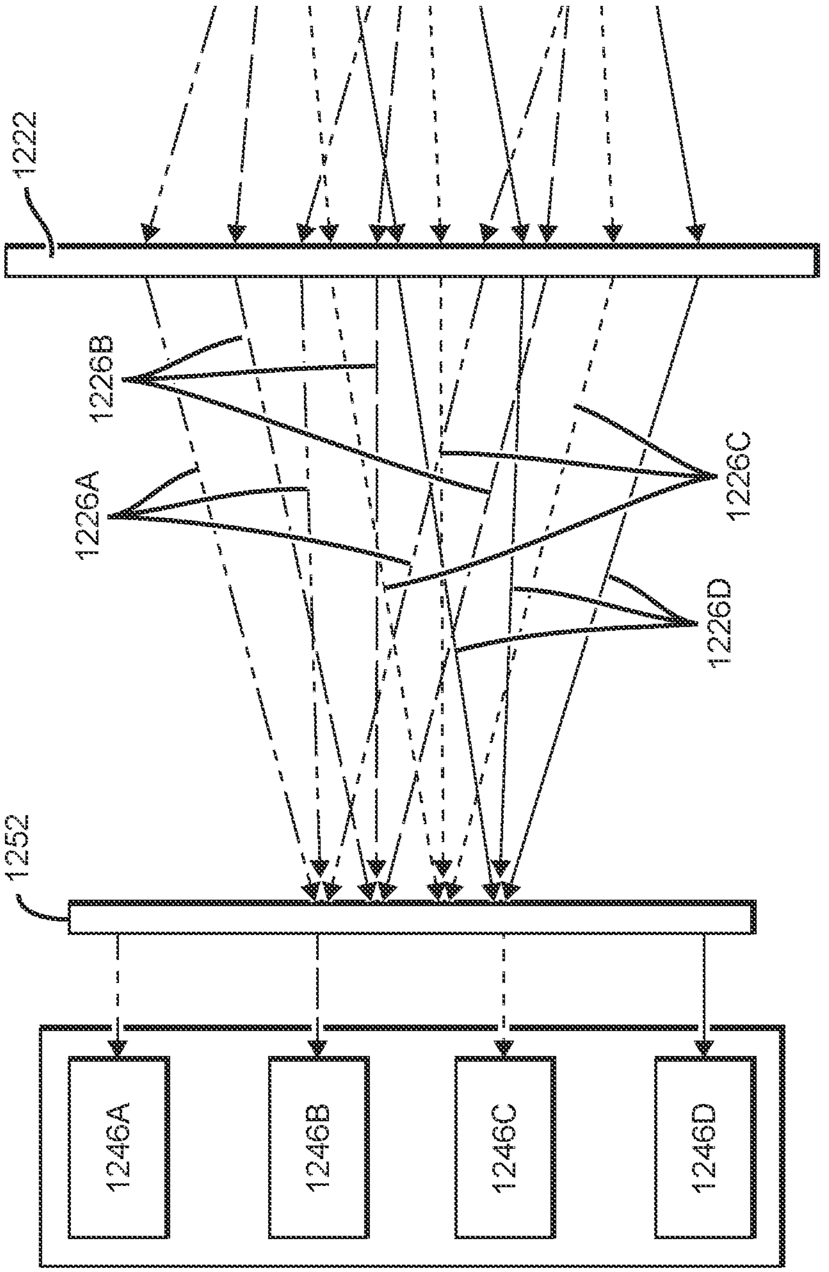
FIG. 12C is a block diagram of another example receiver comprising one or more receiver metasurface-based optics for directing return light to detectors, according to some embodiments.

FIG. 12C is a block diagram of another example receiver comprising one or more receiver Metalenses 1222 and 1252 for directing return light to detectors 1246, according to some embodiments. The embodiment shown in FIG. 12C is similar to the embodiment shown in FIG. 12B, except that in this embodiment, no optical fiber array is used for receiving return light 1226 from receiver Metalens 1222 (or a glass-based collection lens). Instead, the return light 1226A-1226D are directly focused onto Metalens 1252, which is configured to perform one or more optical functions including collimation, filtering, light distribution, and focusing. The lights coming out of Metalens 1252 are then directed to one or more detectors 1246. Metalens 1252 can include subwavelength structures that are substantially the same or similar to those of Metalens 1242 described above, and thus is not repeatedly described. In one embodiment, depending on where the detectors are, the Metalens 1222 may not need to focus the return light 1226A-1226D in the manner shown in FIG. 12C. Instead, Metalens 1222 can be configured to pass the return light 1226A-1226D more uniformly across Metalens 1252. For example, light rays of return light 1226A may be directed to the top portion of Metalens 1252; light rays of return light 1226D may be directed to the bottom portion of Metalens 1252; and light rays of return light 1226B and 1226C may be directed to the middle portion of Metalens 1252. Metalens 1252 can then perform the various optical functions (e.g., collimation, filtering, and redirecting) at the various locations for the corresponding return light 1226A-1226D. After the optical processing, Metalens 1252 directs the processed return light having improved signal qualities to detectors 1246. The embodiment shown in FIG. 12C eliminates the receiver fiber array, thereby making the receiver more compact. In turn, this reduces the overall size of the LiDAR system. This embodiment may be used when crosstalk between adjacent receiver channels is not significant or is controlled by other ways.

In an alternative embodiments, multiple instances of Metalens 1252 can be used. For example, each instance of Metalens 1252 can be positioned to receive a different return light 1226A-1226D from Metalens 1222 (or a glass-based collection lens). The multiple instances of Metalens 1252 can be placed close to each other or further away from each other, depending on the locations of the detectors 1246 and crosstalk requirements. It is understood that any configuration of one or more instances of Metalens 1252 can be provided to receive any number of return light 1226 and direct the return light 1226 to any number of detectors 1246 at any physical location.

Figure 13A:
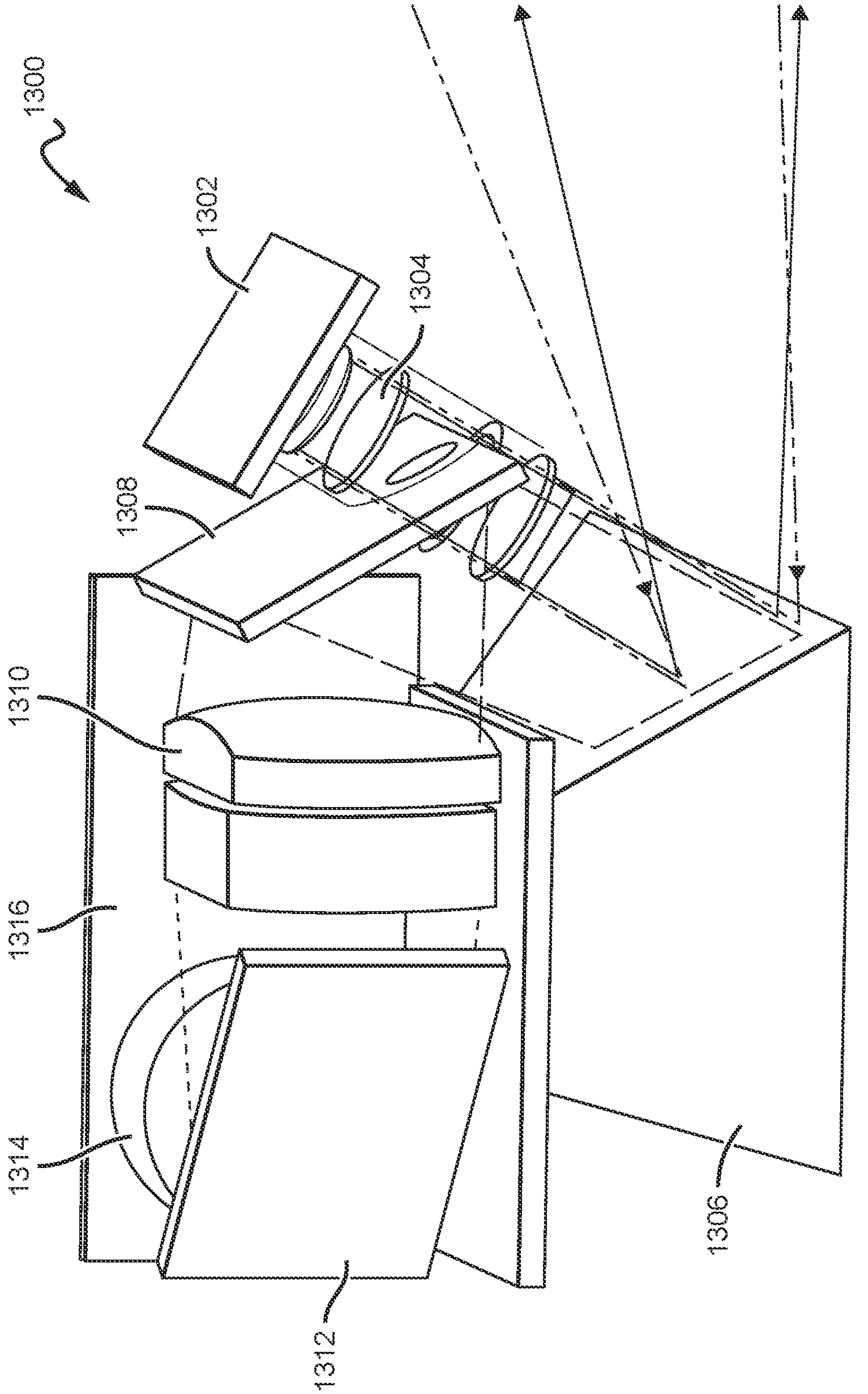
FIG. 13A is a diagram illustrating another example LiDAR system comprising one or more transmitter metasurface-based optics, according to some embodiments.

FIG. 13A is a diagram illustrating another example LiDAR system 1300 comprising one or more transmitter metasurface-based optics, according to some embodiments. FIG. 13A illustrates a perspective view of a LiDAR system 1300 having a stacked configuration. LiDAR system 1300 can be used to implement LiDAR system 300 described above in FIG. 3. LiDAR system 1300 includes transmitter circuit board 1302, one or more transmitter Metalenses 1304, a polygon mirror 1306, a combining mirror 1308, a receiver lens group 1310, a folding mirror 1312, a focusing lens 1314, and a detector circuit board 1316. The following description uses a transmitter Metalens 1304 as an example. However, one or more of the combining mirror 1308, folding mirror 1312, receiver lens group 1310, and focusing lens 1314 can be replaced with metasurface-based optics like Metalenses or Metamirrors described above.

With reference to FIG. 13A, in some embodiments, transmitter circuit board 1302 includes a laser source and circuitry for generating one or more channels of outgoing laser light, in the form of multiple laser light beams. The transmitter circuit board 1302 can include a vertical cavity surface emitting laser (VCSEL) chip configured to provide, for example, 48 channels of transmission laser light beams. A VCSEL chip can be arranged to have an array of (e.g., a 1×8 array) emitting zones aligned in a row in the center of the chip. Each emitting zone has a plurality of micro VCSEL emitters. Each emitting zone corresponds to a laser channel, and can be turned on and off individually. When an emitting zone is being turned on or off, micro VC SEL emitters in that particular emitting zone are turned on and off together. Emitting zones can be connected to one or more electrodes. An electrode can control one or a group of emitting zones by turning the emitting zone(s) on and off. An electrode can have several different types, for example, an anode, a cathode, etc. All emitting zones on a VCSEL chip can share a common electrode. In other embodiments, a plurality of emitting zones on a VCSEL chip can be connected to more than one electrode.

The laser light beams provided by transmitter circuit board 1302 are directed to one or more transmitter Metalenses 1304. In one embodiment, a single Metalens 1304 is used to receive and collimate all the laser light beams provided by transmitter circuit board 1302. This Metalens 1304 can be substantially the same or similar to transmitter Metalens 1212 shown in FIG. 12A as described above. In another embodiment, a plurality of Metalens 1304 can be used to collimate a large number of laser light beams (e.g., 48 or more beams) provided by transmitter circuit board 1302. The plurality of Metalenses 1304 may be disposed in a manner such that each of the multiple Metalenses 1304 receives a subgroup of laser light beams (e.g., one Metalens receives and collimates 12 beams, another Metalens receives and collimates another 12 beams, and so forth).

Figure 13B:
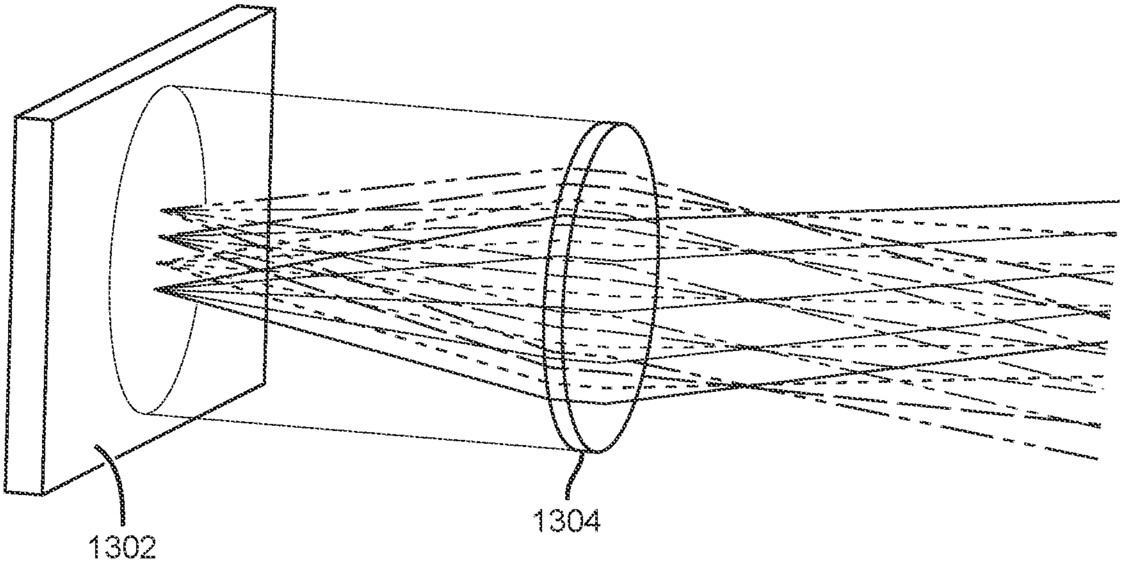
FIG. 13B is a diagram illustrating an example transmitter comprising a transmitter Metalens for collimating transmission light beams, according to some embodiments.
Figure 13C:
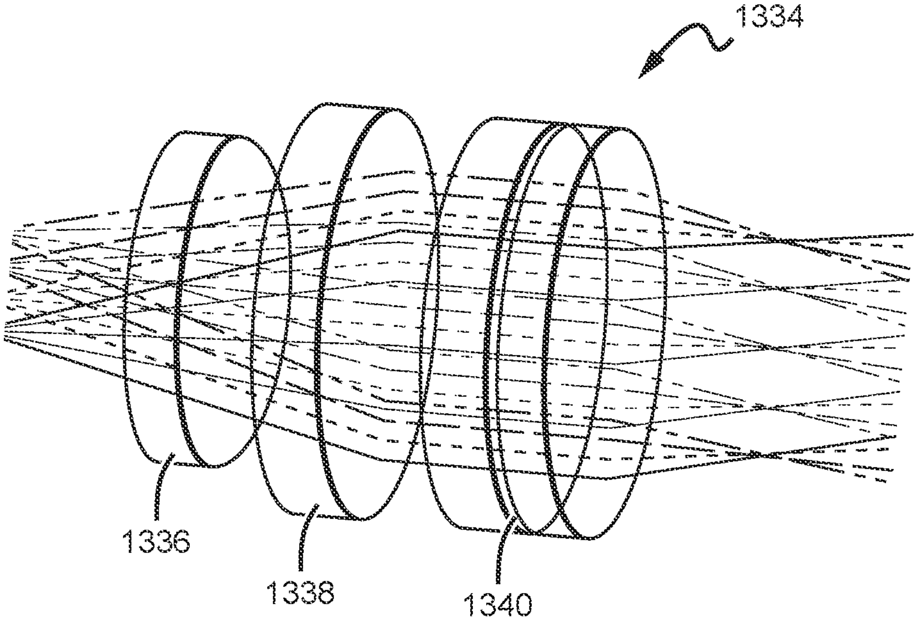
FIG. 13C is a diagram illustrating a glass-based lens group for collimating transmission light beams, according to some embodiments.

In another embodiment, a Metalens 1304 can be used to effectively replace a glass-based lens group. This is illustrated in more detail in FIGS. 13B and 13C. FIG. 13B is a zoomed-in view of the transmitter circuit board 1302 and transmitter Metalens 1304. As discussed above, in some examples, a large number of laser light beams (e.g., 48 or more) are provided by transmitter circuit board 1302. FIG. 13C illustrates that, to collimate a large number of laser light beams, a collimation lens group 1334 is typically required if conventional glass-based optical lenses are used. The example glass-based collimation lens group 1334 include four glass-based collimation lenses and/or prisms, arranged in a specific way to manipulate the large number of laser light beams and create parallel light rays for each of the laser light beams at its output. The glass-based collimation lens group 1334 therefore typically occupies a large space, making the LiDAR system bulky.

This bulky lens group 1334 can be replaced with a single thin piece Metalens 1304 shown in FIG. 13B. Metalens 1304 includes subwavelength structures that are configured to collimate a large number of laser light beams. In one embodiment, Metalens 1304 may include multiple layers stacked together, similar to the Metalens shown in FIG. 7E. For instance, Metalens 1304 may have two or more layers comprising nanostructures. A first layer receives the laser light beams from the transmitter circuit board 1302, and includes nanostructures configured to perform coarse phase modulation of all the beams, thereby performing a coarse collimation of all the light beams. The coarse collimation may produce good quality collimated beams (e.g., the light rays in a same light beam have a smaller divergence or convergence angle than the uncollimated beams). A second layer receives the coarsely modulated light beams and includes nanostructures to fine tune the coarsely collimated light beams. The output of the second layer of Metalens 1304 can therefore be a further collimated light beams, improving the collimation quality. Further layers can be added if the collimation quality is to be further improved. Eventually, the output light beams of the Metalens 1304 can have a very good quality of collimation. As described above, a beam that is well collimated can travel further and ensure proper alignment and focus. Moreover, the Metalens 1304 can have a thickness in the order of micrometers (e.g., 1 μm) or less. Therefore, the bulky glass-based lens group 1334 can be replaced with a thin Metalens 1304, making the LiDAR system significantly more compact. In other embodiments, Metalens 1304 can include multiple layers, with each layer comprising subwavelength structures for collimating a subgroup of laser light beams.

With reference back to FIG. 13A, continuing with the transmitting light path, Metalens 1304 receives and collimates the large number transmission light beams (e.g., 48 beams). The collimated beams are directed to a combining mirror 1308. In one example, combining mirror 1308 has one or more openings or transmissive portions to allow the transmission light beams to pass through the mirror 1308. The one or more openings in mirror 1308 can be a cutout, a hole, a slot, a lens, or a portion of mirror 1308 that has anti-reflection coatings, or anything that allows the transmission light beams to pass. The reflective surface of combining mirror 1308 (on the opposite side of transmitter circuit board 1302) redirects the return light to light detector on detector circuit board 1316 via other components of the LiDAR system 1300. In one embodiment, the one or more openings are located in the center of combining mirror 1308. In other embodiments, the opening(s) can be located in other parts of combining mirror 1308 that is not the center (e.g., at a corner).

In other embodiments, combining mirror 1308 can be a metasurface-based optics, including Metamirror, a Metalens, or a combination thereof. For instance, combining mirror 1308 can have subwavelength structures disposed on a Metamirror's surface (on the opposite side of transmitter circuit board 1302). These subwavelength structures can be configured to reflect light by controlling the phase, polarization, and direction of the return light reflected by polygon mirror 1306. In one example, the combining mirror 1308 also includes subwavelength structures at a particular location of mirror 1308 for passing through transmission light beams from Metalens 1304 to polygon mirror 1306. In another example, mirror 1308 only includes a Metamirror with an opening for passing the collimated transmission light beams to polygon mirror 1306.

Still referring to FIG. 13A, the collimated transmission light beams pass through combining mirror 130 and are then redirected to polygon mirror 1306. In other embodiments, transmission light beams from transmitter circuit board 1302 may be redirected by one or more other interim reflective mirrors before they reach polygon mirror 1306. In other embodiments, Metalens 1304 may be positioned between combining mirror 1308 and polygon mirror 1306. In some embodiments, polygon mirror 1306 may have a plurality of facets. For example, polygon mirror 1306 may have 3 facets, 4 facets, 5 facets, 6 facets, and so forth. Collimated transmission light beams are reflected by a facet of polygon mirror 1306 at any moment as the polygon mirror 1306 rotates. Polygon mirror 1306 rotates about axis perpendicular to its top and bottom surfaces. When polygon mirror 1306 rotates, each of the plurality of facets reflects all the transmission light beams in turn and directs them to illuminate the field-of-view.

In some embodiments, multi-facet polygon mirror 1306 is a variable angle multi-facet polygon (VAMFP) according to an embodiment. The facets of a VAMFP do not have the same tilt angle. A tilt angle is the angle between the rotational axis of polygon mirror 1306 and the facet's normal direction. The varied angles of the different facets thus result in scanning different vertical areas of the FOV. VAMFP is described in more detail in U.S. non-provisional patent application Ser. No. 16/837,429, filed on Apr. 1, 2020, entitled "Variable Angle Polygon For Use With A Lidar System", the content of which is incorporated by reference in it is entirety for all purposes.

If there are objects in the field-of-view, return light is formed based on scattering or reflecting the transmission light beams by the objects and is directed back a facet of polygon mirror 1306 as shown in FIG. 13A. Polygon mirror 1306 reflects the return light back to combining mirror 1308, which directs the return light to a receiver lens group 1310. The receiver lens group 1310 shown in FIG. 13A can include, for example, a collimation lens and a bandpass filter, similar to the glass-based collimation lens and bandpass filter in assembly 1243 described above (shown in FIG. 12B). Thus, in one embodiment, the receiver lens group 1310 is implemented using glass-based lens and optical filter. Due to the large number of transmission light beams, the return light can also include many light rays of corresponding to all the transmission light beams. Therefore, using glass-based lens and optical filter, the lens group 1310 may include, for example, four or more lenses for processing all the return light. As a result, the receiver lens group 1310 can be bulky as well.

In another embodiment, receiver lens group 1310 can be replaced with another receiver Metalens (not shown in FIG. 13A). The receiver Metalens can be substantially the same or similar to any of the receiver Metalens described above. For instance, the receiver Metalens used to replace lens group 1310 can also be a multiple layer Metalens including one layer to perform optical collimation and one layer to perform bandpass filtering. As another example, a single layer Metalens can be used to replace lens group 1310, such that the nanostructures of the single layer Metalens is designed to perform collimation and simultaneously filtering undesired light signals. As described above, a receiver Metalens can also be very thin (e.g., a thickness on the order of micrometers or less). Therefore, replacing the bulky glass-based lens group 1310 with a receiver Metalens can further reduce the size of the LiDAR system 1300, making it more compact.

With reference still to FIG. 13A, receiver lens group 1310, or a Metalens replacing the lens group 1310, directs the return light to detector circuit board 1316. The return light can be directly sent to detector circuit board 1316, or via one or more receiver optics. In FIG. 13A, such receiver optics are shown to include a folding mirror 1312 and a focusing lens 1314. Folding mirror 1312 is used because the detector circuit board is positioned at a side perpendicular to the lens group 1310 (or a Metalens replacing lens group 1310) and thus the direction of the return light needs to be changed so that they are directed to the detector circuit board 1316. If the detector circuit board 1316 is positioned parallel to the optical surfaces of lens group 1310 (or the metasurface of a Metalens replacing lens group 1310), it can directly receive the return light without the folding mirror 1312.

Focusing lens 1314 focuses the return light to a small spot size and converge the light rays of the return light corresponding to each of the transmission light beams to a detector (or detector element) on board 1316. Similar to that described above, focusing lens 1314 can also be a glass-based lens or a Metalens similar to Metalenses 804. Briefly, if focusing lens 1314 uses a Metalens, it also includes nanostructures to converge light rays to the focal point (similar to that shown in FIG. 8). In one embodiment, the focusing lens 1314 can be combined with lens group 1310. Lens group 1310 and focusing lens 1314 can be combined and replaced with a single piece of Metalens (e.g., a multiple layer Metalens similar to Metalens 1242 or 1252 shown in FIG. 12B). Using the focusing lens 1314, return light is directed to and is detected by one or more detector(s) on detector circuit board 1316.

Thus, one or more components of LiDAR system 1300 can use Metalens, including the transmitter collimation lens (replaced by transmitter Metalens 1304 shown in FIG. 13A), the combining mirror 1308, the receiver lens group 1310, and the focusing lens 1314. Combinations of Metalens and glass-based optical components can also be used to implement LiDAR system 1300.

Figure 14A:
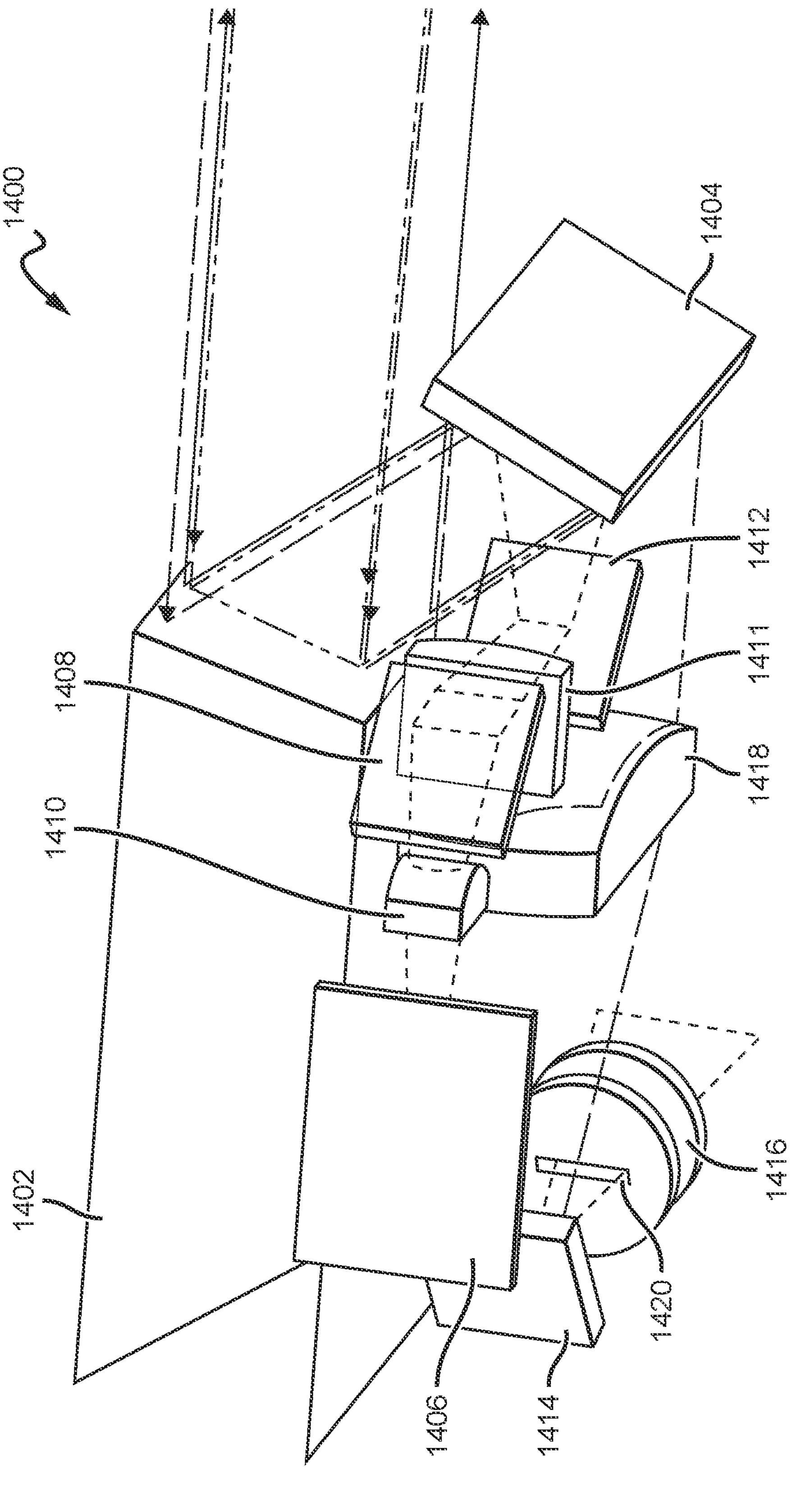
FIG. 14A is a perspective view of another example LiDAR system comprising a receiver Metalens for beam homogenizing, according to some embodiments.

FIG. 14A is a perspective view of another example LiDAR system 1400 comprising one or more metasurface-based optics, according to some embodiments. As shown in FIG. 14A, LiDAR system 1400 comprises a polygon mirror 1402, an oscillation mirror 1404, a transmitter circuit board 1406, one or more collimation lenses 1410 and 1411, one or more folding mirrors 1408 and 1412, a collection lens 1418, a folding mirror 1414, a receiver Metalens 1416, an optical slit 1420, and a detector 1422 (shown in FIG. 14B). LiDAR system 1400 can be used to implement LiDAR system 300 described above in FIG. 3. Like LiDAR system 1300 shown in FIG. 13A, LiDAR system 1400 has a stacked configuration such that the polygon mirror 1402 is vertically stacked above at least a part of the transmitter and receiver. As described above, in some embodiments, the stacked configuration provides a more compact LiDAR system that can be easily fit into a vehicle. Unlike LiDAR system 1300 shown in FIG. 13A, the polygon mirror 1402 in LiDAR system 1400 sits above the transceiver including the transmitter circuit board 1406, transmitter optics, receiver optics, and the detector.

With reference to FIG. 14A, in some embodiments, the transmitter circuit board 1406 includes a laser source that emits one or more transmission light beams. The transmission light beams can be directed (directly or via other optics like a folding mirror) to collimation lens 1410. The collimation lens 1410 can be a glass-based lens or a Metalens (e.g., similar to Metalens 1012 described above). The collimation lens 1410 collimates the transmission light beams and directs them to folding mirror 1408. Collimation lens 1410 can be a fast-axis collimation lens. In some examples, another collimation lens 1411 can be placed between the two folding mirrors 1410 and 1412 for perform further collimation. Collimation lens 1411 can be a slow-axis collimation lens. In the embodiment shown in FIG. 14A, the collimation lens 1410 is placed on a side of collection lens 1418. Therefore, similar to those described above with respect to FIG. 11, using the folding mirrors 1408 and 1412 to form a beam-shifting system, the collimated transmission light beams can be shifted to be positioned within the optical receiving aperture of the collection lens 1418. For instance, the collimated transmission light beams may be shifted to align with the center portion of the collection lens 1418 to maximize the collection of return light using the optical receiving aperture of collection lens 1418. The folding mirrors 1408 and 1412 can be glass-based mirrors having reflection coatings or Metamirrors similar to reflective surfaces 1104 and 1106 described above with respect to FIG. 11.

Next, the collimated transmission light beams are directed to oscillation mirror 1404, which can oscillate to enabling scanning the light beams along a vertical direction. The oscillation mirror 1404 redirects the collimated transmission light beams to the polygon mirror 1402, which rotates to scan the light beams along a horizontal direction. Thus, the LiDAR system 1400 can scan an FOV in two dimensions. In some examples, the oscillation mirror 1404 can be replaced with a fixed mirror and the polygon mirror 1402 can be configured as a variable angle polygon mirror, similar to those described above with respect to polygon mirror 1306 described above using FIG. 13A.

When the transmission light beams illuminate one or more objects in an FOV, return light may be formed by scattering or reflecting the transmission light beams. The return light is received by polygon mirror 1402. Polygon mirror 1402 directs the return light to oscillation mirror 1404, which redirects the return light to the collection lens 1418. Collection lens 1418 can be a glass-based lens or a Metalens similar to collection lens 1222 described above using FIG. 12A. In the embodiment shown in FIG. 14A, collection lens 1418 can focus the return light to a folding mirror 1414.

Figure 14B:
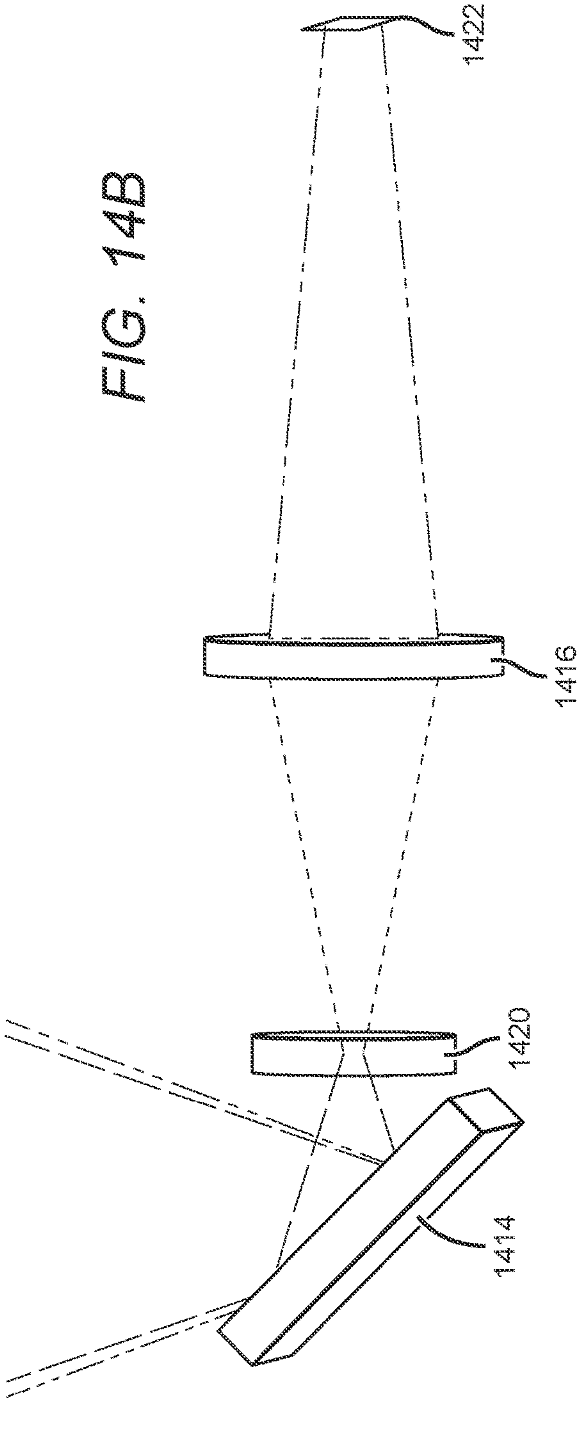
FIGS. 14B-14E illustrate another example receiver comprising a receiver Metalens for beam homogenizing, according to some embodiments.

With reference to both FIGS. 14A and 14B, folding mirror 1414 can change the direction of the return light and direct the return light toward an optical slit 1420. In some examples, folding mirror 1414 can be a glass-based mirror having reflective coating or a Metamirror. Optical slit 1420 is configured to have a narrow opening along one dimension, through which light can be transmitted. The optical slit 1420 is made with high precision to shape the light passing through along one dimension. FIG. 14D illustrates an example light pattern 1440 passing through optical slit 1420. As shown in FIG. 14D, the return light passing through slit 1420 can include a plurality of rectangular-shaped light portions (e.g., 16 portions). Each of the light portions represents a return light corresponding to a different transmission light beam of the multiple transmission light beams. Optical slit 1420 may be made with metal materials such as stainless steel, molybdenum or tungsten, or made in a thin metallic coating on a glass piece.

With reference back to FIGS. 14A and 14B, the slit 1420 can be positioned and configured to block light other than the desired return light. As described above, the multiple transmission light beams are angularly separated and thus the return lights corresponding to different transmission light beams are also angularly separated. The return lights formed based on the multiple transmission light beams are thus received at certain particular angles. Noise, interference light, and/or other undesired light may be received by the LiDAR system 1400 at incident angles that are different than the desired return light. As a result, by properly positioning and configuring the dimension of the slit 1420, the undesired stray light can be blocked while allowing the desired return light to pass through.

Continuing with the receiving light path, when return light passes through optical slit 1420, it is directed to a receiver Metalens 1416 for beam homogenization before the return light is detected by detector 1422. With reference to FIGS. 14B and 14D, as described above, the return light passing through optical slit 1420 can have a pattern 1440 shown in FIG. 14D. Pattern 1440 may include an array of rectangular-shaped light portions corresponding to return light formed based on different transmission light beams. FIG. 14D also shows an array of detector elements 1450. These detector elements 1450 can be included in detector 1422 shown in FIG. 14B. As illustrated in FIG. 14D, the shape of each of the detector elements 1450 may be different from the shape of a light portion in light pattern 1440. For instance, each of the detector elements 1450 may have a square shape (or other shapes). Therefore, there may be a mismatch between the shape of the light portions in the return light passed through the slit 1420 and the shape of the detector elements 1450. The mismatch may reduce the detection efficiency because the received light portion at a detector element 1450 has a profile that is not uniformly distributed according to the shape of the detector element 1450.

To reduce or eliminate the non-uniformity of the received return light portion at each of the detector element 1450, receiver Metalens 1416 in FIG. 14B can be used to perform beam homogenization and thus function as a beam homogenizer 1446 shown in FIG. 14D. Beam homogenizer 1446 can change the light profile such that it is more uniform. For instance, to make a rectangular shaped light portion in light pattern 1440 to be more uniform such that the received light portion at the detector element 1450 matches better to the shape of detector element 1450, Metalens 1416 can have a metasurface configured to introduce artificial phase shifts in one direction but not the other direction (or more in one direction but less in the other direction), thereby expanding the light profile of each of the return light portions in pattern 1440 in the direction perpendicular to the longitudinal direction of each return light portion. For instance, receiver Metalens 1416 can be configured to have subwavelength structures formed on a surface of a wafer substrate. The subwavelength structures can form nano-scale patterns (e.g., a 1D array pattern having varied feature dimensions in the direction perpendicular to the longitudinal direction of the array, or any other desired patterns). As a result, the receiver Metalens 1416 adds slight beam divergence that is perpendicular to the longitudinal direction of the light pattern 1440. The result of the beam homogenization can be seen in FIG. 14E. After beam homogenization by receiver Metalens 1416 (shown as the beam homogenizer 1446 in FIG. 14D), the light profile of the return light received at the detector elements 1450 can have a square shape that better matches with the shape of the detector elements (e.g., more uniform in all four directions).

Figure 14C:
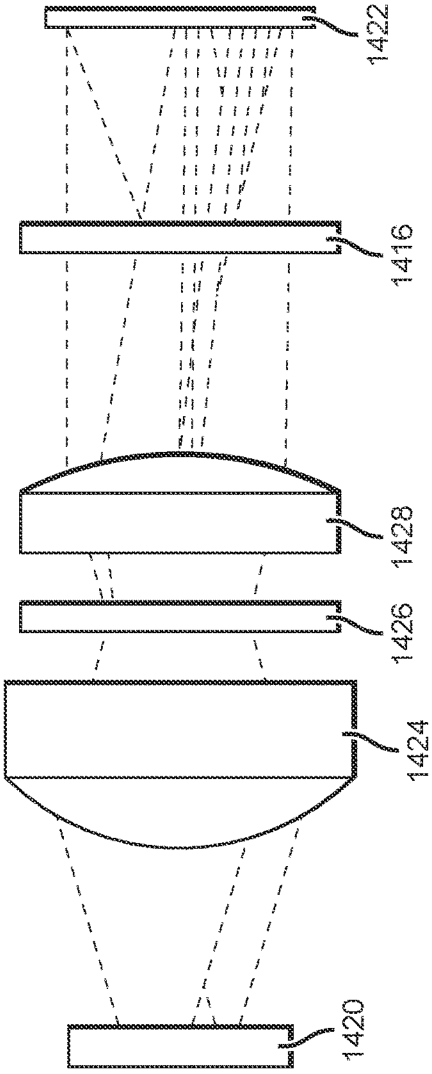
Figure 14D:
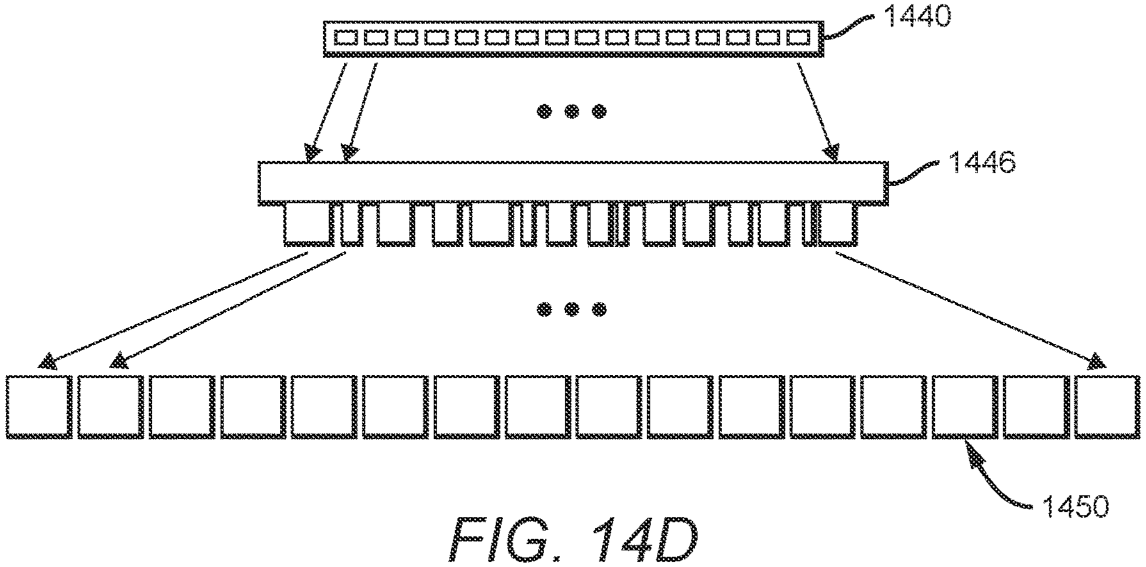
Figure 14E:
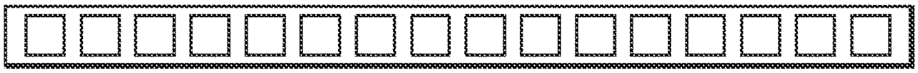

FIG. 14C illustrates another example configuration of a receiver comprising a Metalens 1416 for beam homogenizing, according to some embodiments. Similar to FIG. 14B, the receiver shown in FIG. 14C receives the return light. The return light passes through optical slit 1420 and is directed to a lens group before the return light is received by the receiver Metalens 1416 for beam homogenization. The lens group shown in FIG. 14C comprises a collimation lens 1424, a filter 1426, and a focusing lens 1428. The collimation lens 1424 further collimates the light rays of the return light formed based a particular transmission light beam to be more parallel. The filter 1426 can perform spectral filtering to remove or reduce the light having undesired wavelengths (e.g., light that is outside the operational wavelength of the LiDAR system). The focusing lens 1428 can better focus the return light to the receiver Metalens 1416 and in turn detector 1422. Thus, the lens group comprising the collimation lens 1424, filter 1426, and focusing lens 1428 can be used to further improve the quality of the return light before the return light is homogenized by receiver Metalens 1416, thereby further improving the detection accuracy and efficiency. In some examples, one or more of collimation lens 1424, filter 1426, and focusing lens 1428 can be implemented using glass-based optics or metasurface-based optics, similar to those described above. In addition, one or more of collimation lens 1424, filter 1426, and focusing lens 1428 may be omitted. The order of these optics can be changed, or additional optics can be added. When the Metalens 1416 receives the further processed return light from the lens group, it can perform beam homogenization similar to that described above. The return light received at the detector 1422 thus has a more uniform light profile, which improves the detection efficiency.

It is understood that the lens group shown in FIG. 14C is an example. Any other optics, whether glass-based or metasurface-based optics can be used to implement the lens group to further improve the light receiving quality and detection efficiency. It is further understood that the lens group (or one or more optics) can be placed downstream or upstream of the beam homogenizer (e.g., on either or both sides of beam homogenizer 1446 shown in FIG. 14D).

Figure 14F:
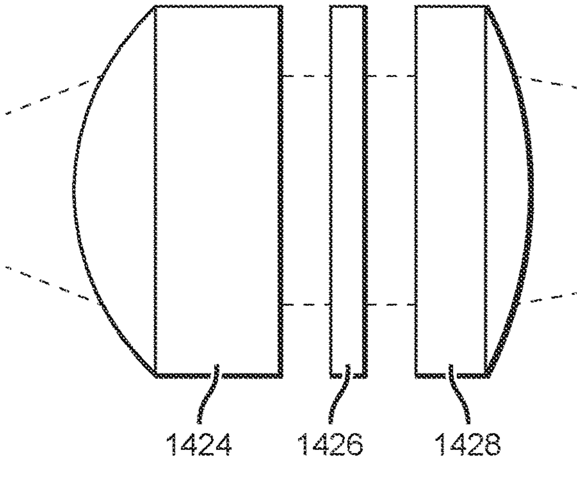
FIG. 14F illustrates an example typical glass-based lens group that is replaceable with a Metalens, according to some embodiments.

FIG. 14F illustrates an example conventional glass-based lens group that is replaceable with a Metalens in a receiver of a LiDAR system, according to some embodiments. With reference to FIGS. 14C and 14F, the example lens group comprising collimation lens 1424, a filter 1426, and a focusing lens 1428 can be replaced partially or entirely with a multiple layer Metalens. The multiple layer Metalens can be similar to the multiple layer Metalens 1242 or 1252 described above (e.g., three layers for collimating, filtering, and focusing the return light; or two layers when filtering and focusing are combined). Using a Metalens to replace the lens group shown in FIG. 14F can further reduce the size of the receiver, and in turn the LiDAR system. The system can thus be more compact.

Figure 14G:
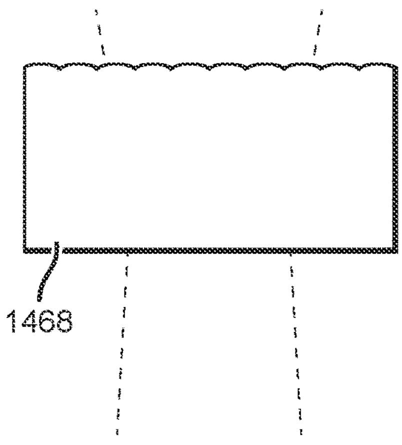
FIG. 14G illustrates an example cylindrical lens array that is replaceable with a Metalens, according to some embodiments.

FIG. 14G illustrates an example lens array 1468 that is replaceable with a metasurface-based beam homogenizer, according to some embodiments. Lens array 1468 can be, for example, a cylindrical lens array used to expand the beam profile and perform certain degrees of beam homogenization. Cylindrical lens array 1468 can use an array of glass-based optical lenses or microlens. However, the glass-based optical lenses can be bulky. Further, each of the lenses in the array 1468 may need to be precisely configured to shape the light profile in a desired manner. Thus, the cost of making such a glass-based lens array can be high. A metasurface-based beam homogenizer (e.g., 1446) can be used to replace the cylindrical lens array to reduce or eliminate these problems, while performing beam homogenization in a more precise manner using the nanostructures as described above.

In the embodiments shown in FIGS. 14A-14C, Metalens 1416 is used for performing beam homogenization in LiDAR system 1400. However, it is understood that the same or substantially similar Metalens can be used for other LiDAR systems (e.g., systems 300, 1000, 1200, and 1300). Moreover, each of systems 300, 1000, 1200, 1300, and 1400 may comprise a steering mechanism for scanning the transmission light beams to an FOV and to receive and redirect return light. In some examples, the steering mechanism can be implemented using Metalenses, Metamirrors, and/or other metasurface-based optics.

Figure 15A:
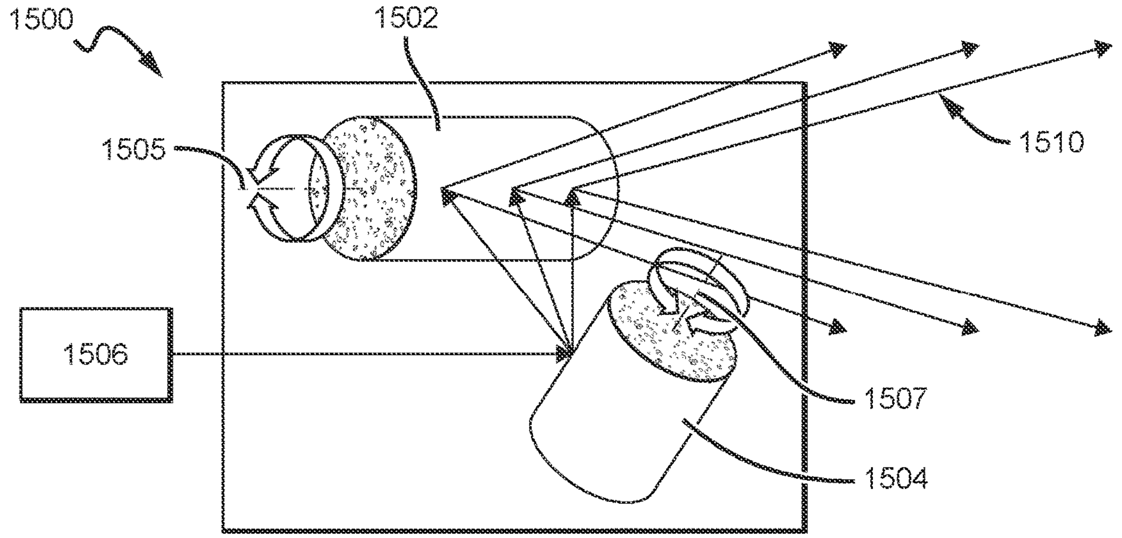
FIG. 15A illustrates an example steering mechanism comprising one or more Metalenses, according to some embodiments.
Figure 15B:
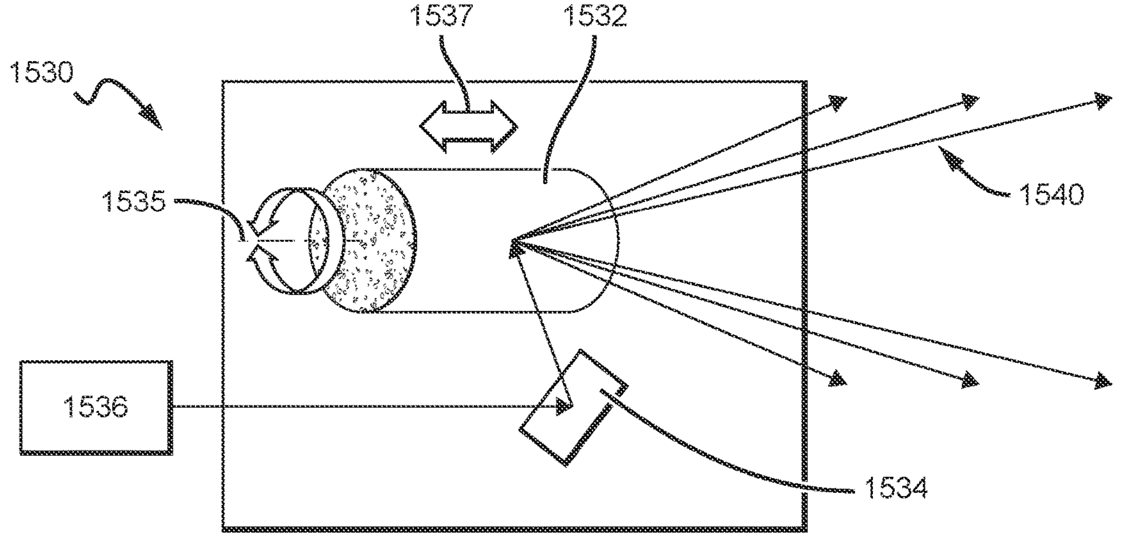
FIG. 15B illustrates another example steering mechanism comprising a Metalens, according to some embodiments.
Figure 15C:
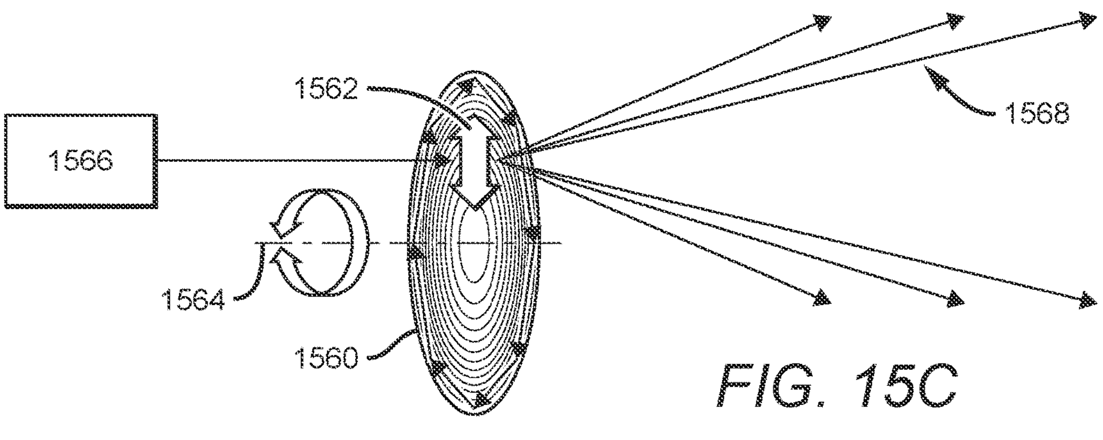
FIG. 15C illustrates another example steering mechanism comprising a Metalens, according to some embodiments.

FIGS. 15A-15C illustrate example steering mechanisms 1500, 1530, and 1560 comprising one or more Metalenses, Metamirrors, and/or other metasurface-based structures, according to some embodiments. Steering mechanisms 1500, 1530, or 1560 can be used to implement or replace steering mechanism 340, polygon mirror 1306, polygon mirror 1402, oscillation mirror 1404, and/or other optical scanners.

With reference to FIG. 15A, steering mechanism 1500 includes two cylindrical-shaped structures 1502 and 1504, each of which includes subwavelength structures disposed on the surface. These subwavelength structures can be nanoslits, nanorods, nanodisks, nanocylinders, etc. The nanostructures are specifically configured to resonate with incident light at one or more specific wavelengths and angles. In one embodiment, subwavelength structures are printed onto the surfaces of cylindrical-shaped structures 1502 and 1504, thereby forming metasurfaces. For instance, silicon nanocomposite can be used to provide printable Metalenses. The nanocomposite is synthesized by dispersing silicon nanoparticles in a thermally printable resin. The resin can be printed with the silicon nanocomposite onto a base structure to form the cylindrical-shaped structures 1502 and 1504. The patterns of the subwavelength structures are configured to control the direction of outgoing light. In one example, cylindrical-shaped structure 1504 can have a pattern of subwavelength structures configured to receive incident light beams from transmitter 1506, and redirect them toward cylindrical-shaped structure 1502. Cylindrical-shaped structure 1502 can also have a pattern of subwavelength structures to receive the light beams from cylindrical-shaped structure 1504 and redirect them to an FOV, thereby forming outgoing light beams 1510, as shown in FIG. 15A.

The patterns of the subwavelength structures printed on the surfaces of cylindrical-shaped structures 1502 and 1504 may or may not be the same. In the embodiment shown in FIG. 15A, cylindrical-shaped structures 1502 and 1504 can each control the scanning of light in one direction, thereby enabling a two-dimensional scan. Each of the cylindrical-shaped structures 1502 and 1504 can be configured to rotate about their respective rotational axis 1505 and axis 1507. In some examples, cylindrical-shaped structure 1502 can be controlled to rotate about axis 1505 in one rotational direction (e.g., clockwise looking into structure 1502 along axis 1505), or oscillate about axis 1505 in the rotation direction and its opposite direction (e.g., both clockwise and counterclockwise). Similarly, cylindrical-shaped structure 1504 can be controlled to rotate about axis 1507 in one rotational direction, or oscillate about axis 1507 in the rotational direction and its opposite direction.

In some embodiments, one or both of the metasurfaces of cylindrical-shaped structure 1502 and 1504 can be divided into micro-areas, each of which is about several square micrometers. Each micro-area is printed with a specific pattern of subwavelength structures, such that the angle between the incident light of the cylindrical-shaped structure and the corresponding outgoing light is controlled as dependent on the rotation angle of the cylindrical-shaped structure. Thus, when cylindrical-shaped structures 1502 and 1504 rotate, the outgoing transmission light beams for scanning the FOV changes angles in two directions (each of structures 1502 and 1504 controls one direction), thereby enabling a 2D scan.

In a specific embodiment, cylindrical-shaped structures 1502 and 1504 control the scan in the vertical direction and the horizontal direction, respectively. Thus, when cylindrical-shaped structure 1504 rotates, the horizontal angle of the outgoing light beams 1510 changes. When cylindrical-shaped structure 1502 rotates, the vertical angle of the outgoing light beams 1510 changes. It is understood that cylindrical-shaped structures 1502 and 1504 can be reconfigured such that they scan the horizonal and vertical directions respectively.

In one example, the subwavelength structures printed on the surface of each of cylindrical-shaped structures 1502 and 1504 can be patterned such that the surfaces are reflective. The subwavelength structures are configured such that the phase, amplitude, and polarization of incident light can be controlled in a desired manner. Such metamaterials implemented reflective surfaces is referred to as Metamirrors. Metamirrors, due to the subwavelength structures, can reflect light similar to a conventional mirror. They can also manipulate light in unconventional ways that are not possible by using conventional mirrors. For example, by using Metamirrors and/or Metalens, the outgoing light and incident light may not follow the conventional laws of reflection. Instead, the outgoing light can have any desired direction, phase, amplitude, and polarization. As such, by using Metalens, Metamirrors, and/or other metasurface-based optics, the steering mechanism 1500 can be more flexibly configured for scanning transmission light beams 1510 to the FOV of a LiDAR system. Depending on the specific subwavelength structures configured for steering mechanism 1500, the scanning can satisfy any horizontal FOV and vertical FOV requirements.

FIG. 15B illustrates another example of a steering mechanism 1530, which includes a single cylindrical-shaped structure 1532 and a fixed mirror 1534. Cylindrical-shaped structure 1532 includes subwavelength structures disposed on its surface. These subwavelength structures can be nanoslits, nanorods, nanodisks, nanocylinders, etc. The nanostructures are specifically configured to resonate with incident light at one or more specific wavelengths and angles. In one embodiment, subwavelength structures are printed onto the surfaces of cylindrical-shaped structures 1532, thereby forming a metasurface. Unlike the pattern used for cylindrical-shaped structure 1502, the pattern of the subwavelength structures printed on cylindrical-shaped structure 1532 is configured to control both directions of the outgoing light beam. In one example, a non-moveable mirror 1534 receives the incident light from transmitter 1536, and redirects the incident light toward cylindrical-shaped structure 1532. Cylindrical-shaped structure 1532 can have a dimension that is larger than that of structure 1502. Thus, cylindrical-shaped structure 1532 can have a sufficient surface area for printing micro-areas of subwavelength structures. These micro-areas collectively encode all possible combinations of coordinates for 2D scanning.

In one embodiment, the subwavelength structures printed on the surface of cylindrical-shaped structure 1532 can be patterned such that the surfaces are reflective, similar to those described above with respect to structure 1502. Using the printed subwavelength structures, cylindrical-shaped structure 1532 can redirect light from a light source 1536 to an FOV, thereby forming outgoing light beams 1540, as shown in FIG. 15B. In the embodiment shown in FIG. 15B, when cylindrical-shaped structure 1532 rotates about its rotational axis 1535 and/or translates along the axial direction 1537, both the horizontal and vertical angles of the outgoing light beams 1540 change, providing a scan coverage of the entire FOV. In some examples, cylindrical-shaped structure 1532 can be controlled to rotate about axis 1535 in one rotational direction (e.g., clockwise looking into structure 1532 along axis 1535), or oscillate about axis 1535 in the rotational direction and its opposite direction (e.g., both clockwise and counterclockwise).

FIG. 15C illustrates another example of a steering mechanism 1560, which is a single disk-shaped structure with subwavelength structures printed on a flat surface. The disk-shaped structure shown in FIG. 15C may have a size that is approximately the size of a compact disk (CD). The disk-shaped structure of steering mechanism 1560 can include micro-areas of subwavelength structures for either reflecting or refracting incident laser light (as reflective type disk or transmissive type disk) received from light source 1566. Metalens, Metamirrors, and/or other metasurface-based structures can be patterned to control the outgoing light 1568 in both the horizontal and vertical angles. In one embodiment, the disk-shaped structure of steering mechanism 1560 has micro-areas in circular or spiral tracks, similar to CD's. The disk-shaped structure can rotate about a rotational axis 1564 and can move linearly in a radial direction 1562 relative to the light source 1566, so that the incident laser light may move between inner tracks and outer tracks of the disk-shaped structures. As a result, the steering mechanism 1560 can form outgoing light beams 1568 scanning the entire FOV in two directions. In some examples, disk-shaped structure of steering mechanism 1560 can be controlled to rotate about axis 1564 in one rotational direction (e.g., clockwise), or oscillate about axis 1564 in the rotational direction and its opposite direction (e.g., clockwise and counterclockwise).

The foregoing specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A light ranging and detection (LiDAR) system comprising one or more metasurface-based optics, the system comprising:

a transmitter comprising one or more transmitter optics, the transmitter being configured to provide one or more transmission light beams;

a beam steering apparatus optically coupled to the transmitter, the beam steering apparatus comprising one or more steering optics configured to:

scan the one or more transmission light beams in at least one of a horizontal and a vertical directions to a field-of-view (FOV), and direct return light formed based on the scanned one or more transmission light beams;

a receiver comprising one or more receiver optics, the receiver being configured to receive the return light directed by the beam steering apparatus;

wherein at least one of the one or more transmitter optics, the one or more steering optics, and the one or more receiver optics comprise the one or more metasurface-based optics, at least one of the one or more metasurface-based optics having subwavelength structures disposed on a semiconductor wafer substrate, wherein features of the subwavelength structures have sizes smaller than an operational wavelength of the LiDAR system, wherein the at least one of the one or more metasurface-based optics comprises a rotation axis, when moving about the rotation axis, the at least one of one or more the metasurface-based optics is configured to scan the one or more transmission light beams to the FOV.

2. The system of claim 1, wherein the subwavelength structures are preconfigured to modulate light according to one or more optical requirements associated with the transmitter, beam steering apparatus, or the receiver.

3. The system of claim 2, wherein the operational wavelength of the LiDAR system is between 750 nm to 2000 nm.

4. The system of claim 1, wherein each of the subwavelength structures has a dimension between 1/20-9/10 of the operational wavelength of the LiDAR system.

5. The system of claim 1, wherein the subwavelength structures form a 2-dimensional or 3-dimensional pattern configured to module light to have different optical phase changes at different locations of the subwavelength structures such that light formed by the subwavelength structures is manipulated according to at least one optical requirement associated with the transmitter, beam steering apparatus, or the receiver.

6. The system of claim 5, wherein the at least one optical requirement comprises one or more requirements related to: beam direction, reflection, deflection, refraction, diffraction, focusing, collimation, splitting, merging, converging, steering, scattering, dispersion, or polarization of the one or more transmission light beams and the return light.

7. The system of claim 1, wherein the subwavelength structures comprise dielectric-based structures on an order of nanometers or micrometers.

8. The system of claim 1, wherein the subwavelength structures comprise a monolayer or multilayers of nanostructures.

9. The system of claim 1, wherein a thickness of the at least one of the one or more metasurface-based optics is less than one micrometer.

10. The system of claim 1, wherein the transmitter further comprises:

a transmitter fiber array configured to emit respective light beams from respective transmitter optical fibers of the transmitter fiber array to the beam steering apparatus, and wherein the one or more metasurface-based optics comprises one or more first transmitter Metalens disposed between the transmitter optical fibers and the beam steering apparatus.

11. The system of claim 10, wherein the one or more first transmitter Metalenses are configured to:

collimate the light beams emitted from the transmitter optical fibers; and direct collimated light beams along different directions to form the one or more transmission light beams, wherein neighboring transmission light beams have a predetermined angular spacing.

12. The system of claim 10, wherein the one or more metasurface-based optics comprises further comprise one or more second transmitter Metalenses configured to:

perform one or more of a shifting, shaping, splitting, and converging of the one or more transmission light beams.

13. The system of claim 1, wherein the receiver further comprises:

a receiver fiber array, wherein the one or more receiver optics are disposed between the beam steering apparatus and the receiver fiber array, and wherein the one or more metasurface-based optics comprises a first receiver Metalens; and a detector optically coupled to the receiver fiber array.

14. The system of claim 13, wherein the first receiver Metalens is configured to:

collect the return light formed by scattering or reflecting the one or more transmission light beams by one or more objects in the field-of-view.

15. The system of claim 13, wherein the one or more metasurface-based optics further comprise:

one or more second receiver Metalenses configured to perform one or more of: a collimation, shifting, shaping, splitting, and converging of the return light.

16. The system of claim 1, wherein the receiver further comprises:

an optical slit configured to pass through a portion of the return light;

wherein the one or more metasurface-based optics further comprise one or more third Metalenses configured to receive the portion of the return light passing through the optical slit and perform beam homogenization; and a detector configured to receive the beam homogenized return light.

17. The system of claim 1, wherein the one or more steering optics comprise one or more cylindrical-shaped structures, each of the cylindrical-shaped structures having a surface printed with subwavelength structures configured to redirect the one or more transmission light beams to the FOV in at least one of the horizontal and vertical directions.

18. The system of claim 1, wherein the one or more steering optics comprises a disk-shaped structure having a surface printed with subwavelength structures configured to redirect the one or more transmission light beams to the FOV in at least one of the horizontal and vertical directions.

19. The system of claim 1, wherein the transmitter further comprises a vertical-cavity surface-emitting laser (VCSEL) emitting the transmission light beams in a plurality of transmitter channels.

20. The system of claim 19, wherein the VCSEL comprises 30 or more transmitter channels such that scanlines of the LiDAR system have an angular resolution of less than 0.5 degrees.

21. The system of claim 1, wherein the one or more metasurface-based optics comprise a third transmitter Metalens configured to operate as a transmitter lens group to perform coarse and fine collimation of the transmission light beams.

22. The system of claim 1, wherein the one or more metasurface-based optics comprises a fourth receiver Metalens configured to operate as a receiver lens group to focus the return light;

wherein the receiver further comprises:

a detector or a multi-element detector array; and additional spatial or spectral filter structures disposed in front of the detector or the multi-element detector array.

23. The system of claim 22, wherein the receiver further includes a folding mirror with an opening configured to pass through the transmission light beams to the beam steering apparatus.

24. A vehicle comprising a system for light ranging and detection (LiDAR), the system comprising:

a transmitter comprising one or more transmitter optics, the transmitter being configured to provide one or more transmission light beams;

a beam steering apparatus optically coupled to the transmitter, the beam steering apparatus comprising one or more steering optics configured to:

scan the one or more transmission light beams in at least one of a horizontal and a vertical directions to a field-of-view, and direct return light formed based on the scanned one or more transmission light beams;

a receiver comprising one or more receiver optics, the receiver being configured to receive the return light directed by the beam steering apparatus;

wherein at least one of the one or more transmitter optics, the one or more steering optics, and the one or more receiver optics comprise one or more metasurface-based optics, at least one of the one or more metasurface-based optics having subwavelength structures disposed on a semiconductor wafer substrate, wherein features of the subwavelength structures have sizes smaller than an operational wavelength of the LiDAR system, wherein the at least one of the one or more metasurface-based optics comprises a rotation axis, when moving about the rotation axis, the at least one of the one or more metasurface-based optics is configured to scan the one or more transmission light beams to the field-of-view.

* * * * *